US011111145B2

(12) United States Patent
Enomura et al.

(10) Patent No.: US 11,111,145 B2
(45) Date of Patent: Sep. 7, 2021

(54) PRECISE MODIFYING METHOD FOR FINE PARTICLE DISPERSION LIQUID

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 0 days.

(21) Appl. No.: 16/074,665

(22) PCT Filed: Feb. 1, 2017

(86) PCT No.: PCT/JP2017/003670
§ 371 (c)(1),
(2) Date: Aug. 1, 2018

(87) PCT Pub. No.: WO2017/135327
PCT Pub. Date: Aug. 10, 2017

(65) Prior Publication Data
US 2019/0031509 A1 Jan. 31, 2019

(30) Foreign Application Priority Data

Feb. 2, 2016 (JP) .............................. JP2016-018434
Feb. 2, 2016 (JP) .............................. JP2016-018435
Nov. 29, 2016 (WO) .................. PCT/JP2016/085460

(51) Int. Cl.
*C01B 13/16* (2006.01)
*C01B 13/36* (2006.01)
(Continued)

(52) U.S. Cl.
CPC ............ *C01B 13/36* (2013.01); *B01F 3/1214* (2013.01); *B01F 3/2261* (2013.01); *C01B 13/14* (2013.01);
(Continued)

(58) Field of Classification Search
CPC ......... C01B 13/16; C01B 13/36; C01B 13/14; C01P 2004/04; C01P 2004/654;
(Continued)

(56) References Cited

U.S. PATENT DOCUMENTS 3,630,952 A * 12/1971 Nielsen ..................... C09C 1/28
516/33
4,737,268 A * 4/1988 Giddings ........... G01N 30/0005
209/12.2
(Continued)

FOREIGN PATENT DOCUMENTS

EP      2610215 A1      7/2013
JP      63166422 A *    7/1988     ........ B01F 15/00954
(Continued)

OTHER PUBLICATIONS

English Translation of JP 2012206933 A; Inv: Watanabe et al.; Pub. Date: Oct. 2012 (Year: 2012).*
(Continued)

*Primary Examiner* — Joseph C Rodriguez
(74) *Attorney, Agent, or Firm* — Birch, Stewart, Kolasch & Birch, LLP

(57) ABSTRACT

A method for modifying a fine particle dispersion liquid with which dispersibility and dispersion stability can be improved includes performing filtration to remove impurities in a dispersion liquid using a dispersion liquid modifying device provided with a removal unit that uses a filtration membrane. The quantity of impurities is reduced from a first region until said quantity reaches a second pH-dependent region. In the second pH-dependent region, the dispersibility of the fine particles in the dispersion liquid is in a range in which the dispersibility depends more on a change in dispersion liquid pH than on a change in the quantity of impurities in the dispersion liquid. With the quantity of impurities reduced to the second pH-dependent region, the dispersibility of the
(Continued)

fine particles is controlled by adjusting the pH of the fine particle dispersion liquid.

15 Claims, 19 Drawing Sheets

(51) Int. Cl.
    *C01G 49/06*     (2006.01)
    *C01G 49/00*     (2006.01)
    *C01G 9/02*     (2006.01)
    *C01B 13/14*     (2006.01)
    *B01F 3/12*     (2006.01)
    *B01F 3/22*     (2006.01)

(52) U.S. Cl.
    CPC ............... *C01B 13/16* (2013.01); *C01G 9/02* (2013.01); *C01G 49/00* (2013.01); *C01G 49/06* (2013.01); *B01F 2003/125* (2013.01); *C01P 2002/84* (2013.01); *C01P 2004/04* (2013.01); *C01P 2004/64* (2013.01)

(58) Field of Classification Search
    CPC .. C01P 2002/84; B01F 3/1214; B01F 3/2261; B01F 2003/125; B03B 7/00; B03B 9/00; C01G 49/00; C01G 49/06; C01G 9/02
    See application file for complete search history.

(56) References Cited

U.S. PATENT DOCUMENTS

| | | | | |
|---|---|---|---|---|
| 5,891,565 | A * | 4/1999 | Watanabe | B01J 13/0008 106/286.2 |
| 6,376,168 | B1 | 4/2002 | Kawanishi | |
| RE38,301 | E * | 11/2003 | Bleakley | C09C 1/021 106/464 |
| 8,152,963 | B2 * | 4/2012 | Nanba | C09C 1/00 162/189 |
| 8,168,157 | B2 * | 5/2012 | Shio | A61K 8/27 423/622 |
| 8,865,115 | B2 * | 10/2014 | Bechtloff | A61K 8/19 423/622 |
| 9,005,567 | B2 * | 4/2015 | Kuraki | B01F 7/00775 423/592.1 |
| 9,211,510 | B2 * | 12/2015 | Enomura | B01F 7/00758 |
| 9,919,932 | B2 * | 3/2018 | Jung | C07K 1/22 |
| 2006/0128817 | A1 | 6/2006 | Ema et al. | |
| 2010/0202960 | A1 | 8/2010 | Enomura | |
| 2013/0156682 | A1 | 6/2013 | Kuraki et al. | |
| 2014/0247687 | A1 | 9/2014 | Mizuno et al. | |
| 2019/0031508 | A1 * | 1/2019 | Enomura | C01G 49/00 |

FOREIGN PATENT DOCUMENTS

| | | | |
|---|---|---|---|
| JP | 5-155616 | A | 6/1993 |
| JP | 2001-11081 | A | 1/2001 |
| JP | 2012-206933 | A | 10/2012 |
| JP | 2012206933 | A * | 10/2012 |
| JP | 2013-82621 | A | 5/2013 |
| JP | 2013-235839 | A | 11/2013 |
| WO | WO 2004/080898 | A1 | 9/2004 |
| WO | WO 2009/035019 | A1 | 3/2009 |
| WO | WO 2011/090085 | A1 | 7/2011 |

OTHER PUBLICATIONS

International Search Report for PCT/JP2017/003670 (PCT/ISA/210) dated Apr. 4, 2017.
Database WPI Week 199329, Database Accession No. 1993-232138, Jun. 22, 1993, XP-002791735, 1 page.
Databade WPI Week 201378, Database Accession No. 2013-V07188, Nov. 21, 2013, XP-002791734, 3 pages.
Extended European Search Report for European Application No. 17747481.4, dated Jun. 13, 2019.

* cited by examiner

PRECISE MODIFYING METHOD FOR FINE PARTICLE DISPERSION LIQUID

TECHNICAL FIELD

The present invention relates to a precision reforming method of a fine particle dispersion solution.

BACKGROUND ART

Fine particle is the material used in wide fields such as a semiconductor, a toner, a paint, a ceramic, a metal, a drug, a cosmetic, a chemical, and a color filter, wherein when bulk materials are made to fine particles, new characteristics emerges so that various production methods thereof have been proposed.

These fine particles are actually used by dispersing them in various solvents, wherein when they are in the state of aggregates, namely in the state of forming secondary particles, characteristics as nanoparticles cannot be fully expressed in many cases. Especially when they are made to fine particles with the size of 200 nm or less, the characteristics thereof improve; however, in it there is a problem of readily forming aggregates. Therefore, a method for producing fine particle dispersion solution with which not only dispersion property of the fine particles is controlled but also the particles are dispersed to primary particles is being wanted.

When fine particles are produced in a liquid phase, in general, a fine particle raw material solution obtained by dissolving fine particle raw materials into a solvent is mixed with a separating solvent capable of separating the fine particles from the raw material solution thereof so as to separate the fine particles. Especially as disclosed in Patent Literatures 1 and 2, when the fine particles are separated in between processing surfaces which are disposed so as to be able to approach to and separate from each other as well as to rotate relative to each other, the fine particle dispersion solution with high dispersion can be obtained comparatively easily.

However, when the liquid phase method is used, the fine particle dispersion solution includes impurities derived from the fine particle raw material solution or from the fine particle separating solvent. Therefore, during a certain period after separation of the fine particles, a high dispersion state can be retained; however, because of these impurities, with a passage of time the fine particles are aggregated in the fine particle dispersion solution to cause precipitation thereof in many instances. In the case where a fluid processing apparatus with a forced thin film type provided with processing surfaces which are disposed so as to be able to approach to and separate from each other as well as to rotate relative to each other, the equipment being described in Patent Literatures 1 and 2, is used, the fine particles immediately after separation thereof have small and uniform particle diameters and are originally highly dispersive, so that in some instances these are highly influenced by aggregation with passage of time.

In general, impurities are removed from the fine particle dispersion solution like this in the way as follows. Namely, the fine particle dispersion solution is concentrated by a method such as centrifugal separation, suction filtration, or filter press, and then, after a washing solution such as pure water is charged to it; the centrifugal separation, the suction filtration, or the like is repeated so as to remove the impurities in the fine particle dispersion solution.

For example, in Patent Literature 3, a purification method for removing by separating ionic impurities included in fine particles is disclosed. In Patent Literature 3, by using membrane filtration, ionic impurities are removed by separation together with a permeated solution to obtain a concentrated fine particle dispersion solution, into which water is added so as to dilute the solution to a certain concentration of the fine particles; and then, the membrane filtration is repeated with a circulation membrane filtration by a cross-flow method so as to purify the fine particles. At this time, by monitoring pH of the permeated solution (namely, washing solution including the removed impurities), progress of removal process of the ionic impurities can be readily confirmed, thereby with this it is considered that a high dispersion is obtained. However, pH of the washing solution including the removed impurities tends not to reflect the dispersion property as the removal process advances. It was found by inventors of the present invention that especially in the dispersion solution including particles whose primary particle diameter is extremely small such as in a level of nanometers, this tendency appears eminently. Further, because there is no mechanism installed to disperse or crush the aggregate, even if purification to a target pH is performed, it is difficult to remove the impurities included in the aggregate; and thus, it has been difficult to obtain a fine particle dispersion solution whose dispersion property is controlled.

CITED LITERATURES

Patent Literatures

Patent Literature 1: Japanese Patent Laid-Open Publication No. 2013-82621
Patent Literature 2: Re-Publication of International Patent Application No. 2009/035019
Patent Literature 3: Japanese Patent Laid-Open Publication No. 2012-206933

DISCLOSURE OF INVENTION

Problems to be Solved by the Invention

Problems to be solved by the present invention is to provide a method for reforming a fine particle dispersion solution with which dispersion property of the fine particles can be effectively controlled.

Inventors of the present invention carried out reformation of the fine particle dispersion solution by using the dispersion solution reformation equipment equipped with a removing unit using a filtration membrane, wherein this reformation included a process to remove the impurities in the dispersion solution by carrying out the filtration with a filtration membrane; and they found that in the stage that amount of the impurities was reduced, for example, by repeating this filtration plural times, the dispersion property was dependent on more on the change of pH of the dispersion solution than the change of the amount of the impurities therein. On the basis of this new information the present invention could be completed.

Namely, in the present invention, amount of the impurities is reduced from a first region till a second pH-dependent region by carrying out the above-mentioned filtration. The second pH-dependent region is the region in which the dispersion property of the fine particles in the dispersion solution is dependent more on pH change of the dispersion solution than the change of the impurity amount in the dispersion solution; on the other hand, the first region is the region in which the impurity amount in the dispersion solution is more than that in the second pH-dependent region. Therefore, provided herein is the method for reforming the fine particle dispersion solution, wherein under the state in which the impurity amount is reduced from the first region till the second pH-dependent region, the dispersion property of the fine particle is controlled by controlling pH of the fine particle dispersion solution.

Meanwhile, the second pH-dependent region does not mean the region in which the dispersion property of the fine particles in the dispersion solution changes only by pH, but the region in which the dispersion property can be more properly controlled by change of pH than the change of the impurity amount in the dispersion solution, so that it also includes the case in which both pH and the impurity amount change.

In order to illustrate a gist of the method for reforming the fine particle dispersion solution of the present invention, the graph of pH and conductivity of the fine particle dispersion solution versus the reformation processing time of the present invention added with the graph of pH and conductivity of the fine particle dispersion solution after pH is adjusted with a pH controlling agent is shown in FIG. 2D. In FIG. 2E, the graph of the impurity concentration in the fine particle dispersion solution and the impurity concentration in the fine particle dispersion solution after pH is adjusted with a pH controlling agent versus the reformation processing time of the present invention are shown. As can be seen in these figures, the conductivity value which represents the impurity concentration and the amount of impurities such as ions decrease significantly during comparatively early stage from start of the processing; and then, after the conductivity reaches 100 μS/cm, the decrease in conductivity becomes slower than the initial washing stage. On the contrary, change of pH in the fine particle dispersion solution is more eminent as compared with the conductivity change even after the conductivity becomes 100 μS/cm or less. On the other hand, though not shown in these graphs, with regard to the washing solution to the fine particle dispersion solution (washing solution including the impurities removed by the filtration), it was confirmed by inventors of the present invention that until the conductivity of the fine particle dispersion solution reached near 100 μS/cm from the initial stage of washing, pH of the washing solution that permeated the filtration membrane also changed, but in the region in which the conductivity of the fine particle dispersion solution became 100 μS/cm or less, pH of the washing solution hardly changed. Therefore, only when pH or the like of only the washing solution is controlled as in the conventional technologies, in some instances the dispersion property of the fine particles could not be controlled in the second pH-dependent region.

As a result of extensive investigation by inventors of the present invention, it was found that as shown in FIG. 2D, in the first region in which the conductivity is more than 100 μS/cm, namely in the initial washing stage, the impurity amount in the fine particle dispersion solution eminently decreases thereby leading to increase in the dispersion property of the fine particles in the fine particle dispersion solution, but in the region in which the conductivity is 100 μS/cm or less (second pH-dependent region), the dispersion property of the fine particles depends more on the change of pH in the dispersion solution rather than the change of the impurity amount in the dispersion solution.

With regard to the boundary between the first region and the second pH-dependent region, the conductivity of 100 μS/cm may be used as the indicator; however, because concentration of the impurities such as ions is reflected in the conductivity, also controlling concentration of the impurities such as ions may be used as the indicator. Because the concentration of the impurities such as ions and the conductivity are different depending on the kind of impurities such as ions as well as whether the ionic species is single or plural, the concentration range thereof is not particularly restricted, whereas in the first region, the concentration of the impurities such as ions is 0.01% or more by weight, while preferably 0.02% or more by weight; and in the second pH-dependent region the concentration of the impurities such as ions is in the range of 0.00005% by weight (0.1 μg/g) to 0.02% by weight (200 μg/g), while preferably 0.0001% by weight (1.0 μg/g) to 0.01% by weight (100 μg/g). Meanwhile, the conductivity in the second pH-dependent region is preferably in the range of 0.1 to 100 μS/cm, while more preferably in the range of 1.0 to 100 μS/cm.

In terms of comparison with the initial value, the first region may be defined as the conductivity change region in which the conductivity of the dispersion solution decreases to 1/100 of the initial value at the start of the processing.

The method of filtration with a filtration membrane is not particularly restricted. For example, the filtration method with a cross flow type may be used. With regard to the filtration membrane, an ultrafiltration membrane may be used.

The pH range after pH of the fine particle dispersion solution is adjusted is different depending on the fine particle dispersion solution or on the composition thereof; however, for example, in the case of anoxide fine particle dispersion solution, pH region is preferably in the range of 6.5 to 8.5. After the pH adjustment, it is also suitable that a concentration process to concentrate the fine particle dispersion solution is carried out so as to bring the concentration of the fine particles therein into the range of 0.1 to 15.0% by weight.

Further, immediately prior to filtration with the filtration membrane, it is also preferable to simultaneously carry out the dispersion process by applying a physical energy to aggregates of the fine particles included in the fine particle dispersion solution thereby dispersing the aggregates as the particles smaller than the aggregate of the fine particles. By so doing, the impurities included in the aggregates are caused to be discharged into the dispersion solution, and before re-aggregation by the impurities takes place entirely, a removal process to remove the impurities from the dispersion solution can be carried out by the removing unit. With this, total amount of the impurities present in the dispersion solution including the fine particles can be reduced. Meanwhile, there is no restriction in the form of the impurities; therefore, the impurities may be in a solid state or in an ionic state.

More specifically, the present invention can be carried out as the method for reforming the fine particle dispersion solution, wherein the impurities comprises in-solution impurities present in the dispersion solution independent of the aggregates and in-particle impurities present in the aggregates, and the method comprises: a discharge process in which the in-particle impurities are discharged from the aggregates to the dispersing solution by the dispersion process thereby changing them to the in-solution impurities; a transportation process in which the dispersion solution after the discharge process is transported to the removing unit before re-aggregation by the in-solution impurities; and the removal process in which the in-solution impurities are removed from the dispersion solution by the removing unit.

In this method, the dispersion process and the removal process can be carried out continuously and repeatedly. In the dispersion process, for example, a rotation type disperser which rotates a stirring blade in the dispersion solution may be used, wherein in order to efficiently apply the physical energy, it is suitable to carry out the dispersion process with setting a circumferential velocity of the stirring blade at 10 m/sec or more.

Primary particle diameter of the fine particle is not particularly restricted, thereby this method can also be applied to the particles having a very fine primary particle diameter. Therefore, the method can be applied to the dispersion solution of the fine particles whose primary particle diameter is, for example, 200 nm or less. Structure of the fine particle is not particularly restricted. For example, the method can be applied to metal fine particles such as a silver-copper metal alloy fine particle, organic substance fine particles such as a curcumin fine particle, and oxide fine particles such as a zinc oxide fine particle or an iron oxide fine particle whose surface is covered with a silicon oxide.

In addition, the fine particles used in carrying out the present invention may be those obtained by breaking down or by building up, whereby there is no particular restriction in origin of the fine particle or of the dispersion solution thereof. In the case of fine particles having the primary particle diameter of a nanometer order, as the efficient and good method for producing the fine particle dispersion solution, one example thereof may be the method including a process wherein a fine particle raw material solution including at least a fine particle raw material therein is mixed with a fine particle separating solvent including at least a fine particle separating substance to separate the fine particle in between processing surfaces which are disposed so as to be able to approach to and separate from each other as well as rotate relative to each other, whereby separating the fine particle in the mixed fluid thus formed. The present invention could provide the method for producing a fine particle dispersion solution having a stable dispersion property by carrying out the method for reforming the fine particle dispersion solution after carrying out the process to obtain this dispersion solution.

In addition, the present invention could provide the method for producing a fine particle dispersion solution having a stable dispersion property by carrying out the method for reforming the fine particle dispersion solution after the process to obtain this dispersion solution.

Advantages

The present invention could provide the method for reforming the fine particle dispersion solution, wherein the dispersion property of the fine particles can be efficiently controlled. In addition, the present invention could provide a method for producing a fine particle dispersion solution, wherein this method is applied with the method for reforming a fine particle dispersion solution as described above.

The present invention is characterized by that under the state in which the impurity amount is reduced till the pH-dependent region, the dispersion property of the fine particles is controlled by controlling pH of the fine particle dispersion solution, wherein the said pH control process may be carried out with continuing the process to remove the impurities by using the dispersion solution reformation equipment, or pH may be controlled, for example, by adding a pH adjusting agent after completion of the removal process. In the case of continuing the process to remove the impurities, there is a merit that the necessity of carrying out an additional process can be reduced; on the other hand, in the case of controlling the pH, there are merit that the process to remove the impurities can be shortened and that if the process to remove the impurities is carried out excessively thereby passing over the pH at which an optimum dispersion property is expressed to the target fine particles resulting in decrease in the dispersion property, the dispersion property thereof can be recovered by applying this method. Alternatively, during the process to remove the impurities, for example, a pH adjusting agent may be added so that the both processes can be carried out simultaneously.

BEST MODES FOR CARRYING OUT THE INVENTION

Figure 1:
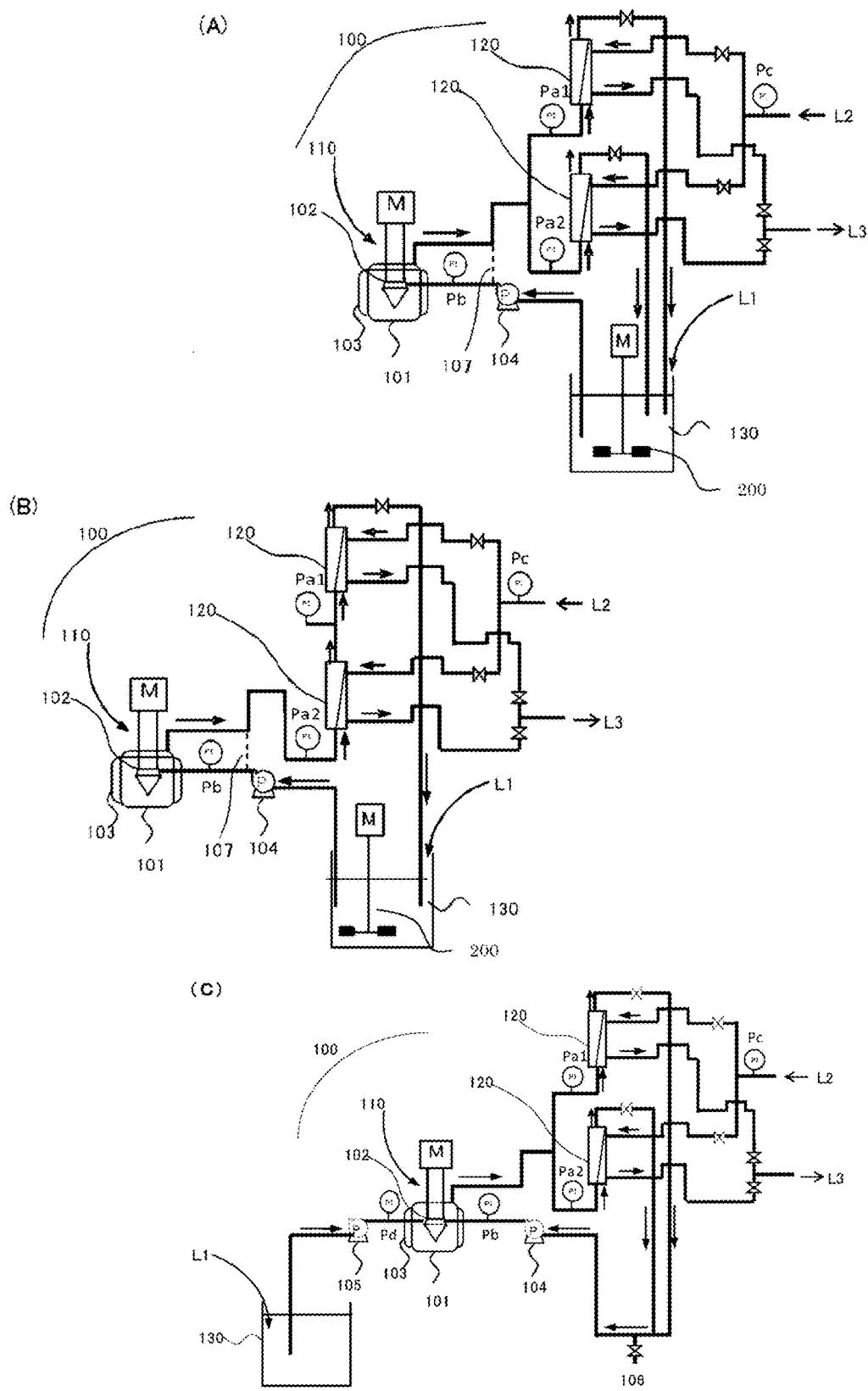
FIG. 1(A) is a rough diagram of the dispersion solution reformation equipment in an embodiment of the present invention; (B) is a rough diagram of the dispersion solution reformation equipment in other embodiment of the present invention; and (C) is a rough diagram of the dispersion solution reformation equipment in still other embodiment of the present invention.

Hereunder, one embodiment of the present invention will be described on the basis of the drawings.

The method for reforming the fine particle dispersion solution of the present invention is carried out by the method provided with the reformation process using the dispersion solution reformation equipment 100 such as those described in FIG. 1(A), FIG. 1(B), and FIG. 1(C). The fine particle dispersion solution to be reformed may be produced or prepared by various methods, wherein it can be produced with, for example, the separation processing equipment described in FIG. 3.

Hereunder, first, the process in which the fine particle dispersion solution is reformed will be described with referring to FIG. 1, and then, the process in which the fine particle dispersion solution is obtained will be described with referring to FIG. 3.

(First Embodiment)

A first embodiment of the present invention is carried out using the dispersion solution reformation equipment 100 as depicted in FIG. 1(A), wherein with this equipment, impurities are removed from the fine particle dispersion solution, and pH and conductivity of the fine particle dispersion solution are controlled. Namely, a physical energy is applied to aggregates of the fine particles included in the fine particle dispersion solution thereby carrying out a dispersion process to disperse the aggregates as smaller particles than the said aggregate of the fine particles, thereby discharging impurities included in the aggregates into the dispersion solution, and before re-aggregation by the impurities takes place entirely, a removal process to remove the impurities from the dispersion solution is carried out by a removing unit. This reformation method repeats: a discharge process in which the impurities included in the aggregates are discharged into the dispersing solution by applying a physical energy to the aggregates of the fine particles included in the fine particle dispersion solution thereby dispersing the aggregates as the particles smaller than the said aggregate of the fine particles; and a removal process in which the dispersion solution after the dispersion process is removed by the filtration membrane before re-aggregation by the impurities takes place entirely, so that the impurity amount can be reduced.

Specifically, the dispersion solution reformation equipment 100 comprises the dispersion processing equipment 110, the removing unit 120 which is equipped with a filtration membrane, and the storing vessel 130, wherein these are connected by a piping system. The dispersion processing equipment 110 has composition elements mainly comprising the dispersing vessel 101 and the disperser 102 which is installed in this vessel.

Figure 3:
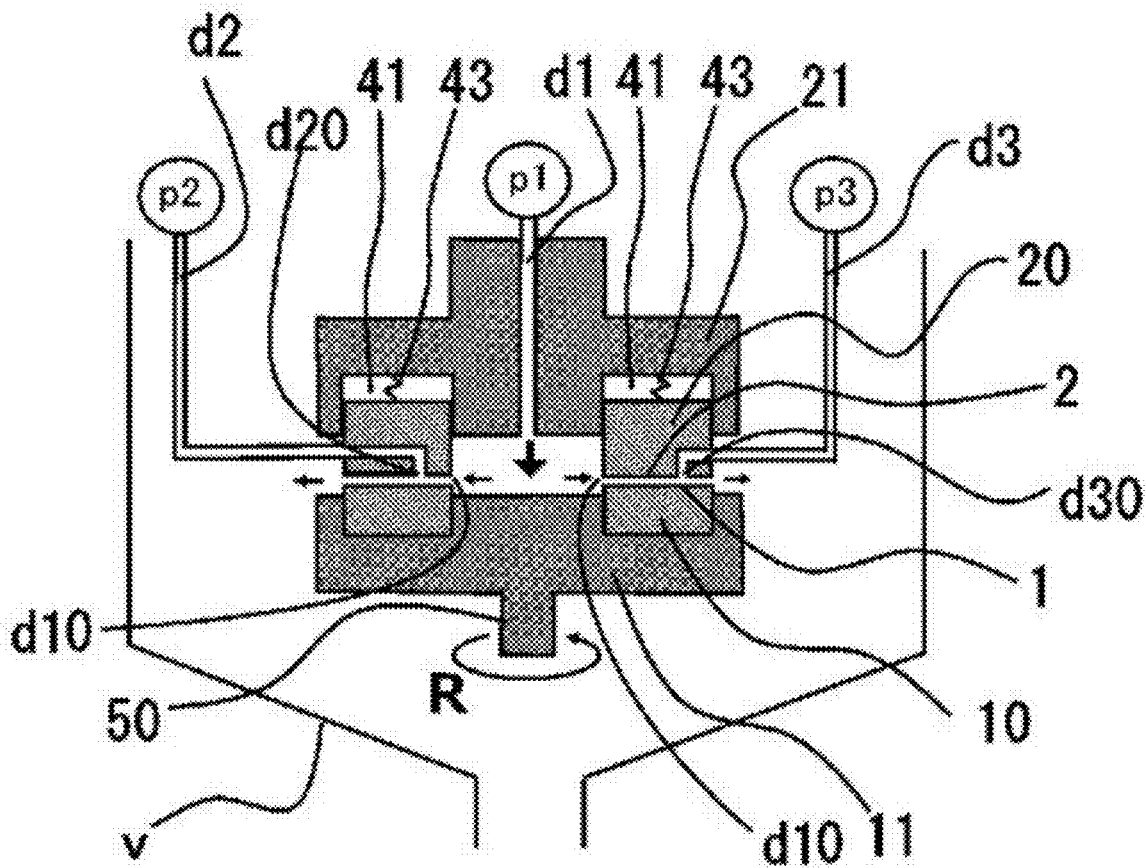
FIG. 3(A) is a rough cross section view of the separation processing equipment relating to the embodiment of the present invention; and (B) is a rough plan view of the first processing surface of the separation processing equipment.
Figure 3:
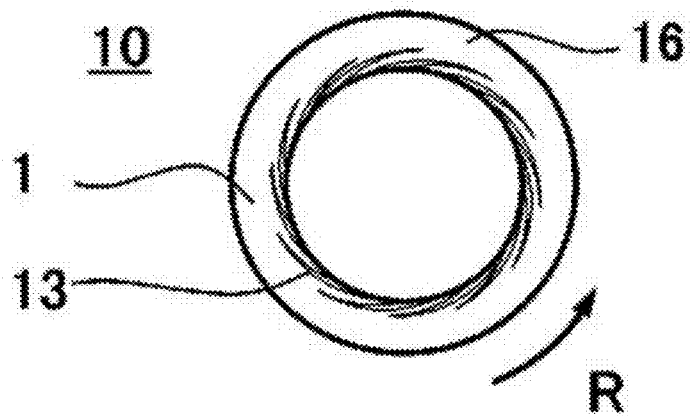

The fine particle dispersion solution L1 formed by the separation processing equipment described in FIG. 3 is charged into the storing vessel 130; and by starting up the pump 104 the fine particle dispersion solution L1 is supplied to the dispersing vessel 101. The fine particle dispersion solution L1 sent by the pump 104 fills the dispersing vessel 101 and overflows so as to be sent to the removing unit 120 which is equipped with the filtration membrane into which the cross-flow washing solution L2 is supplied, whereby the dispersion solution is filtrated. Of the fine particle dispersion solution L1 sent to the removing unit 120, the solution including the impurities after filtration is discharged as the filtrated solution L3 together with the cross-flow washing solution L2, and the rest of it is recharged into the storing vessel 130. Meanwhile, it is preferable that the storing vessel 130 is equipped with the stirrer 200 in order to make concentration of the dispersion solution uniform. The fine particle dispersion solution recharged into the storing vessel 130 is supplied again to the dispersing vessel 101, thereby the dispersion and the removal of the impurities are carried out continuously and repeatedly.

In the fine particle dispersion solution in the present invention, pH and/or conductivity is controlled while the dispersion process is carried out with the disperser 102. Conductivity of the fine particle dispersion solution is preferably 100 μS/cm or less, while more preferably 50 μS/cm or less. The control range of pH can be set to the target pH depending on the fine particle to be processed.

In the present invention, by using the dispersion solution reformation equipment 100 equipped with the removing unit 120 using the filtration membrane, filtration of the fine particle dispersion solution is repeatedly carried out so as to reduce the impurity amount during the period from the first region, which is the dispersing impurity-dependent region, till the second pH-dependent region; and pH of the fine particle dispersion solution is controlled under the state in which the impurity amount is reduced till the second pH-dependent region.

Conductivity in the second pH-dependent region is preferably 100 μS/cm or less, while more preferably 50 μS/cm or less. When pH is controlled in this conductivity range, the dispersion property to the target fine particles can be controlled. With regard to the pH control range, pH can be controlled to the target value depending on the target fine particles.

In the first embodiment, when the impurities are removed by the removing unit 120 that is equipped with the filtration membrane while carrying out the dispersion process by the disperser 102, not only the impurities present in the aggregated fine particles (namely, in-particle impurities, which are the impurities included in the aggregate) can be readily removed, but also surface of each particle can be made to the same and uniform state. Further, after this control, it is also suitable to carry out the concentration process so as to concentrate the fine particles in the fine particle dispersion solution to the concentration range of 0.1 to 15.0% by weight.

Figure 2:
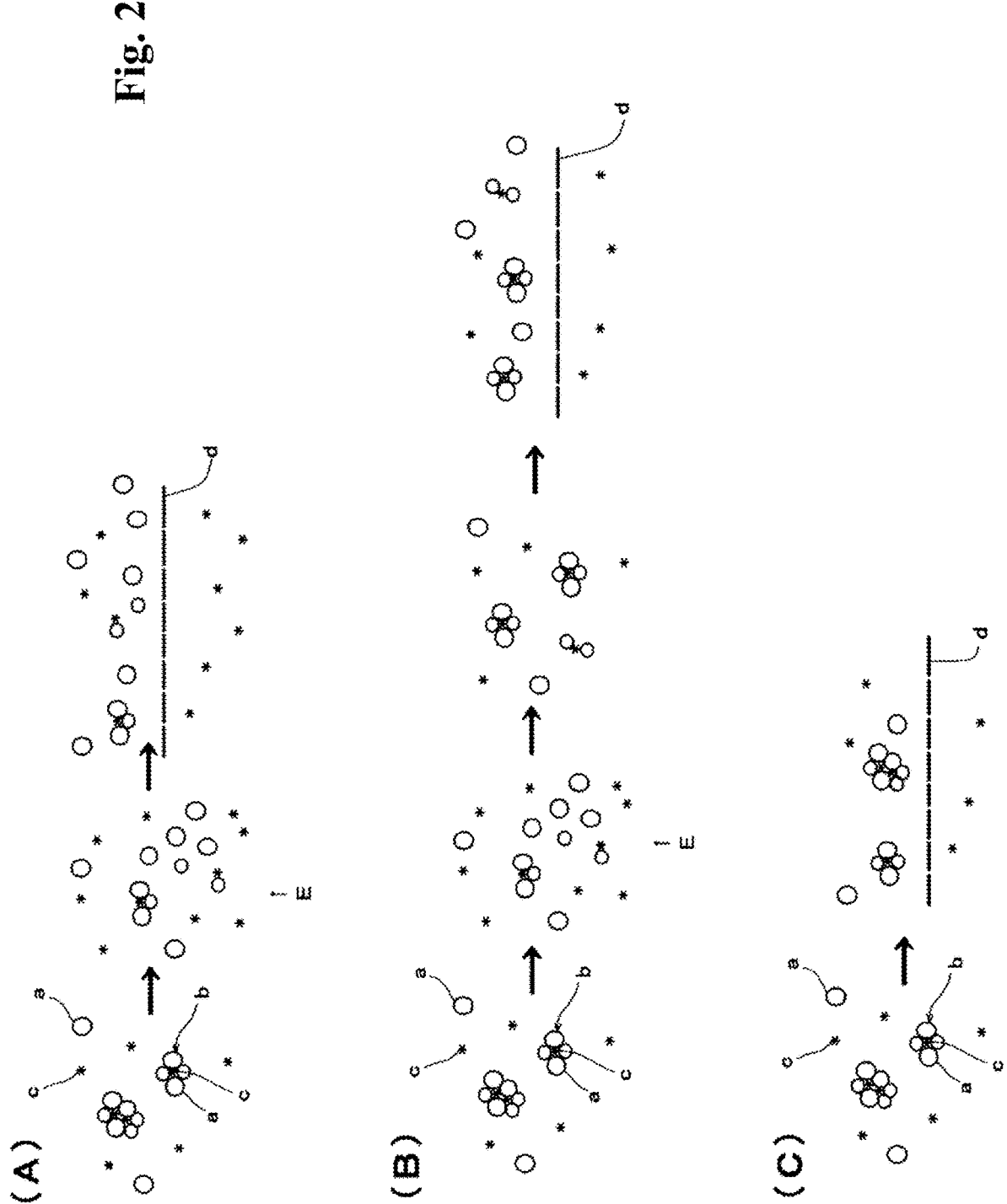
FIG. 2 These are figures illustrating the principle of the method for reforming the dispersion solution of the present invention.

In FIG. 2(A) and FIG. 2(B), principle of the impurity removal is shown when the dispersion solution reformation equipment 100 of the present invention is used. As can be seen in these figures, when the dispersion solution reformation equipment of the present invention is used, the physical energy E of the disperser 102, which is installed in the dispersing vessel 101, is applied especially to the aggregate b of the fine particle a in the dispersion solution, so that the aggregate b is dispersed or crashed temporarily or instantly, thereby the impurities c in the particles are discharged into the dispersion solution. When the fine particle dispersion solution applied with the physical energy E is transported to the removing unit equipped with the filtration membrane immediately after application of the physical energy E, the impurities c discharged into the fine particle dispersion solution removed by the filtration membrane d.

(Second Embodiment)

In the second embodiment of the present invention, only the filtration process is carried out without installing the mechanism such as the disperser 102 which gives the physical energy to the aggregates, as depicted in FIG. 2(C). Specifically, the disperser 102 and the dispersing vessel 101 are removed from the dispersion solution reformation equipment 100 or the by-passing path is formed so as to remove them from the circulation route, so that the fine particle dispersion solution filled in the storing vessel 130 is sent by means of the pump 104 directly to the removing unit 120 in which the filtration is carried out. In this second embodiment, because the aggregates b are sent to the filtration membrane d without being dispersed or crushed, even if the in-solution impurities which are the impurities c present in the solution can be removed, removal of the in-particle impurities which cause the aggregation is difficult or requires a long time, whereas convenience in the equipment and operation can be improved because installation of the disperser 102 is not necessary.

Meanwhile, even in the first embodiment, as illustrated in FIG. 2(B), if the time from the aggregate b is dispersed or crashed by application of the physical energy E to the aggregate b till the resulting dispersion solution is transported to the filtration membrane d is too long, the fine particles a re-aggregate thereby incorporating the impurities c into the aggregate b. In this case, it is difficult to carry out the removal process to remove the in-particle impurities by the filtration membrane d. In addition, the impurities c can cause to aggregate the fine particles a, namely, they can be nuclei of the aggregate b in some instances; therefore, it is preferable to remove the impurities by the filtration membrane d immediately after the impurities c in the particles are discharged into the fine particle dispersion solution by dispersing or crushing the aggregate b. Therefore, the removal process to remove the impurities c from the fine particle dispersion solution is started within 3 seconds, while preferably within 1 second, after the physical energy E is applied to the aggregate b by the disperser 102 in order to discharge the in-particle impurities to the dispersion solution as the in-solution impurities.

The time (T1: second) from the dispersing vessel 101 equipped with the disperser 102 to start of removal of the impurities by the removing unit 120 can be calculated from the formula (1) using the path length (Lea: m), the flow rate (FL: m³/sec), and the pipe's inner diameter (Leb: m).

$$T1 = Lea/(FL/((Leb/2)^2 \times \pi)) \qquad \text{Formula (1)}$$

In addition, by controlling the fluid pressure and the fluid temperature of the fluid flowing through the dispersion solution reformation equipment, the dispersion property of the fine particles in the fine particle dispersion solution can also be controlled. In actual practice, the range of the fluid pressure and the fluid temperature may be arbitrarily chosen in accordance with the dispersion equipment, the disperser, the kind and construction material of the filtration membrane, and the fine particle dispersion solution to be processed.

Next, with referring to FIG. 2D, the relationship of pH as well as conductivity of the fine particle dispersion solution with the dispersion property thereof will be explained more specifically. In the present invention, by filtration with the removing unit using the filtration membrane, the impurity amount is reduced from the first region till the second pH-dependent region. Under the condition in which the impurity amount is reduced till the second pH-dependent region, the dispersion property of the fine particles is controlled by controlling pH of the fine particle dispersion solution.

Figure 2D:
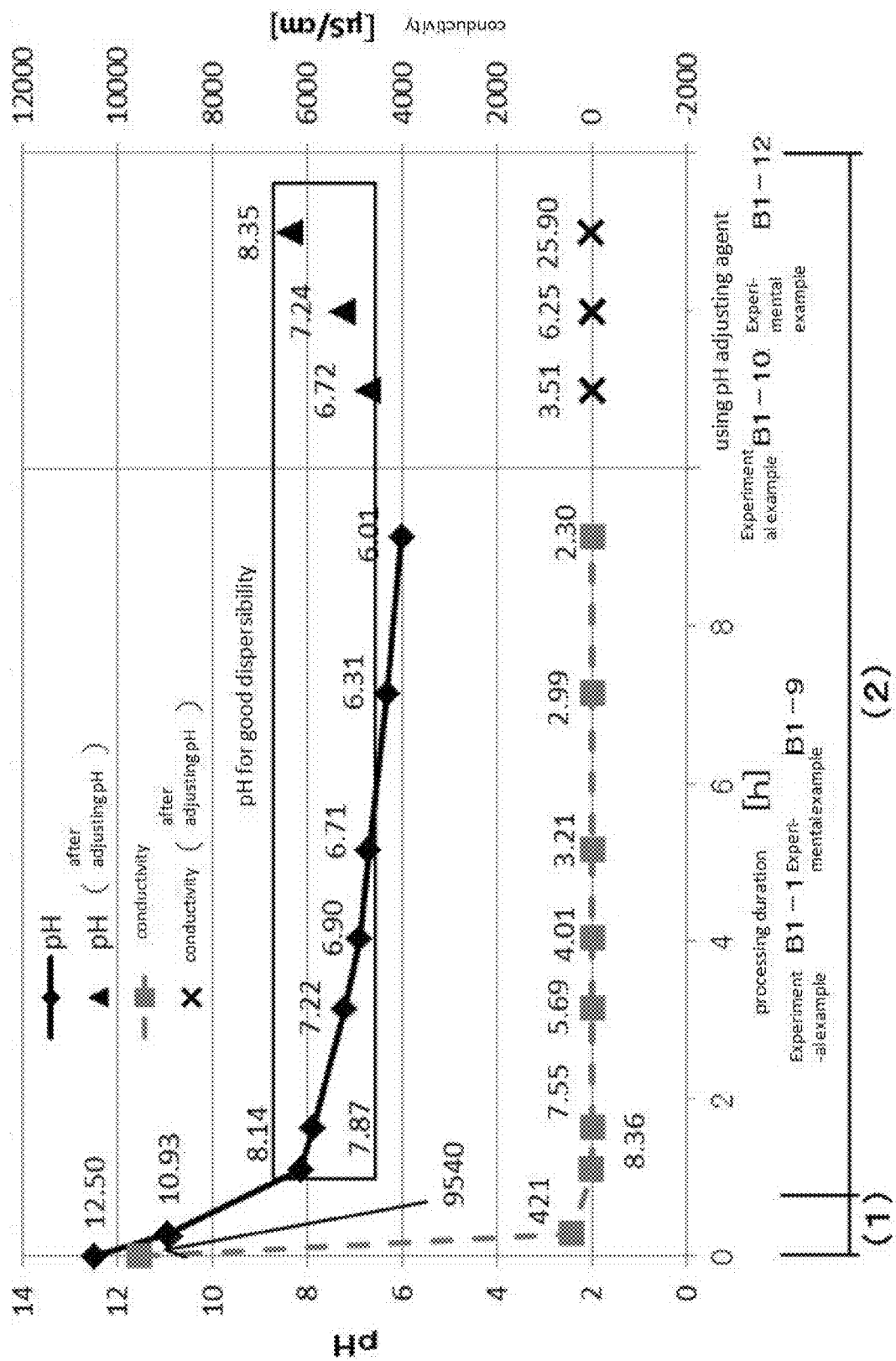
FIG. 2D This is a graph illustrating the principle of the method for reforming the dispersion solution of the present invention.
Figure 2E:
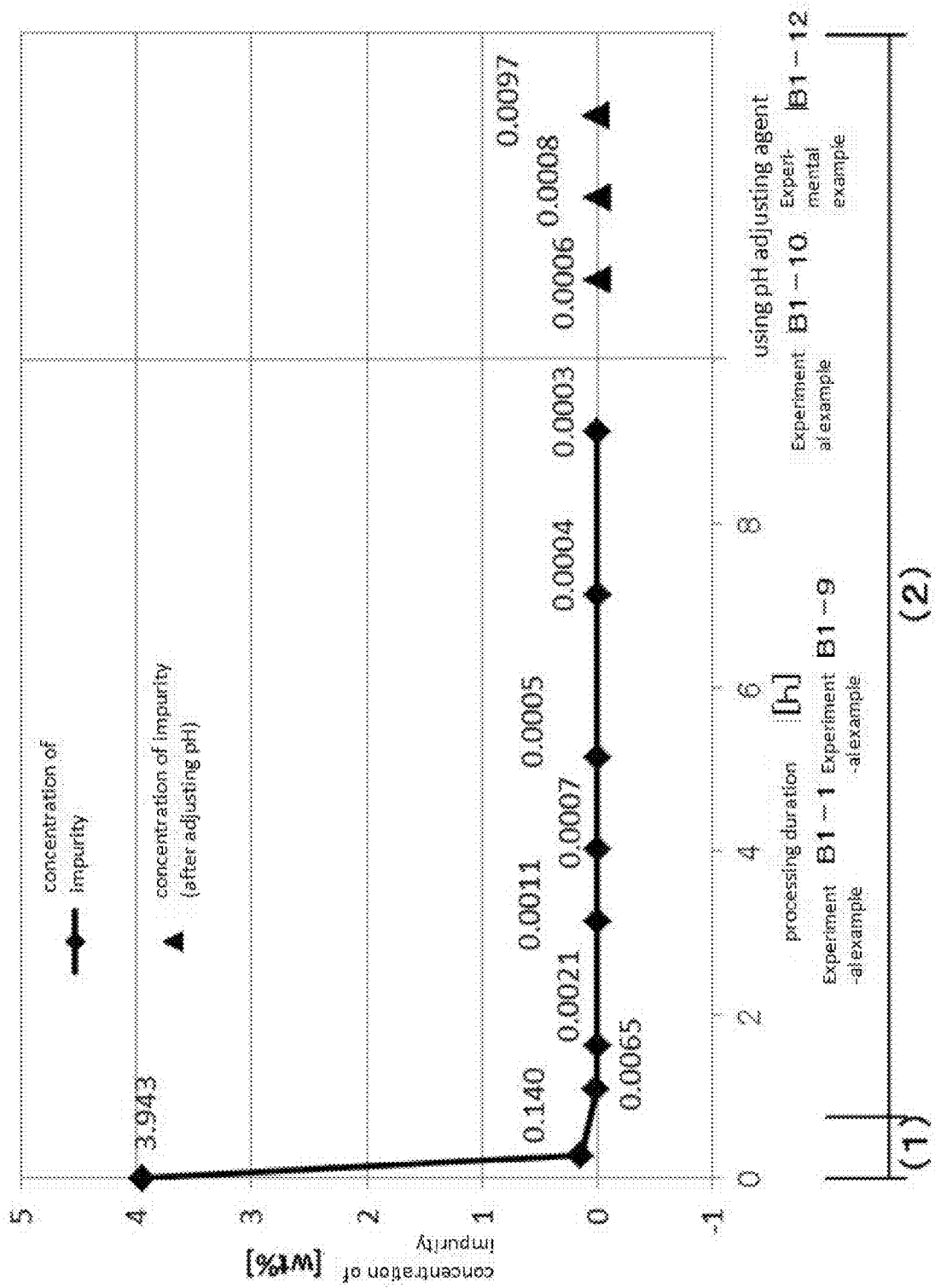
FIG. 2E This is anothergraph illustrating the principle of the method for reforming the dispersion solution of the present invention.

FIG. 2D is the graph which illustrates the above-described situation, and it corresponds to Experimental Examples B1 (see, Table B3) to be described later. In this figure, Experimental Examples B1-1 to B1-9, tagged with the branch numbers sequentially from shorter to longer processing time, show pH and conductivity of the dispersion solution which is filtrated with the removing unit, wherein the horizontal axis shows the processing time of the filtration process. Experimental Examples B1-10 to B1-12 show pH and conductivity of the dispersion solution after pH of the dispersion solution of Experimental Example B1-9 is controlled by a pH adjusting agent. In FIG. 2E, the vertical axis of FIG. 2D is expressed by the impurity concentration in the dispersion solution.

The range shown by (1) is the first region. In the first region (1), the conductivity is decreased from 9540 μS/cm, which is the initial value of Experimental Example B1-1, to about 100 μS/cm in the stage earlier than Experimental Example B1-3 with 8.36 μS/cm, so that this region can be regarded as the conductivity changing region. In the first region (1), pH is also decreased from 12.50 to less than 10. As can be seen in FIG. 2E, it is estimated that the impurity amount in the dispersion solution at this stage is decreased to less than 0.01% by weight from the initial value of 3.943% by weight.

The range shown by (2) is the second pH-dependent region. The second pH-dependent region (2) is the region in which Experimental Examples B1-3 to B1-9 are included, in which the conductivity change stays in the single digits from 8.36 to 2.30 μS/cm, while pH is changed from 8.14 to 6.01. In the second pH-dependent region (2), the impurity amount in the dispersion solution is decreased to 0.0065% or less by weight, but the change amount thereof is very small as compared with the first region (1), so that it can be presumed that the impurity amount in the dispersion solution is sufficiently decreased in the stage of the first region. In the second pH-dependent region (2) including after Experimental Example B1-3 (pH: 8.14, conductivity: 8.36 µS/cm, impurity concentration: 0.0065% by weight), it is presumed that the effect of the impurity amount change in the dispersion solution to the dispersion property is so small that the dispersion property is dependent more on pH than the impurity amount.

This can be supported from following two comparisons: first, comparison of the dispersion solutions of Experimental Examples B1-8 to B1-9 with the dispersion solutions of Experimental Examples B1-3 to B1-7; and second, comparison of the dispersion solution of Experimental Example B1-9 with the dispersion solutions of Experimental Examples B1-10 to B1-12 which are the dispersion solutions after pH of the dispersion solution of Experimental Example B1-9 is controlled by a pH-adjusting agent. In order to explain these two comparisons, the range of "pH with good dispersion property" is shown by the rectangular enclosure in FIG. 2D. The dispersion solutions whose pH belonging to this range are Experimental Examples B1-3 to B1-7 and Experimental Examples B1-10 to B1-12. On the other hand, all the dispersion solutions of Experimental Examples B1-1 to B1-2 and Experimental Examples B1-8 to B1-9, which are outside this range, are poor in the dispersion property (with regard to the dispersion property, see the column of dispersion stability in Table B3 to be described later).

The first comparison is made for those in which the filtration is continuing, wherein the impurities in the dispersion solutions are less in Experimental Examples B1-8 and B1-9 than in Experimental Examples B1-3 to B1-7, the former groups being longer than the later groups in the processing time. However, the dispersion property is better in the dispersion solutions of Experimental Examples B1-3 to B1-7. In the second comparison, Experimental Examples B1-10 to B1-12 are the dispersion solutions after pH thereof are controlled by the pH adjusting agent, wherein the impurity amounts therein are more than that of Experimental Example B1-9. However, as can be seen in the dispersion stability column in Table B3, the dispersion properties thereof are better than that of Experimental Example B1-9, and the dispersion properties of the dispersion solutions thereof are recovered to the level of Experimental Examples B1-3 to B1-7.

From these two comparisons, it can be recognized that in the second pH-dependent region (2), the dispersion property is dependent more on pH than the impurity amount. These are supported not only by the oxide fine particle dispersion solutions in Experimental Examples B but also by the metal fine particle dispersion solutions in Experimental Examples A and the organic substance fine particle dispersion solutions in Experimental Examples C, so that the present invention can be used for various fine particle dispersion solutions. The present invention was completed on the basis of new information common to various fine particle dispersion solutions described above; therefore, the present invention provides the method for reforming the fine particles, wherein the dispersion property is controlled by controlling pH of the fine particle dispersion solution under the state in which the impurity amount is decreased till the second pH-dependent region.

Upon carrying out the reformation method of the present invention, for example, in the case of the oxide fine particle dispersion solution such as Experimental Examples B, it is presumed as follows. Namely, when pH control is carried out in such a way as to obtain pH of 6.5 to 8.5 by the filtration operation, the washing operation, or the pH control, not only an ionic component, etc., which cause formation of the aggregates of the primary particles, can be removed, but also the surface of the primary particles of the fine particles can be made to the state of repulsing to each other, so that the fine particles in the fine particle dispersion solution thereby formed can be secured in a stable dispersion state. As described above, with regard to the fine particles of the target substance, when pH, conductance, or impurity concentration is controlled by the reformation method of the present invention so as to ensure the stable dispersion state, the fine particle dispersion solution which is excellent in the dispersion stability can be prepared.

(Control of pH)

In the present invention, control of pH in the second pH-dependent region may be carried out by adding a substance intending pH adjustment, such as a basic substance, an acidic substance, or a salt of them, or by removal of a basic substance or an acidic substance by membrane filtration or the like, or by both of them. Meanwhile, removal of the basic substance or the acidic substance by membrane filtration may be or may not be accompanied with removal of the impurities.

(Basic Substance)

Illustrative example of the basic substance as the fine particle separating substance includes: metal hydroxides such as sodium hydroxide and potassium hydroxide; metal alkoxides such as sodium methoxide and sodium isopropoxide; amine compounds such as triethylamine, diethylamino ethanol, and diethylamine; and ammonia.

(Acidic Substance)

Illustrative example of the acidic substance as the fine particle separating substance includes: inorganic acids such as aqua regia, hydrochloric acid, nitric acid, fuming nitric acid, sulfuric acid, and fuming sulfuric acid; and organic acids such as formic acid, acetic acid, citric acid, chloroacetic acid, dichloroacetic acid, oxalic acid, trifluoroacetic acid, and trichloroacetic acid.

(Salts)

With regard to the salts described above, the salts obtained by the reaction of the acidic substance and basic substance may be cited. Illustrative example thereof includes sodium chloride, potassium nitrate, calcium acetate, sodium formate, and sodium sulfate.

(Equipment Used in the Process)

Meanwhile, the disperser 102 which is installed in the dispersing vessel 101 is preferably a disperser equipped with a stirring blade, among various dispersers to be described later. Upon processing, as the circumferential velocity of the stirring blade is increased, it helps to increase the number of the aggregates that are dispersed or crushed in the dispersing vessel 101 and also to decrease the size of the aggregates. Therefore, as compared with the case when the circumferential velocity is slow, more amount of the in-particle impurities can be discharged into the solution. Therefore, it is preferable to control the circumferential velocity of the disperser with taking into consideration the filtration membrane's performance which changes depending on the area and construction material of the filtration membrane, as well as the impurity removal performance which is determined depending on the characteristics of the substance to be processed, namely, the removing amount of the impurities per unit time. Specifically, the dispersion process is carried out with the circumferential velocity of the stirring blade preferably at 10 m/sec or more, while more preferably at 15 m/sec or more. When the velocity is set less than 10 m/sec, for example, even if pH of the oxide fine particle dispersion solution is made in the range of 6.5 to 8.5 as described above, there is a case in which the impurities included in the aggregate cannot be removed, or a case in which surface of each particle cannot be made in the same and uniform state; and thus, there are the cases in which the dispersion property and stability of the fine particle dispersion solution such as those obtained by the present invention cannot be obtained.

With regard to the filtration membrane in the present invention, there is no particular restriction, wherein a filtration membrane for general membrane filtration may be used in accordance with the particle diameter of the fine particle to be processed and with intended processing condition; and thus, various filtration membranes including a microfiltration membrane, an ultrafiltration membrane, and a nanofiltration membrane may be used. Although, there is no particular restriction in the form thereof, wherein a hollow fiber type filtration membrane, a tubular type membrane, a spiral type membrane, a flat-type membrane, etc., may be exemplified. There is no particular restriction in the construction material of the filtration membrane either, wherein ceramics such as alumina and titanium oxide, a polysulfone polymer, polymer, a polyester polymer, an aromatic ether polymer, a (meth)acryl polymer, a (meth)acrylonitrile polymer, a fluorinated polymer, an olefinic polymer, a vinyl alcohol polymer, a cellulose polymer, etc., may be exemplified. In accordance with the particle diameter of the fine particle to be processed, impurities, and kind of the solvent which is a dispersion medium, a membrane having suitable construction material, cut-off molecular weight, pore size may be used. Although there is no particular restriction, illustrative example thereof includes G-5 type, G-10 type, G-20 type, G-50 type, PW type, and HWSUF type (all manufactured by DESAL Inc.); HFM-180, HFM-183, HFM-251, HFM-300, HFK-131, HFK-328, MPT-U20, MPS-U20P, and MPS-U20S (all manufactured by KOCH Co.); SPE 1, SPE 3, SPE 5, SPE 10, SPE 30, SPV 5, SPV 50, and SOW 30 (all manufactured by Synder, Inc.); Mike Rosa (registered trademark) UF series (manufactured by Asahi Kasei, Co., Ltd.); NTR 7410 and NTR 7450 (both manufactured by Nitto Denko Corp.); and Cefilt UF (manufactured by NGK Insulators, Ltd.). In addition, an electric dialysis apparatus such as Acilyzer ED (manufactured by ASTOM Corp.) may also be used.

With regard to the disperser of the present invention, a normal rotation type disperser, a high pressure homogenizer, an ultrasonic homogenizer, etc., may be exemplified, wherein it is preferable to carry out the dispersion by using a disperser such as a rotation type disperser which can realize uniform mixing by applying a shear force or the like to a fluid, such as for example, a disperser equipped with a screen which rotates relative to the stirring blade. Illustrative example of the high pressure homogenizer includes Star Burst (manufactured by Sugino Machine, Ltd.), High Pressure Homogenizer HPH (manufactured by IKA Works, Inc.), and HIGH PRESSURE HOMOGENIZER (manufactured by Sanmaru Machinery Co., Ltd.). Illustrative example of the ultrasonic homogenizer includes UX series (Mitsui Electric Co., Ltd.), US-1200 TCVP and SUSH-300T (both manufactured by Nissei Corp.), and UP 200 and UIP 16000 (both manufactured by Hielscher Ultrasonics GmbH). Preferable example of the usable rotation type disperser includes stirrers and dispersers disclosed in Japanese Patent No. 5147091. It is preferable that the rotation type disperser is used in a continuous way; when it is used in a continuous way, supply to and discharge from a stirring tank may be continuous, or the disperser of a continuous type without using the stirring tank may be used, wherein a stirring energy E may be arbitrarily controlled by using heretofore known stirrers or stirring means. Meanwhile, with regard to the stirring energy E, details thereof is described in Japanese Patent Laid-Open Publication No. H04-114725 filed by the present applicant. The methods for stirring and for the dispersion process in the present invention are not particularly restricted; and thus, it may be carried out using a stirrer or dissolver, emulsifier, disperser, homogenizer, etc. with any of various shearing types, a friction type, a high-pressure jet type, an ultrasonic type, etc. Illustrative example thereof includes: continuous type dispersers such as Ultra-Turrax (manufactured by IKA Works, Inc.), Polytron (manufactured by Kinematica AG), TK Homomixer (manufactured by PRIMIX Corporation), Ebara Milder (manufactured by EBARA CORPORATION), TK Homomic Line Flow (manufactured by PRIMIX Corporation), Colloid Mill (manufactured by Shinko Pantec Co., Ltd.), Slasher (manufactured by NIPPON COKE & ENGINEERING CO., LTD.), Trigonal Wet Type Pulverizer (manufactured by Mitsui Miike Chemical Engineering Machinery Co., Ltd.), Cavitron (manufactured by Eurotec, Ltd.), and Fine Flow Mill (manufactured by Pacific Machinery & Engineering Co., Ltd.); and a batch-type disperser or a combination of batch and continuous type disperser, such as Clearmix (manufactured by M. Technique Co., Ltd.), Clearmix Dissolver (manufactured by M. Technique Co., Ltd.), and FILMIX (manufactured by PRIMIX Corporation). Also, the stirring process in which the energy E is applied to the aggregate b is preferably performed by using a stirrer equipped with a high-speed rotating stirring blade as well as a screen outside the stirring blade thereby ejecting the fluid from the screen opening as a jet stream, wherein especially Clearmix (manufactured by M. Technique Co., Ltd.) or Clearmix Dissolver (manufactured by M. Technique Co., Ltd.) mentioned above is preferably used.

(Other Embodiments of the Dispersion Solution Reformation Equipment)

Other embodiments of the dispersion solution reformation equipment 100 in the present invention are illustrated in FIG. 1(B) and FIG. 1(C). In the embodiment illustrated in FIG. 1(B), the removing units 120 equipped with a plurality of the filtration membranes are arranged in series. In this embodiment, the fine particle dispersion solution after the dispersion process in the dispersion processing equipment 110 is processed so as to remove the impurities by a plurality of the filtration membranes, and then returns to the storing vessel 130. In the embodiment illustrated in FIG. 1(C), the storing vessel 130 is connected to the dispersing vessel 101 via the pump 105, wherein the fine particle dispersion solution after filtration by the filtration membrane of the removing unit 120 is sent, without going through the storing vessel 130, to the dispersing vessel 101 whereby carrying out the dispersion process, so that the fine particle dispersion solution circulates without going through the storing vessel 130. The fine particle dispersion solution after this process is sent to the next process or vessel by opening the open/close valve 106 that is arranged in an arbitrary position in the circulation path. Although a drawing is omitted, an alternative embodiment is also possible wherein the removing unit 120 is installed directly to the exit where the fine particle dispersion solution in the dispersing vessel 101 overflows so that the path from the dispersion processing equipment 110 to the removing unit 120 is not substantially installed (Lea=0). Meanwhile, another alternative embodiment is also possible wherein the dispersing vessel 101 in the dispersion processing equipment 110 works as a pipe or the like which does not substantially have a volume while being equipped with the disperser 102 thereby instantly carrying out the dispersion process with the disperser 102 (for example, complete continuous one-pass method) by applying the physical energy E to the fine particle dispersion solution (not illustrated by a drawing). Further, as illustrated in each drawing of FIG. 1, the by-passing path 107 may be arranged so as to form, as necessary, the path through which the dispersion solution repeatedly passes only the removing unit 120 without going through the disperser 102. Namely, the gist of the present invention is that the dispersion property of the fine particles is controlled by controlling pH of the fine particle dispersion solution under the state in which the impurity amount is decreased, so that the dispersion process is not mandatory. Even though it is advantageous for improving dispersion property that the dispersion process and the removal process are carried out continuously, but it is not necessary to continue this continuous process during the entire period of the reformation process of the fine particle dispersion solution. For example, an embodiment may be adopted wherein in the beginning of the processing, the valve to select the path such as a three-way valve (not illustrated in a drawing) is switched over to the by-passing path 107 so as to send the fine particle dispersion solution through the by-passing path 107 only to the removing unit 120 without going through the disperser 102 so as to carry out the removal process by filtrating the impurities previously present in the solution of the fine particles with the filtration membrane; and when amount of the impurities previously present in the solution is decreased, the valve to select the path is switched over to the disperser 102 so as to carry out the afore-mentioned continuous processing; or alternatively, the processing solution may be made to pass through only the removing unit 120 as the post-process of the afore-mentioned continuous processing.

As described above, in view of the economy of the equipment, it is practical to carry out the embodiment in such away that the impurity amount is reduced till the pH-dependent region by passing the fine particle dispersion solution plural times to the same removing unit 120. However, it is also possible to carry out the embodiment, for example, in such a way that a plurality of the removing unit 120 is arranged in series so that the impurity amount is reduced till the pH-dependent region by passing the fine particle dispersion solution only once to each removing unit 120.

(Fine Particles)

The present invention deals with the fine particle dispersion solution having the fine particles dispersed in the dispersion solution, wherein kinds of the fine particle and dispersion solution can be variously changed; and thus, the fine particles obtained by any of breaking-down and building up may be used, in addition, there is no particular restriction with regard to the origin of the fine particles or the dispersion solution thereof. The dispersion solution may be prepared with various ways; for example, fine particles previously prepared may be arbitrarily dispersed into the dispersing solution, wherein various stirrers for mixing may be used according to conventional methods. It is preferable to use the dispersion solution of the fine particles separated by mixing a fine particle raw material solution which is prepared by dissolving or dispersing a fine particle raw material into a solvent (this will be described later) with a fine particle separating solvent. Form of the fine particle may comprise a single element or a plurality of elements; and in addition, a core-shell type fine particle or even an aggregate may be used. Meanwhile, the method for producing the fine particle dispersion solution in the present invention is applied preferably to the fine particle having the primary particle diameter of 200 nm or less, while more preferably to the fine particles having the primary particle diameter of 50 nm or less; however, the application is not only limited to the above-mentioned fine particles, so that the method may also be applied to the fine particle having the primary particle diameter of more than 200 nm. Though different depending on the filtration membrane and the disperser to be used as well as the kinds of the fine particle to be processed and of the dispersing medium, the method may also be used for the fine particles having the primary particle diameter of more than 200 nm and 1 μm or less. In addition, the aggregate having a diameter of 1 μm or more may also be suitable as the particle before the processing.

(Kinds of Fluid and Reaction)

The fine particle in the dispersion solution of the present invention may be various fine particles disclosed in Patent Literatures 1 and 2. With regard to the reaction to obtain the fine particle, various reactions described in Patent Literatures 1 and 2 may be used.

For example, in the case where plural fluids are mixed by charging into processing surfaces, the fluids to be mixed are not particularly restricted. For example, fluid capable of separating fine particles of inorganic substances such as oxides, metals, ceramics, semiconductors, and silica, or fine particles of organic substances such as organic pigments and chemicals may be cited. In many instances, these fine particles form aggregates because these particles are so fine; and thus, these are useful in application of the present invention.

(Fine Particle Raw Material)

In accordance with the kind of the fine particles, various raw materials can be used to produce the fine particles in the present invention, and raw material capable of forming the fine particle by the method such as reaction, crystallization, separation, and co-precipitation may be used. In the present invention, hereunder, this method is described as separation. Here, taking the oxide fine particle as an example, the oxide raw material to be used for preparation of the fine particle thereof is the substance which is a raw material of the fine particle, wherein the substance is, for example, a single element of a metal or of a nonmetal, or a metal compound or a nonmetal compound. The metal in the present invention is not particularly restricted. All the metal elements in the periodic table can be preferably used. The nonmetal in the present invention is not particularly restricted either, wherein illustrative example of the preferable nonmetal element includes B, Si, Ge, As, Sb, C, N, O, S, Te, Se, F, Cl, Br, I, and At. These metals and nonmetals may be a single element thereof, or a metal alloy comprising plural elements, or a substance of a metal element containing a nonmetal element. In the present invention, a compound of the foregoing metals is referred to as a metal compound. There is no particular restriction in the metal compound or the nonmetal compound, wherein illustrative example thereof includes salts or compounds of a metal or a nonmetal, such as oxides, hydroxides, hydroxy oxides, nitrides, carbides, complexes, organic salts, organic complexes, as well as organic compounds, or hydrates or organic solvates of them. There is no particular restriction with regard to the metal salt or the nonmetal salt, wherein illustrative example thereof includes nitrate salts, nitrous salts, sulfate salts, sulfite salts, formate salts, acetate salts, phosphate salts, phosphite salts, hypophosphite salts, chlorides, oxy salts, acetylacetonato salts, as well as hydrates or solvates of them. Illustrative example of the organic compound includes alkoxides of a metal or a nonmetal. These metal compounds and nonmetal compounds may be used singly or as a mixture of a plurality of them.

For example, in the case where the fine particle has iron oxide or zinc oxide as the core thereof, and iron oxide fine particle or zinc oxide covered with silicon oxide as the shell, oxides or hydroxides of iron or zinc, compounds of zinc salts or alkoxides, as well as hydrates of them may be cited as the raw material of the core oxide. Inorganic compounds of zinc or iron such as chlorides, nitrate salts, and sulfate salts, as well as organic compounds of zinc or iron such as alkoxides and acetylacetonato thereof may be cited, though not limited to them. Specific example thereof includes zinc oxide, zinc chloride, zinc nitrate, iron (III) chloride, iron (II) chloride, iron (III) nitrate, iron (III) sulfate, zinc acetylacetonato, iron acetylacetonato, as well as hydrates of them. As the oxide raw material for the shell, oxides or hydroxides of silicon, silicon compounds such as salts or alkoxides thereof, as well as hydrates of them may be cited. Illustrative example thereof includes phenyl trimethoxy silane, methyl trimethoxy silane, methyl triethoxy silane, 3-glycidoxypropyl trimethoxy silane, 3-trifluoropropyl-trimethoxy silane, methacryloxypropyl triethoxy silane, tetramethyl orthosilicate (TMOS), tetraethyl orthosilicate (TEOS) as well as oligomer condensate of TEOS such as ethyl silicate 40, tetraisopropylsilane, tetrapropoxysilane, tetraisobutoxysilane, tetrabutoxysilane, and the like, though not limited to them. In addition, as the oxide raw material for the shell, other siloxane compounds, bis(triethoxysilyl)methane, 1,9-bis(triethoxysilyl)nonane, diethoxy dichlorosilane, triethoxy chlorosilane, etc., may also be used.

In preparation of the fine particle, the fine particle raw material solution containing at least the fine particle raw material is used. When the fine particle raw material is solid, it is preferable to use the fine particle raw material in the molten state or in the state of being mixed with or dissolved into a later-described solvent (including the state of molecular dispersion thereof). Even if the fine particle raw material is a liquid or a gas, this may be used in the state of being mixed with or dissolved into a later-described solvent (including the state of molecular dispersion thereof). Further, the fine particle raw material solution including in the state of dispersion solution or slurry may be used.

There is no particular restriction in the fine particle separating substance in preparation of the above-mentioned fine particle so far as the substance can separate the fine particle raw material as the fine particle, for example, an acidic substance or a basic substance may be used. The acidic substance or the basic substance in preparation of the fine particles is not particularly restricted; same substances used in control of pH in the second pH-dependent region of the fine particle dispersion solution can be used.

(Solvent Used in the Fine Particle Separation/Preparation Solvent)

In preparation of the fine particle, the fine particle separating solvent including at least the fine particle separating substance is used, wherein it is preferable to prepare the fine particle separating solvent by mixing/dissolving/molecular dispersing at least the fine particle separating substance into a solvent. As to the solvent to be used for preparation of the oxide fine particle raw material solution and the oxide fine particle separating solvent, for example, water, an organic solvent, or a mixed solvent comprising plurality of them may be cited. Illustrative example of the water includes tapped water, ion-exchanged water, purified water, ultra-purified water, and RO water. Illustrative example of the organic solvent includes an alcohol compound solvent, an amide compound solvent, a ketone compound solvent, an ether compound solvent, an aromatic compound solvent, a carbon disulfide, an aliphatic compound solvent, a nitrile compound solvent, a sulfoxide compound solvent, a halogenated compound solvent, an ester compound solvent, an ionic liquid, a carboxylic acid compound, and a sulfonic acid compound. These solvents may be used singly or as a mixture of plurality of them. Illustrative example of the alcohol compound solvent includes: monoalcohols such as methanol and ethanol; and polyols such as ethylene glycol and propylene glycol. In addition, as necessary, the aforementioned acidic substance may be mixed in the fine particle raw material solution so far as this does not exert an adverse effect in preparation of the fine particle.

(Preparation Equipment)

The fine particle raw material solution or the fine particle separating solvent mentioned above can be applied to the equipment similar to the dispersion processing equipment used to disperse the fine particles.

(Dispersant, etc.)

In addition, in accordance with the purpose and necessity, various dispersants or surfactants may be used so far as they do not exert an adverse effect in preparation of the fine particles. There is no particular restriction, wherein generally used various dispersants and surfactants which are commercially available goods, products, newly synthesized substances, or the like may be used. Illustrative example thereof includes an anionic surfactant, a cationic surfactant, a nonionic surfactant, and various polymer dispersants. These may be used singly or as a mixture of two or more of them. The surfactant and dispersant may be included in at least any one of the fine particle raw material solution, the fine particle separating solvent, and the raw material solution for a shell; or they may be used as an independent fluid.

(Reaction Method: Separation Processing Equipment)

In the present invention, there is no restriction in the origin of the fine particle, wherein the fine particle dispersion solution can be obtained by a micro reactor illustrated in FIG. 3 as the separation processing equipment.

The separation processing equipment in this embodiment may be realized by the equipment developed by the applicant of the present invention, as disclosed in Patent Literature 1, International Patent Laid-Open Publication No. 2009/008392, and so forth.

This equipment is provided with two processing members, namely, the first processing member 10 and the second processing member 20, wherein the first processing member 10 rotates. The surfaces of both the processing members 10 and 20 which are facing to each other become the respective processing surfaces. The first processing member 10 is provided with the first processing surface 1, and the second processing member 20 is provided with the second processing surface 2. Both the processing surfaces 1 and 2 are connected to the flow paths d1, d2, and d3 of the first, second, and third fluids to be processed, respectively, and they constitute part of the flow path in which the fluids to be processed are sealed. The distance between the processing surfaces 1 and 2 is usually adjusted to a minute distance of 1 mm or less; for example, in the range of about 0.1 μm to 50 μm. By so doing, the fluids to be processed which pass through between the processing surfaces 1 and 2 become a forced thin film fluid forced by both the processing surfaces 1 and 2.

Then, in this separation processing equipment, the first, the second, or the third fluids to be processed are mixed in between the processing surfaces 1 and 2 so as to cause a reaction thereby performing the fluid processing to separate the fine particles.

To more specifically explain, this equipment is equipped with the first holder 11 for holding the first processing member 10, the second holder 21 for holding the second processing member 20, the surface-approaching pressure imparting mechanism 43, the rotation drive mechanism (not shown in the drawing), the first introduction part d10, the second introduction part d20, the third introduction part d30, and the fluid pressure imparting mechanisms p1, p2, and p3.

In the above-mentioned embodiment, the first processing member 10 and the second processing member 20 are disks with ring forms, wherein a space between the first processing member 10 and the second processing member 20 in the upstream side thereof (in this example, the space in the inner circumference side of the ring) constitutes the first introduction part d10, and the fluid to be processed that is introduced from the first introduction part d10 into between the processing surfaces 1 and 2 is discharged outside the processing surfaces 1 and 2 from the downstream side thereof (in this example, the space in the outer circumference side of the ring). The second introduction part d20 and the third introduction part d30 are opened to at least any one of the processing surfaces 1 and 2, whereby the fluids to be processed thereof join to the fluid to be processed that is introduced into between the processing surfaces 1 and 2 from the first introduction part d10 in the midway thereof so that these fluids to be processed are mixed between the processing surfaces 1 and 2. The opening of the third introduction part d30 is located in the downstream side of the opening of the second introduction part d20 (in this example, outside in the radius direction). These fluids to be processed become a forced thin film fluid which tends to move to the downstream side of both the processing surfaces 1 and 2. At this time, by rotating at least any one of the processing members 10 and 20, the mixed fluid to be processed moves spirally from the inside to the outside thereof by a synthetic vector acting on the fluid to be processed, the vector being composed of a moving vector toward the radius direction of the ring and a moving vector toward the circumferential direction.

In the above-mentioned embodiment, the second holder 21 is fixed to the equipment, and the first holder 11 attached to a rotary shaft 50 of the rotation drive mechanism rotates, and thereby the first processing member 10 attached to this first holder 11 rotates relative to the second processing member 20. As a matter of course, the second processing member 20 may be made to rotate, or the both may be made to rotate. In this embodiment, the rotation speed can be set, for example, in the range of 350 to 5000 rpm.

In the above-mentioned embodiment, the second processing member 20 approaches to and separates from the first processing member 10 in the direction of the rotary shaft 50, wherein a side opposite to the second processing surface 2 of the second processing member 20 is accepted in an accepting part 41 arranged in the second holder 21 so as to be able to rise and set. However, in contrast to the above, the first processing member 10 may approach to and separate from the second processing member 20, or both the processing members 10 and 20 may approach to and separate from with each other.

The surface-approaching pressure imparting mechanism is a mechanism to generate a force (hereinafter, surface-approaching pressure) to press the first processing surface 1 of the first processing member 10 and the second processing surface 2 of the second processing member 20 in the direction to make them approach to each other, wherein the mechanism using the spring 43, a fluid pressure, a gravity, or the like may be employed. By the balance (pressure balance) between the surface-approaching pressure and the separating force between the processing surfaces 1 and 2 by the fluid pressure of the first to third fluids to be processed (hereunder, this is referred to as the separating force), the thin film fluid having a minute film thickness ranging from a nanometer order to a micron order is generated with keeping a prescribed minute clearance between the processing surfaces 1 and 2.

Here, as shown in FIG. 1(B), in the first processing surface 1 of the first processing member 10, a groove-like depression 13 extended toward an outer side from the central part of the first processing member 10, namely in a radius direction, may be formed. The depression 13 may be formed in at least any one of the first and second processing surfaces 1 and 2. By forming the depression 13 as mentioned above, the micro-pump effect can be obtained so that the fluid to be processed may be sent into between the first and second processing surfaces 1 and 2.

The introduction parts d20 and d30 are preferably arranged in the position which is opposite to the flat surface 16 without the depression 13. Especially, openings of the introduction parts d20 and d30 are preferably arranged in the position which is opposite to the flat surface 16 and is located in the downstream of the point at which the flow direction of the first fluid to be processed that is introduced by the micro pump effect changes to a spiral and laminar flow direction caused between the processing surfaces. By so doing, mixing of a plurality of fluids to be processed and separation of the fine particles therefrom can be effected under the condition of a laminar flow.

It is preferable that the second introduction part d2 has a direction. For example, introduction directions from the introduction parts d20 and d30 can be slanted with a prescribed elevation angle to the second processing surface 2, so that the second fluid to be processed can be introduced into between the processing surfaces 1 and 2 with suppressing generation of the turbulence to the flow of the first fluid to be processed. Alternatively, introduction from the introduction parts d20 and d30 may have a direction in the plane along the second processing surface 2.

The fluid to be processed that is mixed and then discharged to outside the processing members 10 and 20 is collected as the fine particle dispersion solution into a container (not illustrated in the drawing) via a vessel v, or sent to the dispersion solution reformation equipment 100 illustrated in FIG. 1 without going through the container.

In the separation processing equipment according to the embodiment of FIG. 3(A) with which the core-shell type fine particle is produced, the region between the opening d20 and the opening d30 in the region between the processing surfaces 1 and 2 is the region for separation and formation of the core of the fine particle regarding the core of microparticle. On the other hand, the region in the downstream (outside in the drawing) of the opening d30 in the region between the processing surfaces 1 and 2 is the region for separation of the oxide, i.e., a covering material which becomes the shell. However, separation of the core of the fine particle and separation of the oxide, i.e., a covering material which becomes the shell, take place continuously, so that these two processes may not be completely separated. In other words, even after separation of the covering material which becomes the shell starts, separation or growth of the fine particle which becomes the core may be partially continued.

Although, in the embodiment illustrated in FIG. 3(A), kinds of the fluid to be processed and numbers of the flow path thereof are set to 3 respectively, they may be set to 2; however, in order to separately introduce as other fluid a surfactant, a disperser, or the like, 4 or more of the flow paths may be formed.

In addition, the opening for the introduction part arranged in each processing member is not particularly restricted in its form, size, and number, so that in practice, they may be changed as appropriate. For example, it may be a circular ring form, or plural openings discontinuously arranged in a circular ring, or a single opening.

EXAMPLES

Hereunder, the present invention will be described more specifically by showing Examples. However, the present invention is not limited to Examples described below. As Examples and Comparative Examples, following experiments were carried out. In each Experimental Example, the first fluid to be processed that is introduced from the first introduction part d10 of the separation processing equipment illustrated in FIG. 3(A) is designated as the A-solution; and likewise the second fluid to be processed that is introduced from the second introduction part d20 of the separation processing equipment (B) is designated as the B-solution. In these Examples, the third introduction part d30 was not arranged so that the third fluid to be processed was not used, except for during the time when the fine particle dispersion solutions to perform Experimental Examples C1 to C3 were prepared.
(Outline of Experimental Examples)

In order to show Examples and Comparative Examples of the present invention, following experiments were carried out for the fine particles roughly classified into 3 groups, Experimental Examples A, B, and C. Experimental Examples A relate to reformation of metal fine particle dispersion solutions, wherein in Figures and Tables with regard to Experimental Examples A, numbers starting from A1 are used. Experimental Examples B relate to reformation of organic substance fine particle dispersion solutions, wherein in Figures and Tables with regard to Experimental Examples B, numbers starting from B1 are used. Experimental Examples C relate to reformation of oxide fine particle dispersion solutions, wherein in Figures and Tables with regard to Experimental Examples C, numbers starting from C1 are used.
(Experimental Examples A: Experiments with Regard to Metal Fine Particle (Silver-Copper Metal Alloy Fine Particle) Dispersion Solutions)

Experimental Examples A illustrate reformation of the silver-copper metal alloy fine particle dispersion solution as reformation of the metal fine particle dispersion solution. In Experimental Examples relating to the metal fine particle dispersion solution, effects to enhance the dispersion property of the fine particle are shown.

Results of Experimental Examples A1 are summarized in Table A4-1. The assessment standard of precipitation degree, which shows the dispersion stability in Table A4-1, is as follows.
Assessment A: precipitation was not substantially confirmed at the time passage of 2 weeks.
Assessment B: precipitation was confirmed at the time passage of 2 weeks, but very faintly.
Assessment C: precipitation was confirmed at the time passage of 2 weeks, but a few.
Assessment D: precipitation was confirmed at the time passage of 2 weeks.
Assessment E: much precipitation was confirmed at the time passage of 2 weeks.
Assessment F: very much precipitation was confirmed at the time passage of 2 weeks.

Assessment of the precipitation degree was made by confirming the precipitation with visual observation of the dispersion solution filled in the beaker, by viewing from up, side, and bottom thereof. The above assessments were made by comprehensively judging the height of the precipitation, the brightness and darkness of the precipitation (it is presumed that precipitation is more in the dark precipitation than in the bright precipitation), the variance of the precipitation, and the clear separation to two phases. Meanwhile, these assessments are the same in all of Experimental Examples A, B, and C.
(Experimental Examples A)

As the previous processes before obtaining the dispersion solution, the metal raw material solution and the metal separating solvent each were prepared by using Clearmix (product name: CLM-2.2S, manufactured by M. Technique Co., Ltd.), which is a high speed rotational dispersion emulsifier. Specifically, according to the prescription of the first fluid (A-solution) described in Table A1, each component of the metal raw material solution were uniformly mixed by stirring for 30 minutes at the preparation temperature of 50° C. using Clearmix with the rotation number of the rotor thereof being 20000 rpm to obtain the metal raw material solution. Also, according to the prescription of the second fluid (B-solution) described in Table A1, each component of the metal separating solvent were uniformly mixed by stirring for 30 minutes at the preparation temperature of 45° C. using Clearmix with the rotation number of the rotor thereof being 15000 rpm to obtain the metal separating solvent.

Meanwhile, the substances represented by chemical formula or abbreviation described in Table A1 are $AgNO_3$ for silver nitrate (manufactured by Kanto Chemical Co., Ltd.), $Cu(NO_3)_2 \cdot 3H_2O$ for copper nitrate trihydrate (manufactured by Kanto Chemical Co., Ltd.), EG for ethylene glycol (manufactured by Kishida Chemical Co., Ltd.), HMN for hydrazine monohydrate (manufactured by Kanto Chemical Co., Ltd.), PVP for polyvinyl pyrrolidinone (K=30) (manufactured by Kanto Chemical Co., Ltd.), DMAE for 2-dimethylamino ethanol (manufactured by Kanto Chemical Co., Ltd.), and KOH for potassium hydroxide (product name: Kasei Kari Flake, manufactured by Nippon Soda Co., Ltd.). Pure water with pH of 5.86 (measurement temperature of 18.4° C.) and conductivity of 0.83 μS/cm (measurement temperature of 18.3° C.) was used.

Next, as the process to obtain the dispersion solution, the metal raw material solution and the metal separating solvent, both having been prepared as described above, were mixed by using the separation processing equipment illustrated in FIG. 3(A). In these Experimental Examples, the third introduction part d30 was not arranged, so that the third fluid to be processed was not used (not illustrated in the drawing). Specifically, the metal raw material solution was introduced as the A-solution into between the processing surfaces 1 and 2; and with operating the processing member 10 with the rotation number of 1700 rpm, the metal separating solvent was introduced as the B-solution into the processing surfaces 1 and 2 so as to mix the metal separating solvent and the metal raw material solution in a thin film fluid, whereby the metal fine particles were separated in between the processing surfaces 1 and 2. As a result, the fluid including the metal fine particles (metal fine particle dispersion solution) was ejected from between the processing surfaces 1 and 2 of the separation processing equipment. The ejected metal fine particle dispersion solution was recovered in a beaker via the vessel v.

In Table A2, operation conditions of the separation processing equipment are summarized. The introduction temperatures (supply temperatures) and introduction pressures (supply pressures) of the A-solution and B-solution described in Table A2 were measured by using the thermometers and pressure meters installed in the sealed introduction paths to between the processing surfaces 1 and 2 (first introduction part d1 and second introduction part d2), wherein the introduction temperature of the A-solution in Table A2 is the temperature of the actual A-solution under the introduction pressure in the first introduction part d1, and likewise the introduction temperature of the B-solution in the same table is the temperature of the actual B-solution under the introduction pressure in the second introduction part d2.

Measurement of pH was made by using a pH meter (catalogue No. D-71; manufactured by HORIBA, Ltd.). Before the A-solution and B-solution were introduced into the separation processing equipment, pH of these solutions were measured at the temperatures described in Table A1. Because pH measurement of the mixed fluid immediately after the metal raw material solution was mixed with the metal separating solvent was difficult, the metal fine particle dispersion solution was ejected from the equipment and recovered in the beaker, and then pH thereof was measured at room temperature.

tion, and Experimental Example A1-6 corresponds to Comparative Example of the present invention.

Experimental Examples (A1-3, A1-4, A1-5, A1-7, and A1-8) corresponding to Examples of the present invention are the dispersion solutions in the second pH-dependent region (conductivity of 100 µS/cm or less), in which improvement in the dispersion stability could be observed as compared with the dispersion solution in the first region (conductivity of the dispersion solution obtained in the initial period of reformation is more than 100 µS/cm).

Experimental Example (A1-6) corresponding to Comparative Example of the present invention is the dispersion solution in the second pH-dependent region, but improvement in the dispersion stability could not be observed as compared with the dispersion solution in the first region.

In the process of reforming the dispersion solution, from the metal fine particle dispersion solution which was ejected from the separation processing equipment and then recovered in the beaker, impurities were removed and pH thereof was controlled by using the dispersion solution reformation equipment 100 illustrated in FIG. 1(A). In Table A3 to be described later, the methods and conditions of the reformation process of respective Experimental Examples A1 to A4 of the present invention are summarized. Specifically, first, 5 kg of pure water ((1) in Table A3; pH; 5.86 (measurement temperature of 23.2° C.), conductivity: 0.83 µS/cm (measurement temperature of 23.1° C.)) was charged into the storing vessel 130 illustrated in FIG. 1(A); and then, operation of the pump 104 was started so as to supply the pure

TABLE A1

The prescription of the first fluid (A-solution)

| Prescription | | | | | | | | |
|---|---|---|---|---|---|---|---|---|
| | | | | | | Ag:Cu | pH | |
| Material | [wt %] | Material | [wt %] | Material | [wt %] | [mol ratio] | pH | ° C. |
| AgNo3 | 0.038 | Cu(NO$_3$)$_2$•3H$_2$O | 0.054 | EG | 99.908 | 1:1 | 2.85 | 38.6 |

The prescription of the second fluid (B-solution)

| Prescription | | | | | | | | | | pH | |
|---|---|---|---|---|---|---|---|---|---|---|---|
| Material | [wt %] | Material | [wt %] | Material | [wt %] | Material | [wt %] | Material | [wt %] | pH | ° C. |
| HMH | 20.00 | PVP | 9.75 | DMAE | 5.00 | KOH | 2.55 | Pure water | 7.45 | EG 55.25 | >14 — |

TABLE A2

| | Introduction flow amount ml/min | | Introduction temperatures (supply temperatures) [° C.] | | Introduction pressures (supply pressures) [MPaG] | | Discharged solution | |
|---|---|---|---|---|---|---|---|---|
| Experimental Examples | A solution | B solution | A solution | B solution | A solution | B solution | pH | Temperature |
| A | 1000 | 100 | 148 | 50 | 0.231 | 0.10 | 11.42 | 54.1 |

(Experimental Examples A1)

Among the reformation experiments of the dispersion solutions relating to Experimental Examples A1, Experimental Examples A1-3 to A1-5 and Experimental Examples A1-7 to A1-8 correspond to Examples of the present invention, and Experimental Example A1-6 corresponds to Comparative Example of the present invention.

water into the dispersing vessel 101 equipped with the disperser 102 ((3) in Table A3, Clearmix (product name: CLM-2.2S, rotor: R1, screen: S0.8-48, manufactured by M. Technique Co., Ltd.)), which is the high speed rotational dispersion emulsifier. The pure water sent by the pump 104 filled the dispersing vessel 101 and overflowed therefrom so as to be sent to the removing unit 120, wherein part thereof, together with the cross-flow washing solution, was discharged as the filtrate L3, and the rest thereof was returned to the storing vessel 130. The removing unit 120 equipped with the filtration membrane (hollow fiber type dialyzer; (4) in Table A3, product name; APS-21MD New, membrane area; 2.1 m$^2$, material; polysulfone, manufactured by Asahi Kasei Medical Co., Ltd.) was used, into which the pure water ((2) in Table A3; pH; 5.86 (measurement temperature of 23.2° C.), conductivity: 0.83 μS/cm (measurement temperature of 23.1° C.)) was supplied as the cross-flow washing solution at the flow rate of 1.5 L/minute and the temperature of 21° C.

Next, operation of the disperser 102 was started with setting the rotation number of the rotor thereof to 20000 rpm ((5) in Table A3, circumferential velocity of 31.4 m/sec). When the pure water in the storing vessel 130 was discharged until 1 L (about 1 kg), 3 L (about 3 kg) of the metal fine particle dispersion solution, which was ejected from the separation processing equipment and then recovered in the beaker (hereinafter, this solution is referred to as the metal fine particle dispersion solution), was charged into the storing vessel 130 ((6) and (7) in Table A3). The metal fine particle dispersion solution was mixed with the pure water being circulated in the equipment; and similarly to the pure water mentioned above, this solution was circulated from the vessel to the dispersion processing equipment and to the vessel via the filtration membrane. At this time, in the storing vessel 130, pH of the metal fine dispersion solution was 11.39 (measurement temperature of 25.4° C.) ((8) in Table A3), and the conductivity thereof was 645 μS/cm (measurement temperature of 25.1° C.) ((9) in Table A3) (shown in Experimental Example A1-1 in Table A4-1).

The metal fine particle dispersion solution was dispersed in the dispersing vessel 101, and sent to the removing unit 120, and then filtrated, whereby the filtrate L3 including the impurities was discharged together with the cross-flow washing solution. The metal fine particle dispersion solution sent at the flow rate of 6.4 L/minute by means of the pump 104 ((10) in Table A3) was returned again to the storing vessel 130 at the flowrate of 5.4 L/minute ((11) in Table A3), indicating that the filtrate L3 including the impurities was discharged at the flow rate of 1.0 L/minute through the filtration membrane of the removing unit 120 ((12) in Table A3).

When the metal fine particle dispersion solution in the storing vessel 130 was concentrated to 2.0 L (about 2.0 kg), 3 L (about 3.0 kg) of pure water (pH; 5.86 (measurement temperature of 23.2° C.), conductivity: 0.83 μS/cm (measurement temperature of 23.1° C.)) was charged into the storing vessel 130 ((13) and (14) in Table A3). The operation was continued without changing the condition before, during, and after the charge thereof so as to remove the impurities in the metal fine particle dispersion solution. Between during concentration (2.0 L of the dispersion solution) and during dilution (5 L of the dispersion solution), concentration of the metal fine particles in the metal fine particle dissolution solution fluctuated between 0.1% by weight and 0.20 by weight ((15) in Table A3). With regard to the pressure meters in FIG. 1, both two Pa indicated 0.10 MPaG, Pb indicated 0.15 MPaG, and Pc indicated 0.02 MPaG ((16), (17), and (18) in Table A3). With regard to the just-before transporting path from the dispersing vessel 101 to the removing unit 120, the path length (Lea) was 0.3 m ((19) in Table A3) and the pipe's inner diameter (Leb) was 0.0105 m ((20) in Table A3). The flow rate of the fine particle dispersion solution in the just-before transporting path was 1.2 m/sec ((21) in Table A3), and the time T1 from the dispersing vessel 101 to start of removal of the impurity by the removing unit 120 was 0.24 sec (0.24 seconds) ((22) in Table A3). From the thermometer (not illustrated in the drawing) installed in the dispersing vessel 101, the temperature was in the range of 25 to 29° C. ((23) in Table A3), and the temperature of the metal fine particle dispersion solution in the storing vessel 130 was in the range of 24 to 29° C. ((24) in Table A3) during this processing. Meanwhile, for measurement of conductivity, the conductivity meter (catalogue number; ES-51, manufactured by HORIBA, Ltd.) was used ((25) in Table A3).

TABLE A3

| | | Experimental example A1 | Experimental example A2 | Experimental example A3 | Experimental example A4 |
|---|---|---|---|---|---|
| | Processed liquid | Metal fine dispersion solution: Silver copper alloy nano particle dispersion solution | Same as on the left | Same as on the left | Same as on the left |
| (1) | First solution charged into the storing vessel 130 | Type: Pure Water, pH 5.86 (measurement temperature of 23.2° C.), Conductivity 0.83 μS/cm (measurement temperature of 23.1° C.), Charged amount 5 kg | Same as on the left | Same as on the left | Same as on the left |
| (2) | Type, flow amount, and temperature of the cross-flow washing solution | Type: Pure Water, pH 5.86 (measurement temperature of 23.2° C.), Conductivity 0.83 μS/cm (measurement temperature of 23.1° C.), Flow amount 1.5 L/min, 15° C. | Same as on the left | Same as on the left | Same as on the left |
| (3) | Disperser 102 | Clearmix (product name: CLM-2.2S, rotor: R1, screen: S0.8-48, manufactured by M. Technique Co., Ltd.) | Same as on the left | Same as on the left | Not installed |
| (4) | Removing unit 120 | hollow fiber type dialyzer (product name; APS-21MD New, membrane area; 2.1 m$^2$, material; polysulfone, manufactured by Asahi Kasei Medical Co., Ltd.) | Same as on the left | Same as on the left | Same as on the left |
| (5) | Rotation number of the rotor | 20000 rpm (circumferential velocity of 31.4 m/sec) | 15000 rpm (circumferential velocity of 23.6 m/sec) | 6000 rpm (circumferential velocity of 7.9 m/sec) | — |
| (6) | Starting to charge the metal fine particle dispersion solution | When the pure water in the storing vessel 130 was discharged until 1 L. | Same as on the left | Same as on the left | Same as on the left |

TABLE A3-continued

| | | Experimental example A1 | Experimental example A2 | Experimental example A3 | Experimental example A4 |
|---|---|---|---|---|---|
| (7) | Amount of the metal fine particle dispersion solution charged into the storing vessel 130 | 3 L (≈3 kg) | Same as on the left | Same as on the left | Same as on the left |
| (8) | pH of the metal fine dispersion solution in the storing vessel 130 | 11.39 (measurement temperature of 25.4° C.) | Same as on the left | Same as on the left | Same as on the left |
| (9) | Conductivity of the metal fine dispersion solution in the storing vessel 130 | 645 μS/cm (measurement temperature of 25.1° C.) | Same as on the left | Same as on the left | Same as on the left |
| (10) | Flow amount of the pump 104 | 6.4 L/min | Same as on the left | Same as on the left | Same as on the left |
| (11) | Flow amount of the metal fine dispersion solution returned to the storing vessel 130 | 5.4 L/min | Same as on the left | Same as on the left | Same as on the left |
| (12) | Amount of the filtrate L3 discharged by the removing unit 120 (Calculated value) | 1.0 L/min | Same as on the left | Same as on the left | Same as on the left |
| (13) | Timing of charging the dilution into the storing vessel 130 | When the metal fine particle dispersion solution in the storing vessel 130 was concentrated to 2.0 L (about 2.0 kg). | Same as on the left | Same as on the left | Same as on the left |
| (14) | Type and amount of the second dilution charged into the storing vessel 130 | Type: pure water, 3 L (≈3.0 kg), (pH: 5.86 (measurement temperature of 23.2° C.), conductivity: 0.83 μS/cm (measurement temperature of 23.1° C.)) | Same as on the left | Same as on the left | Same as on the left |
| (15) | Concentration of the metal fine particles in the metal fine particle dissolution solution | Between 0.1 wt % to 0.2 wt % | Same as on the left | Same as on the left | Same as on the left |
| (16) | Pressure meters | Pa: Both two 0.10 MPaG | Same as on the left | Same as on the left | Same as on the left |
| (17) | Pressure meters | Pb: 0.15 MPaG | Same as on the left | Same as on the left | Same as on the left |
| (18) | Pressure meters | Pc: 0.02 MPaG | Same as on the left | Same as on the left | Same as on the left |
| (19) | Path length (Lea) | 0.3 m | Same as on the left | Same as on the left | — |
| (20) | Pipe's inner diameter (Leb) | 0.0105 m | Same as on the left | Same as on the left | — |
| (21) | Flow rate of the fine particle dispersion solution in the just-before transporting path | 1.2 m/sec | Same as on the left | Same as on the left | — |
| (22) | Time T1 from the dispersing vessel 101 to start of removal of the impurity by the removing unit 120 | 0.24 sec | Same as on the left | Same as on the left | — |
| (23) | thermometer installed in the dispersing vessel 101 | From 25° C. to 29° C. | Same as on the left | Same as on the left | Same as on the left |
| (24) | temperature of the metal fine particle dispersion solution | From 24° C. to 29° C. | Same as on the left | Same as on the left | Same as on the left |
| (25) | Conductivity meter | Conductivity meter (catalogue number; ES-51, manufactured by HORIBA, Ltd.) | Same as on the left | Same as on the left | Same as on the left |

During the time of continuing the above process, part of the metal fine particle dispersion solution was withdrawn from the storing vessel 130 at an interval; and these are designated as Experimental Examples A1-1 to A1-6, and the dispersion solutions obtained by adding a pH adjusting agent to the metal fine particle dispersion solution of Experimental Example A1-bare designated as Experimental Examples A1-7 and A1-8. Concentration of the metal fine particles in all the metal fine particle dispersion solutions of Experimental Examples A1-1 to A1-8 was 0.2% by weight as the silver-copper metal alloy. In Table A4-1, pH, conductivity, and concentration of impurities in the metal fine particle dispersion solution during reformation process of the metal fine particle dispersion solution are summarized. Meanwhile, impurities in Experimental Examples A are KOH, $KNO_3$, HMH, and DMAE. They are analyzed with an inductively coupled plasma emission spectroscopy method (ICP), a gas chromatography method (GC), and an ion chromatography method (IC); and the results thereof are summarized in Table A4-1 as the total impurity amount. In all of Experimental Examples A, the impurity concentrations were calculated with the same methods.

As can be seen in Table A4-1, by carrying out the reformation process, pH and conductivity of the metal fine particle dispersion solution approached almost the same values as those of the cross-flow washing solution and the pure water charged into the storing vessel 130. In each of Experimental Examples A1-1 to A1-8, part of the withdrawn metal fine particle dispersion solution was diluted, and this diluted solution was dropped onto a collodion film and dried in an atmosphere for 4 hours to obtain the sample for TEM observation.

2 weeks of the static state after the withdrawal decreased, whereby the precipitation could not be substantially confirmed, from the precipitation thereof at 1 week of the static state after the withdrawal. When pH of the metal fine particle dispersion solution was controlled in the range of 6.5 to 8.5, the dispersion property of the metal fine particles included in the metal fine particle dispersion solution could be enhanced; and when pH of the metal fine particle dispersion

TABLE A4-1

| Experimental Example | Processing duration [h] | pH | | Conductivity | | Concentration of impurity [wt %] | pH after preparation | | Conductivity after preparation | | Dispersion Stability | |
|---|---|---|---|---|---|---|---|---|---|---|---|---|
| | | pH | [° C.] | [μS/cm] | [° C.] | | pH | [° C.] | [μS · cm] | [° C.] | initial precipitation confirmation time | Precipitation degree |
| A1-1 | 0.00 | 11.39 | 25.4 | 645 | 25.1 | 2.554 | — | — | — | — | 0.5 hour | F |
| A1-2 | 0.25 | 10.21 | 25.4 | 216 | 25.4 | 0.264 | — | — | — | — | 1 hour | F |
| A1-3 | 0.50 | 8.14 | 25.8 | 9.46 | 25.9 | 0.0035 | — | — | — | — | 1 week | B |
| A1-4 | 1.00 | 7.77 | 26.1 | 6.54 | 26.4 | 0.0021 | — | — | — | — | 1 week | B |
| A1-5 | 1.50 | 6.98 | 27.4 | 5.15 | 26.9 | 0.0009 | — | — | — | — | 1 week | A |
| A1-6 | 2.00 | 5.97 | 28.1 | 1.16 | 28.2 | 0.0004 | — | — | — | — | 0.5 hour | F |
| A1-7 | Adjusting pH of dispersion solution of Experimental Example A1-6 by using pH adjusting agent | | | | | 0.0007 | 6.73 | 25.1 | 4.16 | 25.3 | 1 week | A |
| A1-8 | Adjusting pH of dispersion solution of Experimental Example A1-6 by using pH adjusting agent | | | | | 0.0014 | 7.74 | 25.6 | 5.94 | 25.6 | 1 week | B |

(Dispersion Stability and Self-Dispersion Property)

In the metal fine particle dispersion solutions of Experimental Examples A1-1 and A1-2, precipitation was confirmed at the time described in the initial precipitation confirmation time in Table A4-1, wherein it was confirmed that the dispersion solution was separated into the phase including the metal fine particles and the phase not substantially including the metal fine particles. Meanwhile, the initial deposition confirmation time is the time when precipitation of the fine particles was confirmed for the first time after the pH control was started with addition of the pH adjusting agent to the dispersion solution withdrawn during the reformation process. This assessment method is all the same in Experimental Examples A, B, and C to be described later. In Experimental Examples A1-3 and A1-4, precipitation of the metal fine particles was faintly observed at 1 week of the static state after the withdrawal. In the metal fine particle dispersion solution of Experimental Example A1-5, precipitation of an extremely minute amount of the metal fine particles was observed at 1 week of the static state after the withdrawal, but the precipitation amount thereof was about 0.1% by weight relative to the metal fine particles included in the dispersion solution. However, with regard to the metal fine particle dispersion solution of Experimental Example A1-6 prepared with the prolonged processing time from Experimental Example A1-5, precipitation of the metal fine particles was clearly observed at 0.5 hours of the static state after the withdrawal, wherein it was confirmed that the phase including the metal fine particles and the phase not substantially including the metal fine particles were separated. It became clear that the dispersion property of the metal fine particles in the metal fine particle dispersion solution can be controlled by controlling pH or conductivity thereof on the basis of the processing time of the metal fine particle dispersion solution using the dispersion solution reformation equipment of the present invention. Furthermore, with regard to Experimental Example A1-5, it was confirmed that the precipitation of the metal fine particles at 2 weeks of the static state after the withdrawal decreased, whereby the precipitation could not be substantially confirmed, from the precipitation thereof at 1 week of the static state after the withdrawal. When pH of the metal fine particle dispersion solution was controlled in the range of 6.5 to 8.5, the dispersion property of the metal fine particles included in the metal fine particle dispersion solution could be enhanced; and when pH of the metal fine particle dispersion solution was controlled in the range of 6.5 to 7.5, in the metal fine particles of the metal fine particle dispersion solution, the precipitation once generated at 1 week of the static state was re-dispersed without carrying out any dispersion process, so that it was presumed that the dispersion solution included the metal fine particles having self-dispersion property.

(Adjustment of pH after Completion of Dispersion Process and Removal Process)

An aqueous 0.05% by weight of ammonia solution was added as the pH adjusting agent into the metal fine particle dispersion solution of Experimental Example A1-6, and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain Experimental Examples A1-7 and A1-8. The results of Experimental Examples A1-7 and A1-8 are summarized in Table A4-1. Experimental Example A1-7 in which pH was adjusted at 6.73 (measurement temperature of 25.1° C.) and conductivity at 4.16 μS/cm (measurement temperature of 25.3° C.) exhibited similar dispersion stability and self-dispersion property to those of the metal fine particle dispersion solution of Experimental Example A1-5.

Experimental Example A1-8 in which pH was adjusted at 7.74 (measurement temperature of 25.6° C.) and conductivity at 5.94 μS/cm (measurement temperature of 25.6° C.) exhibited similar dispersion stability and self-dispersion property to those of the metal fine particle dispersion solutions obtained under the conditions of Experimental Examples A1-3 and A1-4.

(Assessment of Dispersion Property: TEM Observation)

Figure 4:
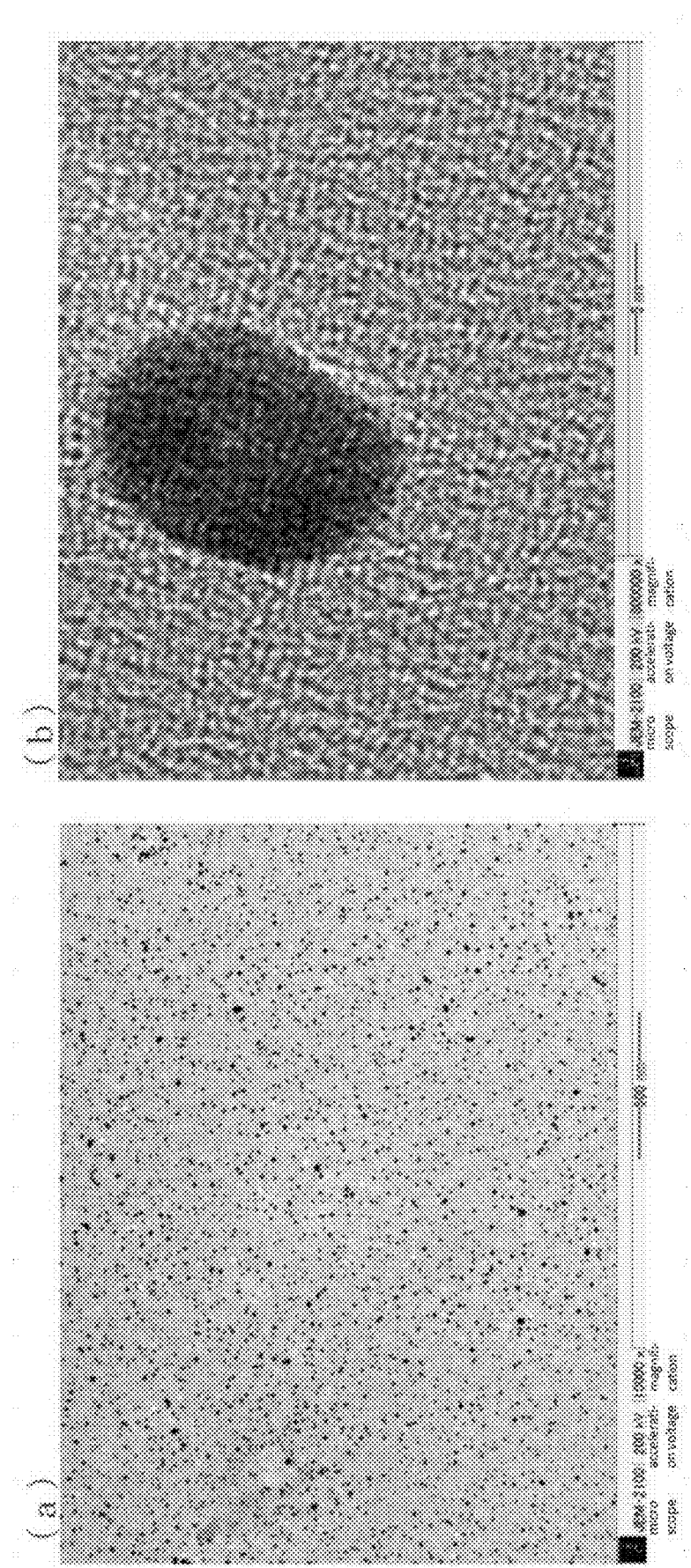
FIG. 4 These are the TEM pictures of the fine particles in the fine particle dispersion solution obtained in Experimental Example A1-5 of the present invention. Meanwhile, (a) and (b) are the observation results with the magnification of 10000 and 800000, respectively.

The TEM pictures of the metal fine particles in the metal fine particle dispersion solution of Experimental Example A1-5 are shown in FIG. 4. From the TEM picture with the magnification of 10000 in FIG. 4(a), it was confirmed that the metal fine particles were uniformly dispersed. From the TEM picture with the magnification of 800000 in FIG. 4(b), it was confirmed that the primary particle's diameter thereof was about 10 nm. Similar results were obtained in the metal fine particles obtained under the condition of Experimental Example A1-7 (not shown by the drawing). Meanwhile, the TEM observation in Experimental Examples A was made by using the transmission electron microscope (JEM-2100, manufactured by JEOL Ltd.), wherein dispersion property of the metal fine particle dispersion solution was assessed under the observation conditions with the acceleration voltage of 200 kV and the observation magnification of 10000 or more.

Figure 5:
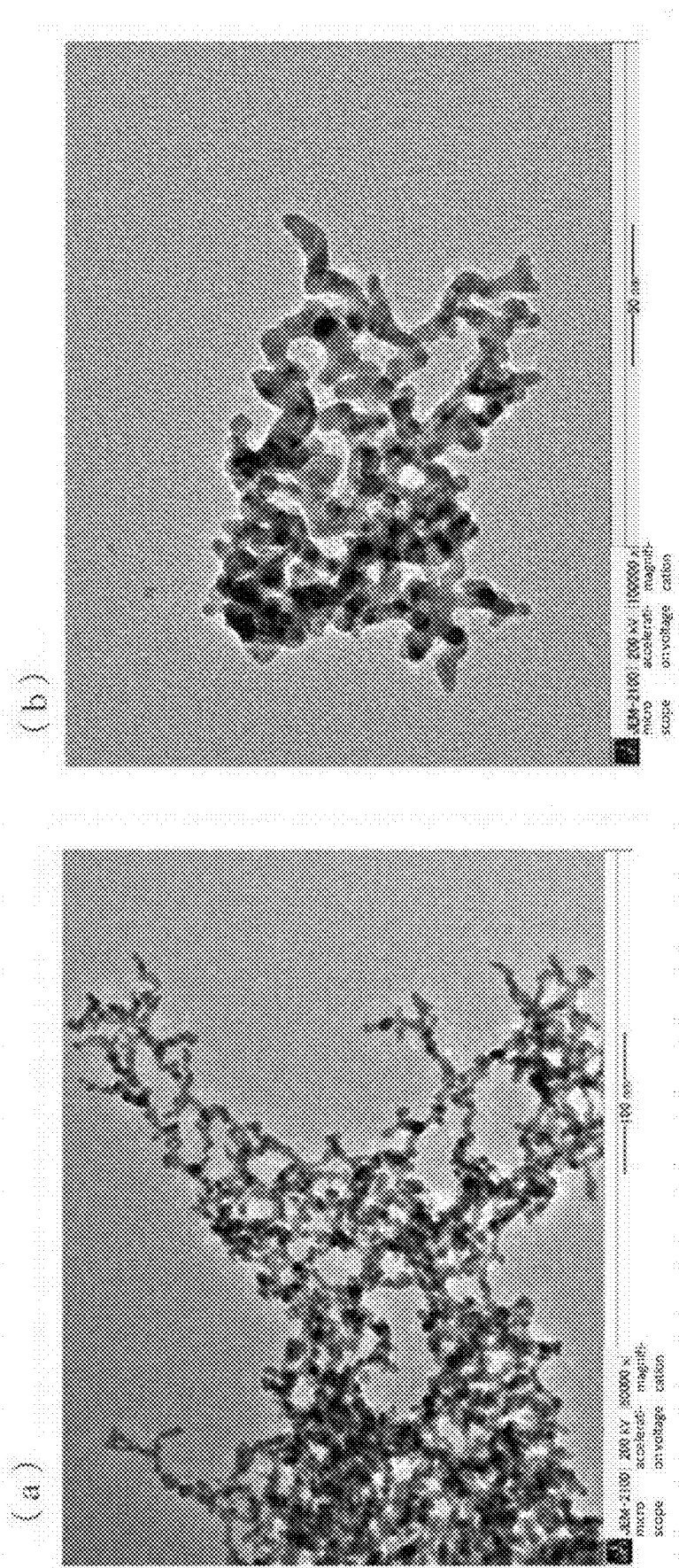
FIG. 5 These are the TEM pictures of the fine particles in the fine particle dispersion solution obtained in Experimental Example A1-6 of the present invention. Meanwhile, (a) and (b) are the observation results with the magnification of 50000 and 100000, respectively.

The TEM pictures of the metal fine particles obtained under the condition of Experimental Example A1-6 are shown in FIG. 5. From the TEM pictures with the magnification of 50000 shown in FIG. 5(a) and with the magnification of 100000 shown in FIG. 5(b), it was observed that as compared with Experimental Example A1-5, the metal fine particles aggregated with more number of the aggregates.

Figure 6:
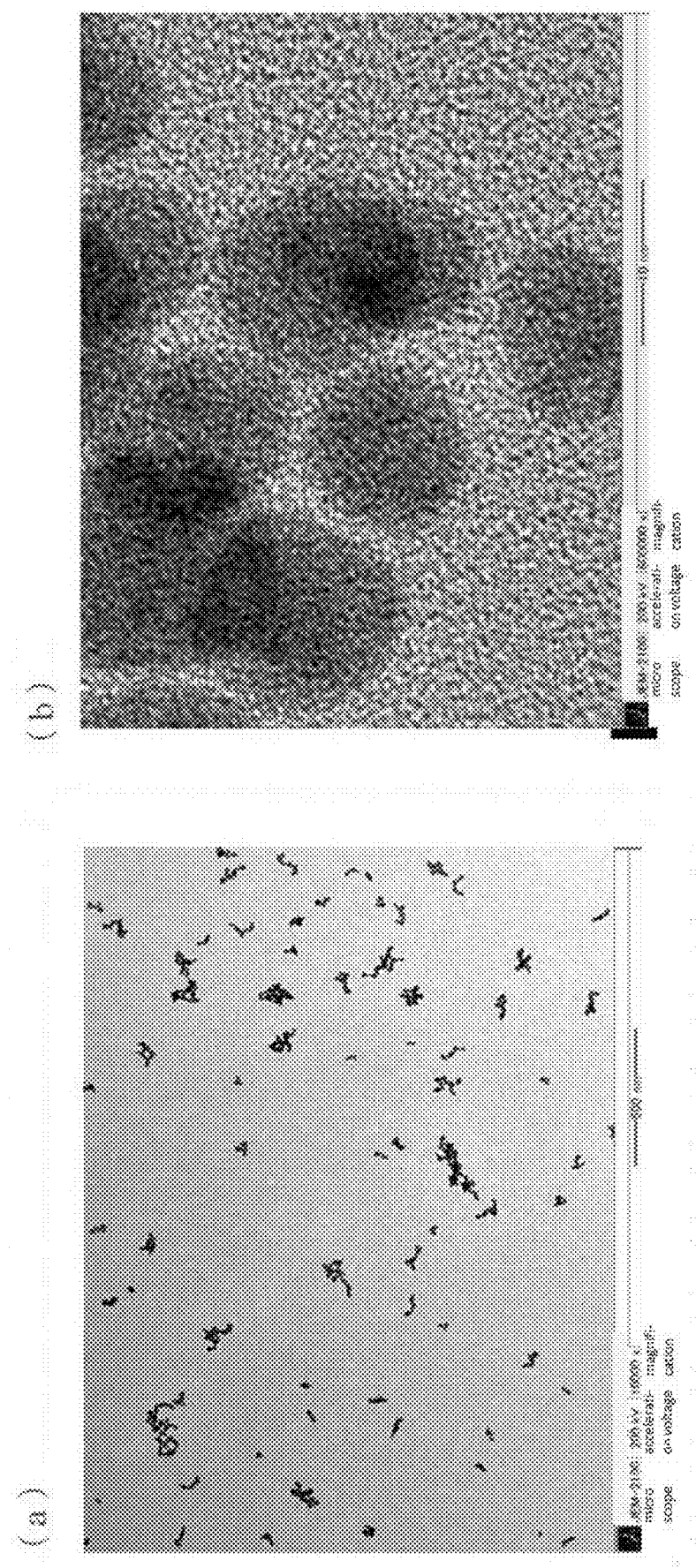
FIG. 6 These are the TEM pictures of the fine particles in the fine particle dispersion solution obtained in Experimental Example A1-4 of the present invention. Meanwhile, (a) and (b) are the observation results with the magnification of 10000 and 600000, respectively.

The TEM pictures of the metal fine particles obtained under the condition of Experimental Example A1-4 are shown in FIG. 6. From the TEM pictures with the magnification of 10000 shown in FIG. 6(a) and with the magnification of 600000 shown in FIG. 6(b), it was observed that the metal fine particles aggregated more as compared with Experimental Example A1-5; however, number of the aggregates thereof was less as compared with the metal fine particles obtained under the condition of Experimental Example A1-6, and the metal fine particles were dispersed uniformly. Similar results were obtained in the metal fine particles of Experimental Examples A1-3 and A1-8 (not shown by the drawing).

The TEM pictures of Experimental Examples A1-1 and A1-2 were taken immediately after start of the washing process of the metal fine particle dispersion solution; therefore, not only aggregates of the metal fine particles similar to those of Experimental Example A1-6 but also impurities (KOH, $KNO_3$, etc.) were observed (not shown by the drawing). Also, a 0.01% by weight of aqueous nitric acid solution was charged into the metal fine particle disperse solution of each of Experimental Examples A1-1 and A1-2, and the resulting mixture was dispersed using Clearmix (product name: CLM-2.2S, rotor: R1, screen: S0.8-48, manufactured by M. Technique Co., Ltd.) at 20000 rpm for 30 minutes to obtain the metal fine particle dispersion solution whose pH was in the range of 6.5 to 8.5; however, within 1 hour after the preparation, it was confirmed that the dispersion solution was separated into the phase including the metal fine particles and the phase substantially not including the metal fine particles; and thus, the metal fine particle dispersion solution exhibiting the dispersion property and stability equivalent to those of Experimental Examples A1-3 to A1-5 and Experimental Examples A1-7 to A1-8 could not be prepared. This is presumably because conductivities of the metal fine particle dispersion solutions of Experimental Examples A1-1 and A1-2 are 100 µS/cm or more, the impurities therein could not be removed till the second pH-dependent region.

(Concentration Process)

By using the metal fine particle dispersion solutions of Experimental Example A1-5 and of Experimental Example A1-6 which corresponds to Comparative Example of the present invention, concentration experiments were carried using the equipment used in Experimental Examples A1. Specifically, without charging a diluting solution into the storing vessel 130, concentration of the dispersion solution in the storing vessel 130 was carried out only by discharging the filtrate L3 with the removing unit 120. The metal fine particle dispersion solution of Experimental Example A1-5 in which high dispersion stability could be obtained could be concentrated to 3.3% by weight as silver-copper metal alloy; on the other hand, the metal fine particle dispersion solution of Experimental Example A1-6 which corresponds to Comparative Example of the present invention could not be concentrated because the filtration membrane of the removing unit 120 was clogged during concentration. With regard to Experimental Examples A1-3 and A1-4, too, concentration could be carried out similarly to Experimental Example A1-5; and thus, with regard to the dispersion solution having good dispersion property of the fine particles in the fine particle dispersion solution, it became clear that the concentration process to concentrate the fine particle dispersion solution could be carried out after the process to remove the impurities with the filtration membrane.

From the results shown above, it was found that the impurity amount decreases rapidly in the first region in which the conductivity of the metal fine particle dispersion solution is higher than 100 µS/cm from the initial value, but in the second pH-dependent region in which the conductivity thereof is 100 µS/cm or less, the change in the impurity amount is so small that the dispersion property of the metal fine particle dispersion solution is dependent more on the change of pH in the metal fine particle dispersion solution than the change of the impurity amount therein. In addition, it was found that in the second pH-dependent region, the dispersion property of the metal fine particle dispersion solution can be controlled by controlling pH of the dispersion solution. Further, in the case in which the metal fine particle dispersion solution is prepared by using the equipment comprising the disperser and the equipment with which the impurities are removed from the metal fine particle dispersion solution by using the filtration membrane with a cross flow method, it was found that the dispersion stability is improved by bringing the pH of the metal fine particle dispersion solution into the range of 6.5 to 8.5. In addition, it was found that for example, even with regard to the metal fine particle dispersion solution whose pH is made to 5.97 (Experimental Example A1-6 which corresponds to Comparative Example of the present invention), the dispersion stability is improved by readjusting the pH in the range of 6.5 to 8.5 (Experimental Examples A1-7 and A1-8).

In Experimental Examples A2 and A3, the reformation process was carried out by the same method as that of Experimental Examples A1, except that the rotation number of the disperser 102 (Clearmix) in Experimental Examples A1 was changed. Experimental Examples A4 were carried out by the same method as that of Experimental Examples A1, except that the disperser 102 and the dispersing vessel 101 in the equipment illustrated in FIG. 1(A) were removed, thereby the filtration was carried out by directly sending the metal fine particle dispersion solution filled in the storing vessel 130 to the removing unit 120 by using the pump 104. The rotation number of the disperser in Experimental Examples A2 was changed to 15000 rpm (circumferential velocity of 23.6 m/sec), and that of Experimental Examples A3 was changed to 6000 rpm (circumferential velocity of 7.9 m/sec, Experimental Examples A3), but the path length (Lea), the pipe's inner diameter (Leb), and the flow rate of the fine particle dispersion solution in the just-before transporting path from the dispersing vessel 101 to the removing unit 120, as well as the time T1 from the dispersing vessel 101 to start of removal of the impurity with the removing unit 120 were set to the same as those of Experimental Examples A1. The conditions of Experimental Examples A2, A3, and A4 are summarized in Table A3; the results of Experimental Examples A2 are summarized in Table A4-2, the results of Experimental Examples A3 are summarized in Table A4-3, and the results of Experimental Examples A4 are summarized in Table A4-4. Meanwhile, among the reformation experiments of the dispersion solutions relating to Experimental Examples A2 to A4, Experimental Examples A2-6, A3-6, A4-3, and A4-6 correspond to Comparative Examples of the present invention; and the rest of the Experimental Examples (A2-3, A2-4, A2-5, A2-7, A2-8, A3-3, A3-4, A3-5, A3-7, A3-8, A4-4, A4-5, A4-7, and A4-8) correspond to Examples of the present invention. All of Experimental Examples corresponding to Examples of the present invention are dispersion solutions in the second pH-dependent region, and in these dispersion solutions the improvement in the dispersion stability was seen as compared with the dispersion solution in the first region. In all of Experimental Examples corresponding to Comparative Examples of the present invention, even though they are in the second pH-dependent region, improvement in the dispersion stability was not seen as compared with the dispersion solution in the first region.

TABLE A4-2

| Experimental Example | Processing duration [h] | pH | pH [°C.] | Conductivity [μS/cm] | Conductivity [°C.] | Concentration of impurity [wt %] | pH after preparation pH | pH after preparation [°C.] | Conductivity after preparation [μS·cm] | Conductivity after preparation [°C.] | Dispersion Stability initial precipitation confirmation time | Precipitation degree |
|---|---|---|---|---|---|---|---|---|---|---|---|---|
| A2-1 | 0.00 | 11.39 | 25.4 | 645 | 25.1 | 2.54 | — | — | — | — | 0.5 hour | F |
| A2-2 | 0.45 | 10.19 | 25.4 | 346 | 25.4 | 0.386 | — | — | — | — | 1 hour | F |
| A2-3 | 1.00 | 8.12 | 25.8 | 9.58 | 25.9 | 0.0041 | — | — | — | — | 1 week | B |
| A2-4 | 1.50 | 7.76 | 26.1 | 6.66 | 26.4 | 0.0029 | — | — | — | — | 1 week | B |
| A2-5 | 2.00 | 6.89 | 27.4 | 5.38 | 26.9 | 0.0011 | — | — | — | — | 1 week | A |
| A2-6 | 3.00 | 5.98 | 28.1 | 2.69 | 28.2 | 0.0005 | — | — | — | — | 1 hour | F |
| A2-7 | Adjusting pH of dispersion solution of Experimental Example A2-6 by using pH adjusting agent | | | | | 0.0009 | 6.74 | 25.1 | 4.26 | 25.3 | 1 week | A |
| A2-8 | Adjusting pH of dispersion solution of Experimental Example A2-6 by using pH adjusting agent | | | | | 0.0016 | 7.68 | 25.6 | 6.12 | 25.6 | 1 week | B |

TABLE A4-3

| Experimental Example | Processing duration [h] | pH | pH [°C.] | Conductivity [μS/cm] | Conductivity [°C.] | Concentration of impurity [wt %] | pH after preparation pH | pH after preparation [°C.] | Conductivity after preparation [μS·cm] | Conductivity after preparation [°C.] | Dispersion Stability initial precipitation confirmation time | Precipitation degree |
|---|---|---|---|---|---|---|---|---|---|---|---|---|
| A3-1 | 0.00 | 11.39 | 25.4 | 645 | 25.1 | 2.54 | — | — | — | — | 0.5 hour | F |
| A3-2 | 0.50 | 10.22 | 25.4 | 355 | 25.4 | 0.406 | — | — | — | — | 1 hour | F |
| A3-3 | 1.25 | 8.26 | 25.8 | 10.14 | 25.9 | 0.0051 | — | — | — | — | 8 hours | E |
| A3-4 | 1.80 | 7.65 | 26.1 | 6.89 | 26.4 | 0.0031 | — | — | — | — | 18 hours | D |
| A3-5 | 2.35 | 6.99 | 27.4 | 5.99 | 26.9 | 0.0017 | — | — | — | — | 2 days later | D |
| A3-6 | 4.00 | 6.34 | 28.1 | 3.16 | 28.2 | 0.0006 | — | — | — | — | 0.5 hour | F |
| A3-7 | Adjusting pH of dispersion solution of Experimental Example A3-6 by using pH adjusting agent | | | | | 0.0010 | 6.73 | 25.1 | 4.16 | 25.3 | 18 hours | D |
| A3-8 | Adjusting pH of dispersion solution of Experimental Example A3-6 by using pH adjusting agent | | | | | 0.0018 | 7.74 | 25.6 | 5.94 | 25.6 | 2 days later | D |

TABLE A4-4

| Experimental Example | Processing duration [h] | pH | pH [°C.] | Conductivity [μS/cm] | Conductivity [°C.] | Concentration of impurity [wt %] | pH after preparation pH | pH after preparation [°C.] | Conductivity after preparation [μS·cm] | Conductivity after preparation [°C.] | Dispersion Stability initial precipitation confirmation time | Precipitation degree |
|---|---|---|---|---|---|---|---|---|---|---|---|---|
| A4-1 | 0.00 | 11.39 | 25.4 | 645 | 25.1 | 2.54 | — | — | — | — | 0.5 hour | F |
| A4-2 | 1.00 | 10.25 | 25.4 | 355 | 25.4 | 0.446 | — | — | — | — | 1 hour | F |
| A4-3 | 1.75 | 8.31 | 25.8 | 10.14 | 25.9 | 0.0064 | — | — | — | — | 8 hours | E |
| A4-4 | 2.65 | 7.69 | 26.1 | 6.89 | 26.4 | 0.0034 | — | — | — | — | 18 hours | D |

TABLE A4-4-continued

| | | | | | | | | | | Dispersion Stability | |
|---|---|---|---|---|---|---|---|---|---|---|---|
| Experimental | Processing duration | pH | | Conductivity | | Concentration of impurity | pH after preparation | | Conductivity after preparation | | initial precipitation confirmation | Precipitation |
| Example | [h] | pH | [° C.] | [μS/cm] | [° C.] | [wt %] | pH | [° C.] | [μS · cm] | [° C.] | time | degree |
| A4-5 | 3.35 | 7.14 | 27.4 | 5.99 | 26.9 | 0.0021 | — | — | — | — | 2 days later | D |
| A4-6 | 4.56 | 6.82 | 28.1 | 3.16 | 28.2 | 0.0015 | — | — | — | — | 0.5 hour | F |
| A4-7 | Adjusting pH of dispersion solution of Experimental Example A3-6 by using pH adjusting agent | | | | | 0.0026 | 7.18 | 26.9 | 9.26 | 26.9 | 18 hours | D |
| A4-8 | Adjusting pH of dispersion solution of Experimental Example A3-6 by using pH adjusting agent | | | | | 0.0037 | 7.59 | 26.4 | 16.4 | 26.4 | 2 days later | D |

As can be seen in the results of Experimental Examples A2 of Table A4-2, when the rotation number of the disperser was decreased as compared with Experimental Examples A1, the time necessary for pH and conductivity of the metal fine particle dispersion solution to reach those of Experimental Examples A1 became longer; however, by adjusting pH and conductivity of the metal fine particle dispersion solution thereof to those of Experimental Examples A1, the dispersion solution showing similar dispersion stability to that of the metal fine particle dispersion solution obtained in Experimental Examples A1 could be prepared. Experimental Example A2-7, in which pH was adjusted by adding a 0.05% by weight of aqueous ammonia solution as the pH adjusting agent into the metal fine particle dispersion solution of Experimental Example A2-6 in the same way as Experimental Examples A1, showed similar dispersion stability and self-dispersion property to those of the metal fine particle dispersion solution of Experimental Example A2-5; and Experimental Example A2-8 showed similar dispersion stability to that of the metal fine particle dispersion solutions of Experimental Examples A2-3 and A2-4. Namely, it was found that by controlling pH or conductivity after carrying out the removal process in the reformation method of the dispersion solution of the present invention in the same way as Experimental Examples A1, by controlling pH of the dispersion solution in the second pH-dependent region in which the conductivity is 100 μS/cm or less, the dispersion property of the metal fine particles in the metal fine particle dispersion solution can also be controlled.

As can be seen in the results of Experimental Examples A3 shown in Table A4-3, it was found that even in the case in which the rotation number of the disperser is 10 m/sec or less as the circumferential velocity, under the state in which the impurities are reduced till the second pH-dependent region in which the conductivity is 100 μS/cm or less by preparing the metal fine particle dispersion solution by using the dispersion solution reformation equipment equipped with the removing unit using the membrane filtration, the dispersion property of the metal fine particles in the metal fine particle dispersion solution is dependent more on the change of pH than the change of the impurity amount in the metal fine particle dispersion solution. In addition, in Experimental Examples A3-7 and A3-8 which were prepared, in the similar manner to Experimental Examples A1, by adding an aqueous solution of 0.05% by weight of ammonia as the pH adjusting agent into the metal fine particle dispersion solution of Experimental Example A3-6, the dispersion stabilities equivalent to those of the metal fine particle dispersion solutions of Experimental Examples A3-4 and A3-5 was obtained. Namely, it was found that similarly to Experimental Examples A1, the dispersion property of the metal fine particle dispersion solution can be controlled by controlling pH of the dispersion solution in the second pH-dependent region in which the conductivity is 100 μS/cm or less.

As can be seen in the results of Experimental Examples A4 shown in Table A4-4, it was found that even in the case in which the reformation process of the metal fine particle dispersion solution is carried out by using the membrane filtration equipment not equipped with the disperser, under the state in which the impurities are reduced till the second pH-dependent region in which the conductivity is 100 μS/cm or less, the dispersion property of the metal fine particles in the metal fine particle dispersion solution is dependent more on the change of pH than the change of the impurity amount in the metal fine particle dispersion solution. In addition, Experimental Example A4-7 which was prepared by adding an aqueous solution of 0.05% by weight of ammonia as the pH adjusting agent into the metal fine particle dispersion solution of Experimental Example A4-6 in a similar manner to Experimental Examples A1 exhibited the dispersion stability equivalent to that of the metal fine particle dispersion solution of Experimental Example A4-5; and Experimental Example A4-8 exhibited the dispersion stability equivalent to that of the metal fine particle dispersion solution of Experimental Example A4-4. Namely, it was found that similarly to Experimental Examples A1, in the second pH-dependent region the dispersion stability of the metal fine particle dispersion solution can be controlled by controlling pH of the dispersion solution. However, because the disperser was not installed, the processing to pH of less than 6.82 was difficult even the processing was repeated, so that even if the processing was carried out to the same pH as Experimental Examples A1, the dispersion property and stability equivalent to those of Experimental Examples A1 could not be confirmed.

(Experimental Examples A5 to A8)

Experimental Examples A5 to A8 were carried out by changing the condition of the reformation process of Experimental Examples A1. Meanwhile, the experiments of Experimental Examples A5 to A8 correspond to Examples of the present invention. The changed conditions are summarized in Table A4-5. Meanwhile, both the pressures Pa of the pressure gauges described in Table A4-5 are obtained from the two pressure gauges Pa shown in FIG. 1(A).

TABLE A4-5

|  |  | Experimental Example A1 | Experimental Example A5 | Experimental Example A6 | Experimental Example A7 | Experimental Example A8 |
| --- | --- | --- | --- | --- | --- | --- |
| (10) | Flow amount of the pump 104 | 6.4 L/min | 8.8 L/min | 6.4 L/min | 5.4 L/min | 6.4 L/min |
| (11) | Flow amount of the metal fine dispersion solution returned to the storing vessel 130 | 5.4 L/min | 7.2 L/min | 5.0 L/min | 4.8 L/min | 4.8 L/min |
| (12) | Amount of the filtrate L3 discharged by the removing unit 120 (Calculated value) | 1.0 L/min | 1.6 L/min | 1.4 L/min | 0.6 L/min | 1.6 L/min |
| (16) | Pressure meters | Pa: Both two 0.10 MPaG | Same as on the left | Same as on the left | Same as on the left | Pa: Both two 0.04 MPaG |
| (19) | Path length (Lea) | 0.3 m | Same as on the left | Same as on the left | 0.5 m | 1.5 m |
| (20) | Pipe's inner diameter (Leb) | 0.0105 m | Same as on the left | Same as on the left | Same as on the left | 0.0230 m |
| (21) | Flow rate of the fine particle dispersion solution in the just-before transporting path | 1.2 m/sec | 1.7 m/sec | 1.2 m/sec | 1.0 m/sec | 0.3 m/sec |
| (22) | Time T1 from the dispersing vessel 101 to start of removal of the impurity by the removing unit 120 | 0.24 sec | 0.18 sec | 0.24 sec | 0.48 sec | 5.84 sec |
| (23) | Thermometer installed in the dispersing vessel 101 | From 25° C. to 29° C. | From 25° C. to 29° C. | From 35° C. to 40° C. | From 25° C. to 29° C. | From 25 to 29° C. |

In Experimental Examples A5, the experimental condition was changed such that the flow rate of the pump 104 was increased from Experimental Examples A1, namely the flow rate of the metal fine particle dispersion solution from the storing vessel 130 to the dispersion processing equipment 110 and the removing unit 120 was increased, while both Lea and Leb were set to the same as those of Experimental Examples A1. Therefore, the flow rate (FL) of the dispersion solution in the just-before transporting path becomes faster, so that T1 becomes shorter. Under the conditions of Experimental Examples A5, too, similarly to Experimental Examples A1, the dispersion property of the metal fine particle dispersion solution could be controlled by controlling pH of the dispersion solution in the second pH-dependent region in which the conductivity was 100 μS/cm or less; and moreover, the metal fine particle dispersion solution exhibiting the dispersion property or the dispersion stability superior to those of Experimental Examples A1 could be obtained. As can be seen in Table A4-5, in Experimental Examples A5, the experimental condition was changed such that the flow rate of the pump 104 was made faster than that of A1, thereby enabling to increase the discharge amount of the filtrate L3; and thus, the processing time could be shortened. In Experimental Examples A6, the experimental condition was changed such that the temperature of the metal fine particle dispersion solution was made higher than that of Experimental Examples A1. Under the conditions of Experimental Examples A6, too, similarly to Experimental Examples A1, the dispersion property of the metal fine particle dispersion solution could be controlled by controlling pH of the dispersion solution in the second pH-dependent region in which the conductivity was 100 μS/cm or less; and by carrying out the reformation process so as to reach pH or conductivity of Experimental Examples A1, the metal fine particle dispersion solution exhibiting the dispersion property or the dispersion stability equivalent to those of Experimental Examples A1 could be prepared; and further, by raising the temperature of the metal fine particle dispersion solution, the discharge amount of the filtrate L3 could be increased, so that the processing time could be shortened.

In the metal fine particles obtained in Experimental Examples A5, the metal fine particle dispersion solution exhibiting the dispersion property or the dispersion stability superior to those of Experimental Examples A1 means, as compared with the metal fine particle dispersion solution of, for example, Experimental Example A1-4 whose pH is adjusted to 7.77, the metal fine particle dispersion solution in which by adjusting the pH thereof to that of Experimental Example A1-4 the initial precipitation confirmation time becomes longer and also the metal fine particles are confirmed to be in the state of more dispersed than Experimental Example A1-4 in the TEM observation.

In Experimental Examples A7, the experimental condition was changed such that the flow rate of the pump 104 was decreased and Lea was increased as compared with those of Experimental Examples A1. Under these conditions, the discharge amount of the filtrate L3 was decreased and T1 became longer; but the dispersion property of the metal fine particle dispersion solution could be controlled by controlling pH of the dispersion solution in the second pH-dependent region in which the conductivity was 100 μS/cm or less, so that the metal fine particle dispersion solution exhibiting the dispersion property or the dispersion stability equivalent to those of Experimental Examples A1 could be obtained by carrying out the reformation process until pH or conductivity thereof reached those of Experimental Examples A1.

In Experimental Examples A8, the experimental conditions of Lea and Leb were changed from those of Experimental Examples A1 so that T1 became 5.84 seconds. Under the conditions of Experimental Examples A5, too, similarly to Experimental Examples A1, the dispersion property of the metal fine particle dispersion solution could be controlled by controlling pH of the dispersion solution in the second pH-dependent region in which the conductivity was 100 μS/cm or less. However, the fine particle dispersion solution exhibiting the dispersion property and dispersion stability equivalent to those obtained in Experimental Example A1-5 could not be obtained even when the reformation process was carried out until the pH thereof reached pH of Experimental Examples A1-5.

As described above, even when the flow rate, the flow amount, the fluid pressure, or the temperature in the just-before transporting path is changed, the dispersion property of the metal fine particle dispersion solution could be controlled by controlling pH of the dispersion solution in the second pH-dependent region in which the conductivity was 100 μS/cm or less.

(Experimental Examples B: Experiments on the Oxide Fine Particle Dispersion Solution)

As the experiments of the oxide fine particle dispersion solution, five experiments were carried out. Meanwhile, in Experimental Examples B1 to B3, the experiments were carried out also by using the C-solution as the third fluid to be processed that was introduced into the introduction part d30 of the separation processing equipment (A). As the previous processes before obtaining the dispersion solution, the oxide raw material solution, the oxide separating solvent, and the silicon oxide raw material solution each were prepared by using Clearmix (product name: CLM-2.2S, manufactured by M. Technique Co., Ltd.), which is the high speed rotational dispersion emulsifier. Specifically, according to the prescription of the first fluid (A-solution) described in Table B1, each component of the oxide raw material solution were uniformly mixed by stirring for 30 minutes by using Clearmix with the rotation number of the rotor thereof being 20000 rpm and at the preparation temperature of 40° C. to obtain the oxide raw material solution. Also, according to the prescription of the second fluid (B-solution) described in Experimental Examples B1 in Table B1, each component of the oxide separating solvent were uniformly mixed by stirring for 30 minutes by using Clearmix with the rotation number of the rotor thereof being 15000 rpm and at the preparation temperature of 45° C. to obtain the oxide separating solvent. Further, according to the prescription of the third fluid, the silicon oxide raw material solution (C-solution) described in Table B1, each component of the silicon oxide raw material solution were uniformly mixed by stirring for 10 minutes by using Clearmix with the rotation number of the rotor thereof being 6000 rpm and at the preparation temperature of 20° C. to obtain the silicon oxide raw material solution.

Meanwhile, the substances represented by chemical formula or abbreviation described in Table B1 are 97% by weight $H_2SO_4$ for concentrated sulfuric acid (manufactured by Kishida Chemical Co., Ltd.), NaOH for sodium hydroxide (manufactured by Kanto Chemical Co., Ltd.), TEOS for tetraethyl orthosilicate (manufactured by Wako Pure Chemical Industries, Ltd.), and $Fe(NO_3)_3 \cdot 9H_2O$ for ferric nitrate nonahydrate (manufactured by Kanto Chemical Co., Ltd.). Pure water with pH of 5.89 (measurement temperature of 22.4° C.) and conductivity of 0.80 μS/cm (measurement temperature of 22.4° C.) was used in all of the experiments.

Next, as the process to obtain the dispersion solution, the oxide raw material solution, the oxide separating solvent, and the silicon oxide raw material solution, all having been prepared as described above, were mixed by using the separation processing equipment illustrated in FIG. 3(A). Specifically, the oxide raw material solution was introduced as the A-solution into between the processing surfaces 1 and 2; and with operating the processing member 10 with the rotation number of 1130 rpm, the oxide separating solvent was introduced as the B-solution into the processing surfaces 1 and 2 so as to mix the oxide separating solvent and the oxide raw material solution in a thin film fluid, whereby the oxide fine particles were separated in between the processing surfaces 1 and 2. Next, the silicon oxide raw material solution was introduced as the C-solution into the processing surfaces 1 and 2 so as to mix in the thin film fluid with the mixed fluid including the oxide fine particles that were previously separated. As a result, the silicon oxide is separated on surface of the previously separated oxide fine particles, whereby the fluid including the oxide fine particles covered with the silicon oxide (hereunder, silicon-oxide-covered oxide fine particle dispersion solution) was ejected from between the processing surfaces 1 and 2 of the separation processing equipment. The ejected silicon-oxide-covered oxide fine particle dispersion solution was recovered in a beaker via the vessel v.

In Table B2, operation conditions of the separation processing equipment are summarized. The introduction temperatures (supply temperatures) and introduction pressures (supply pressures) of the A-solution, B-solution, and C-solution described in Table B2 were measured by using the thermometers and pressure meters installed in the sealed introduction paths to between the processing surfaces 1 and 2 (first introduction part d1, second introduction part d2, and third introduction part C3), wherein the introduction temperature of the A-solution in Table B2 is the temperature of the actual A-solution under the introduction pressure in the first introduction part d1, the introduction temperature of the B-solution is the temperature of the actual B-solution under the introduction pressure in the second introduction part d2, and the introduction temperature of the C-solution is the temperature of the actual C-solution under the introduction pressure in the third introduction part d3.

Measurement of pH was made by using a pH meter (catalogue No. C-71; manufactured by HORIBA, Ltd.). Before the A-solution, the B-solution, and the C-solution were introduced into the separation processing equipment, pH of these solutions were measured at room temperature. It was difficult to measure pH of the mixed fluid immediately after the oxide raw material solution was mixed with the oxide separating solvent and pH of the mixed fluid immediately after the fluid including the oxide fine particles previously separated was mixed with the silicon oxide raw material solution; and thus, pH of the silicon-oxide-covered oxide fine particle dispersion solution which was ejected from the equipment and recovered in the beaker was measured at room temperature.

TABLE B1

| | The prescription of the first fluid (A-solution) | | | | | | | The prescription of the second fluid (B-solution) | | | | | |
|---|---|---|---|---|---|---|---|---|---|---|---|---|---|
| | Prescription[wt %] | | | | pH | | | Prescription[wt %] | | | | pH | |
| | Material | [wt %] | Material | [wt %] | pH | [° C.] | | Material | [wt %] | Material | [wt %] | pH | [° C.] |
| oxide raw material solution | Fe(NO$_3$)$_3$·9H$_2$O | 2.00 | Pure water | 98.00 | 2.85 | 38.6 | oxide separating solvent | NaOH | 9.00 | Pure water | 91.00 | >14 | — |

| The prescription of the third fluid, Silicon oxide raw material solution (C-solution) | | | | | | | |
|---|---|---|---|---|---|---|---|
| Prescription[wt %] | | | | | | pH | |
| Material | [wt %] | Material | [wt %] | Material | [wt %] | pH | [° C.] |
| Pure water | 92.89 | 97 wt % H$_2$SO$_4$ | 5.11 | TEOS | 2.00 | <1 | — |

TABLE B2

| Introduction flow amount (supply flow amount) ml/min | | | Introduction temperatures (supply temperatures) [° C.] | | | Introduction pressures (supply pressures) [MPaG] | | | Discharged solution | | Particle diameter |
|---|---|---|---|---|---|---|---|---|---|---|---|
| A solution | B solution | C solution | A solution | B solution | C solution | A solution | B solution | C solution | pH | Temperature | (D) [nm] |
| 400 | 50 | 100 | 142 | 86 | 89 | 0.451 | 0.50 | 0.50 | 12.56 | 32.9 | 8.20 |

(Experimental Examples B1)

In the process of reforming the dispersion solution, from the silicon-oxide-covered oxide fine particle dispersion solution which was ejected from the separation processing equipment and then recovered in the beaker, impurities were removed and pH thereof was controlled by using the dispersion solution reformation equipment 100 illustrated in FIG. 1(A). In Table B10 to be described later, the conditions of the reformation process of each Experimental Examples B1 to B5 of the present invention are summarized. The process was carried out with the same procedure as that of Experimental Examples A except for the conditions described in Table B10. Among the reformation experiments of the dispersion solutions relating to Experimental Examples B1, Experimental Examples B1-3 to B1-7 and Experimental Examples B1-10 to B1-12 correspond to Examples of the present invention; and Experimental Examples B1-8 and B1-9 correspond to Comparative Examples of the present invention. All of Experimental Examples corresponding to Examples of the present invention are dispersion solutions in the second pH-dependent region, and in these dispersion solutions the improvement in the dispersion stability was seen as compared with the dispersion solution in the first region. In all of Experimental Examples corresponding to Comparative Examples of the present invention, even though they are in the second pH-dependent region, improvement in the dispersion stability was not seen as compared with the dispersion solution in the first region.

During the time of continuing the reformation process under the condition of Experimental Examples B1 as described in Table B10, part of the oxide fine particle dispersion solution was withdrawn from the storing vessel 130 at an interval; and these were designated as Experimental Examples B1-1 to B1-9, and the dispersion solutions obtained by adding a pH adjusting agent to the oxide fine particle dispersion solution of Experimental Example B1-9 were designated as Experimental Examples B1-10, B1-11, and B1-12. Concentration of the oxide fine particles in all the oxide fine particle dispersion solutions of Experimental Examples B1-1 to B1-12 was 4.0% by weight as Fe$_2$O$_3$. In Table B3, pH and conductivity of the oxide fine particle dispersion solution during the reformation process of the oxide fine particle dispersion solution are summarized. Meanwhile, impurities in Experimental Examples B1 are NaOH, NaNO$_3$, Na$_2$SO$_4$, and EtOH. They are analyzed with an inductively coupled plasma emission spectroscopic method (ICP), a gas chromatography method (GC), and an ion chromatography method (IC), and the results thereof are summarized in Table B3 as the total impurity amount. In all of Experimental Examples B1 to B3, the impurity concentrations were calculated with the same methods. By carrying out the reformation process, pH and conductivity of the oxide fine particle dispersion solution approached almost the same as those of the cross-flow washing solution and the pure water charged into the storing vessel 130. In each of Experimental Examples B1-1 to B1-12, part of the withdrawn oxide fine particle dispersion solution was diluted with propylene glycol (hereunder, PG), and this diluted solution was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 30 minutes. Part of the PG dispersion solution of the oxide fine particles thus obtained was diluted with isopropyl alcohol (hereunder, IPA), and then it was processed with an ultrasonic cleaning machine for 5 minutes. Then, the solution thus obtained was dropped onto a collodion film and dried in an atmosphere for 4 hours to obtain the sample for TEM observation. The rest of the PG dispersion solution of the oxide fine particles was subjected to the UV-Vis spectrum measurement.
(UV-Vis Spectrum)

For measurement of the UV-Vis spectrum, a UV-Vis absorption spectrophotometer (product name: UV-2450, manufactured by Shimadzu Corp.) was used. The transmission spectrum was measured with the measurement range of 200 nm to 800 nm, with the sampling rate of 0.2 nm, and with a slow measurement rate. For the transmission spectrum measurement, the dispersion solution obtained by dispersing the silicon-oxide-covered iron oxide into PG with the concentration thereof being $2.1 \times 10^{-3}$ mol/L (as $Fe_2O_3$) was used as the measurement sample.

pH of the oxide fine particle dispersion solution in the range of 6.5 and 8.5 by using the dispersion solution reformation equipment of the present invention. Furthermore, with regard to Experimental Examples B1-5 to B1-7, surprisingly, no deposition could be confirmed at 2 weeks of the static state after the withdrawal. In the oxide fine particles in the oxide fine particle dispersion solution whose pH was made in the range of 6.5 to 7.5, the precipitated fine particles once generated during 1 week of the static state was re-dispersed without carrying out any dispersion process, so that it was presumed that the dispersion solution included the oxide fine particles having self-dispersion property.
(Adjustment of pH after Completion of Removal Process)

An aqueous 0.05% by weight of ammonia solution was added as the pH adjusting agent into the oxide fine particle dispersion solution of Experimental Example B1-9, and then

TABLE B3

| Experimental Example | Processing duration [h] | pH | | Conductivity | | Concentration of impurity [wt %] | pH after adjusting | | Conductivity after adjusting | | Dispersion Stability | |
| --- | --- | --- | --- | --- | --- | --- | --- | --- | --- | --- | --- | --- |
| | | pH | [° C.] | [µS/cm] | [° C.] | | pH | [° C.] | [µS · cm] | [° C.] | initial precipitation confirmation time | Precipitation degree |
| B1-1 | 0 | 12.50 | 21.6 | 9540 | 21.6 | 3.943 | — | — | — | — | 0.2 hour | F |
| B1-2 | 0.29 | 10.93 | 26.3 | 421 | 26.3 | 0.140 | — | — | — | — | 2 hours | F |
| B1-3 | 1.10 | 8.14 | 23.9 | 8.36 | 23.9 | 0.0065 | — | — | — | — | 1 week | B |
| B1-4 | 1.64 | 7.87 | 23.4 | 7.55 | 23.4 | 0.0021 | — | — | — | — | 1 week | B |
| B1-5 | 3.16 | 7.22 | 23.3 | 5.69 | 23.3 | 0.0011 | — | — | — | — | 1 week | A |
| B1-6 | 4.05 | 6.90 | 23.4 | 4.01 | 23.4 | 0.0007 | — | — | — | — | 1 week | A |
| B1-7 | 5.16 | 6.71 | 23.1 | 3.21 | 23.1 | 0.0005 | — | — | — | — | 0.5 hour | A |
| B1-8 | 7.15 | 6.31 | 23.2 | 2.99 | 23.2 | 0.0004 | — | — | — | — | 0 (immediately after) | F |
| B1-10 | Adding pH adjusting agent to the dispersion solution of Experimental Example C1-9 | | | | | 0.0006 | 6.72 | 6.72 | 26.7 | 3.51 | 26.7 | 1 week | A |
| B1-11 | Adding pH adjusting agent to the dispersion solution of Experimental Example C1-9 | | | | | 0.0008 | 7.24 | 7.24 | 26.8 | 6.25 | 26.8 | 1 week | A |
| B1-12 | Adding pH adjusting agent to the dispersion solution of Experimental Example C1-9 | | | | | 0.0097 | 8.35 | 8.35 | 26.9 | 25.90 | 26.9 | 1 week | B |

(Dispersion Stability and Self-Dispersion Property)

In the oxide fine particle dispersion solutions of Experimental Examples B1-1, B1-2, B1-8, and B1-9, precipitation of the oxide fine particles was found at the time described in the initial deposition confirmation time in Table C3, wherein the phase including the oxide fine particles and the phase not substantially including the oxide fine particles were separated. In Experimental Examples B1-3 and B1-4, precipitation of the oxide fine particles was faintly observed at 1 week of the static state after the withdrawal. In the oxide fine particle dispersion solution of Experimental Examples B1-5 to B1-7, precipitation of an extremely minute amount of the oxide fine particles was observed at 1 week of the static state after the withdrawal, but the precipitation amount thereof was about 0.1% by weight relative to the oxide fine particles included in the dispersion solution. In Experimental Examples B1-3 and B1-4, when the dispersion solution was allowed to stand for one more week (2 weeks after withdrawal), a slightly more precipitation of the oxide fine particles was observed as compared with that observed at 1 week of the static state after the withdrawal, but the precipitation amount thereof was about 0.2% by weight relative to the oxide fine particles included in the dispersion solution. It became clear that the dispersion stability of the oxide fine particle dispersion solution can be enhanced by controlling the dispersion process thereof was carried out by using Clearmix (product name: CLM-2.2S, rotor: R1, screen: S0.8-48, manufactured by M. Technique Co., Ltd.) at 20000 rpm for 30 minutes to obtain Experimental Examples B1-10 to B1-12. The results of Experimental Examples B1-10 to B1-12 are summarized in Table C3.

Experimental Example B1-10 in which pH was adjusted at 6.72 and conductivity at 3.51 µS/cm (measurement temperature of 26.7° C.) and Experimental Example B1-11 in which pH was adjusted at 7.24 and conductivity at 6.25 µS/cm (measurement temperature of 26.8° C.) exhibited similar dispersion stability and self-dispersion property to those of the oxide fine particle dispersion solutions of Experimental Examples B1-5 to B1-7. Experimental Example B1-12 in which pH was adjusted at 8.35 and conductivity at 25.9 µS/cm (measurement temperature of 26.9° C.) exhibited similar dispersion stability and self-dispersion property to those of the oxide fine particle dispersion solutions of Experimental Examples B1-3 and B1-4. Meanwhile, when an aqueous 0.1% by weight of nitric acid solution was added to the oxide fine particle dispersion solution of Experimental Example B1-1 so as to bring pH thereof to 6.90 (measurement temperature of 23.4° C.), the conductivity thereof was 12460 µS/cm (12.46 mµS/cm), wherein precipitation was clearly observed within 0.1 hours after the preparation thereof, resulting in separation between the phase including the oxide fine particles and the phase not substantially including the oxide fine particles. From this, it can be seen that when the removal process to remove the impurities is not carried out in the reformation process of the present invention, specifically, when the impurities could not be removed till 100 µS/cm or less, the dispersion property cannot be controlled even if pH thereof is controlled.

(Assessment of Dispersion Property: TEM Observation)

Figure 7:
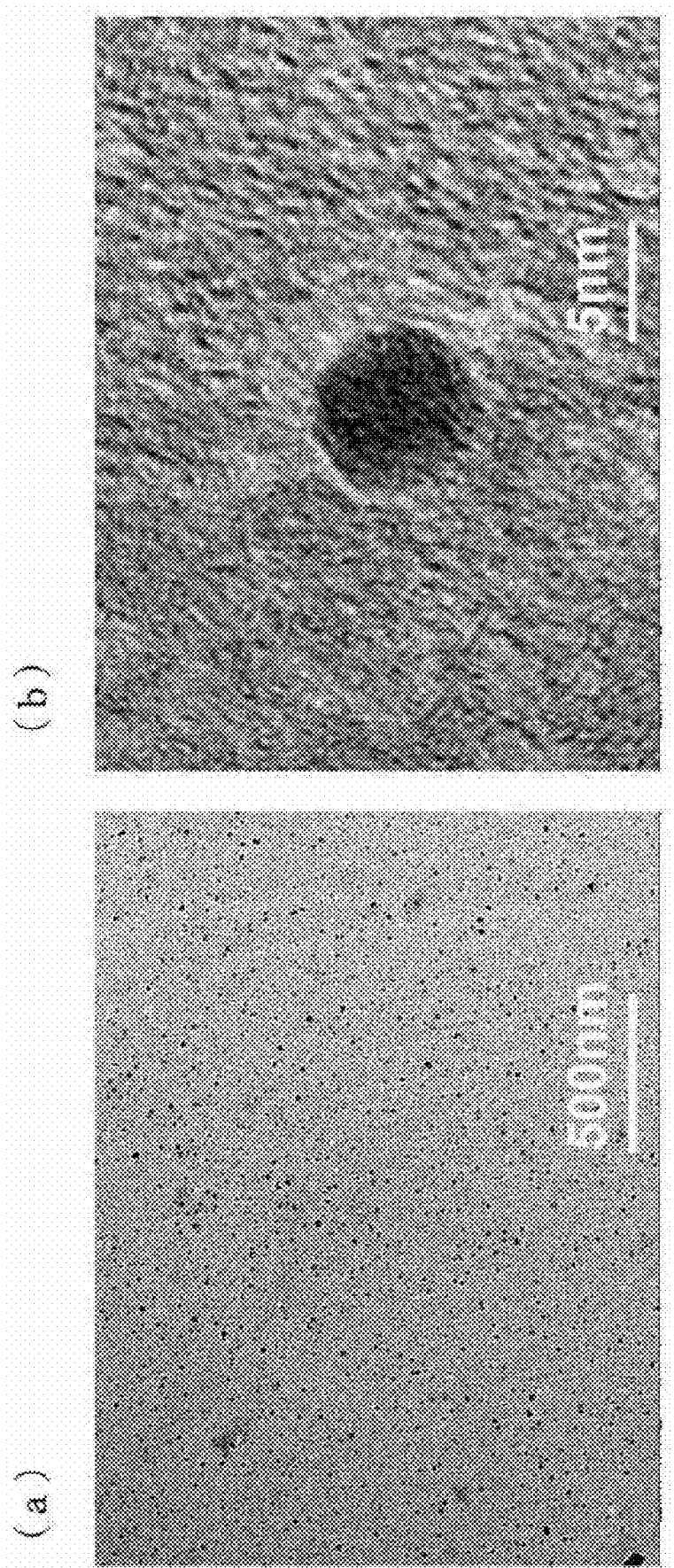
FIG. 7 These are the TEM pictures of the oxide fine particles in the oxide fine particle dispersion solution obtained in Experimental Example B1-6 of the present invention. Meanwhile, (a) and (b) are the observation results with the magnification of 10000 and 100000, respectively.
Figure 8:
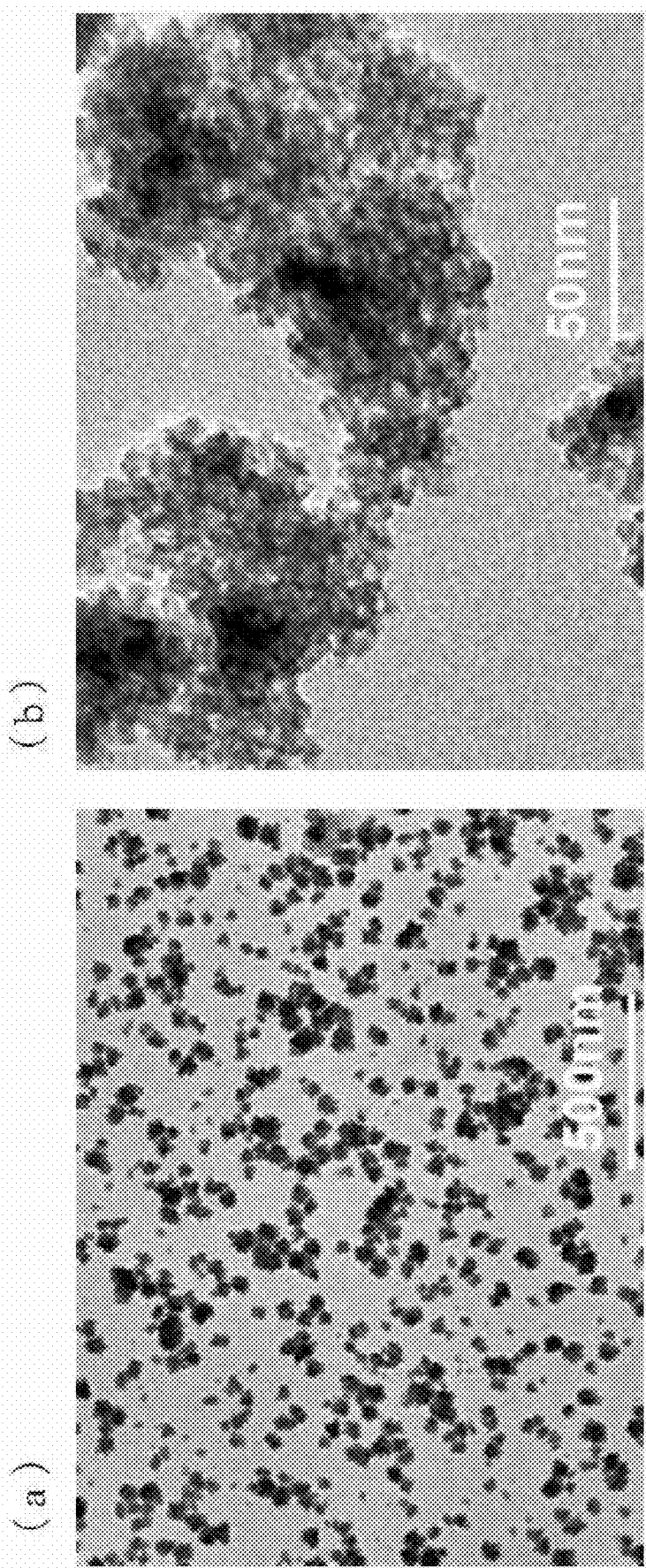
FIG. 8 These are the TEM pictures of the oxide fine particles in the oxide fine particle dispersion solution obtained in Experimental Example B1-9 of the present invention. Meanwhile, (a) and (b) are the observation results with the magnification of 10000 and 100000, respectively.

The TEM pictures of the oxide fine particles of Experimental Example B1-6 are shown in FIG. 7. From the TEM picture with the magnification of 10000 in FIG. 7(*a*), it was confirmed that the oxide fine particles were uniformly dispersed. From the TEM picture with the magnification of 800000 in FIG. 7(*b*), it was confirmed that the primary particle's diameter thereof was about 8 nm. Similar results were obtained in the oxide fine particles of Experimental Examples B1-5, B1-7, B1-10, and B1-11 (not shown by the drawing). Meanwhile, the TEM observation in Experimental Examples B was made by using the transmission electron microscope (JEM-2100, manufactured by JEOL Ltd.), wherein the dispersion property of the oxide fine particle dispersion solution was assessed under the observation conditions with the acceleration voltage of 80 kV and the observation magnification of 10000 or more.

Figure 11:
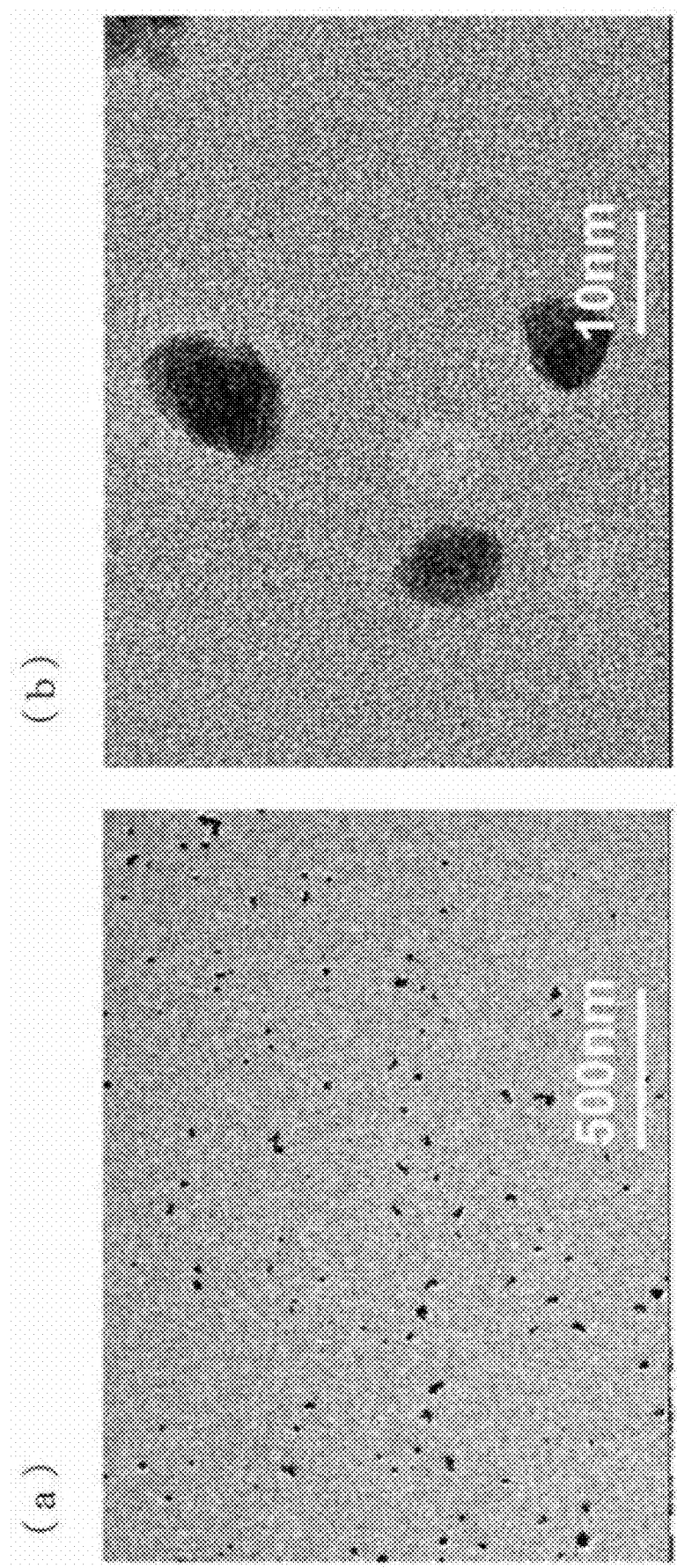
FIG. 11 These are the TEM pictures of the oxide fine particles in the oxide fine particle dispersion solution obtained in Experimental Example B4-6 of the present invention. Meanwhile, (a) and (b) are the observation results with the magnification of 10000 and 250000, respectively.

The TEM pictures of the oxide fine particles of Experimental Example B1-9 are shown in FIG. 11. From the TEM pictures with the magnification of 10000 shown in FIG. 11(*a*) and with the magnification of 100000 shown in (b), it was observed that as compared with Experimental Example B1-6 the oxide fine particles aggregated with more number of the aggregates. Similar results were observed in the oxide fine particles of Experimental Example B1-8 (not shown by the drawing).

Figure 9:
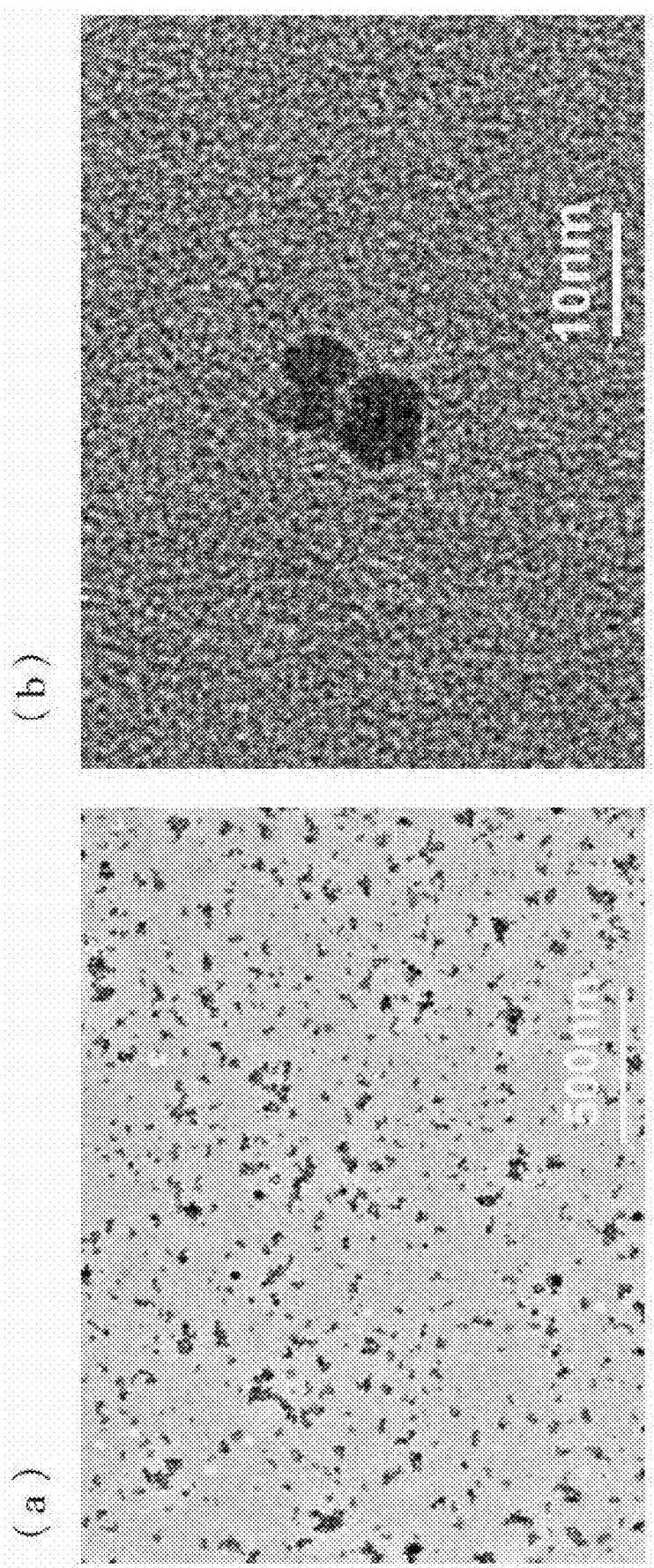
FIG. 9 These are the TEM pictures of the oxide fine particles in the oxide fine particle dispersion solution obtained in Experimental Example B1-4 of the present invention. Meanwhile, (a) and (b) are the observation results with the magnification of 10000 and 250000, respectively.
Figure 10:
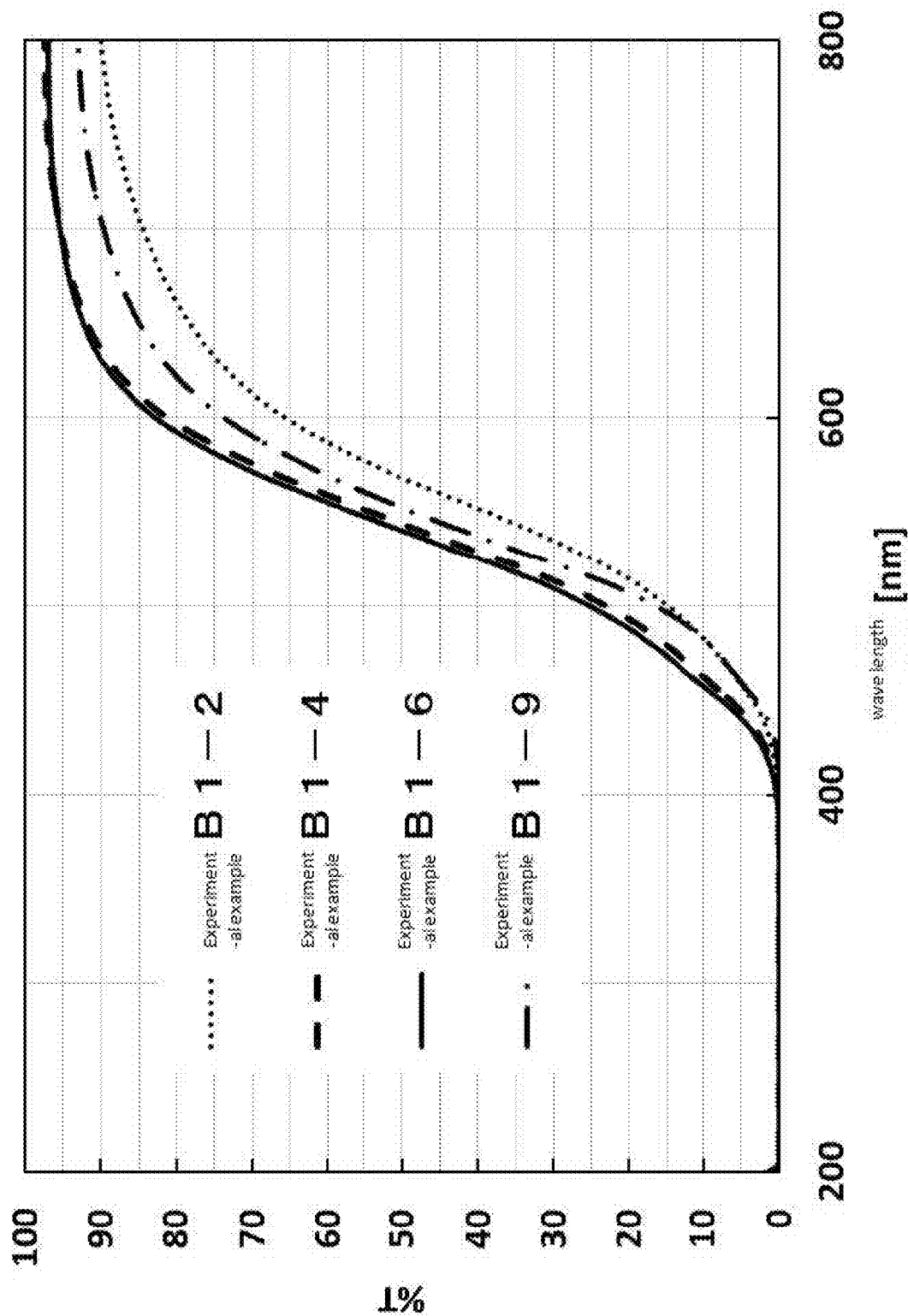
FIG. 10 This is the measurement results of the UV-Vis spectra (transmission spectra) of the propylene glycol dispersion solutions prepared by using oxide fine particle dispersion solutions with the conditions of Experimental Examples B1-2, B1-4, B1-6, and B1-9 of the present invention.

The TEM pictures of the oxide fine particles of Experimental Example B1-4 are shown in FIG. 9. From the TEM pictures with the magnification of 10000 shown in FIG. 9(*a*) and with the magnification of 25000 shown in (b), it was observed that the oxide fine particles aggregated more as compared with Experimental Example B1-6; however, as compared with the oxide fine particles of Experimental Example B1-9, number of the aggregates thereof was less, and the oxide fine particles were dispersed uniformly. Similar results were obtained in the oxide fine particles of Experimental Examples B1-3 and B1-12.

The TEM pictures of Experimental Examples B1-1 and B1-2 were taken immediately after start of the washing process of the oxide fine particle dispersion solution; therefore, not only the same aggregates of the oxide fine particles as those of Experimental Examples B1-8 and B1-9 but also impurities (NaOH, NaNO$_3$, Na$_2$SO$_4$, etc.) were observed (not shown by the drawing).

(Measurement Results of UV-Vis Spectra)

Figure 13:
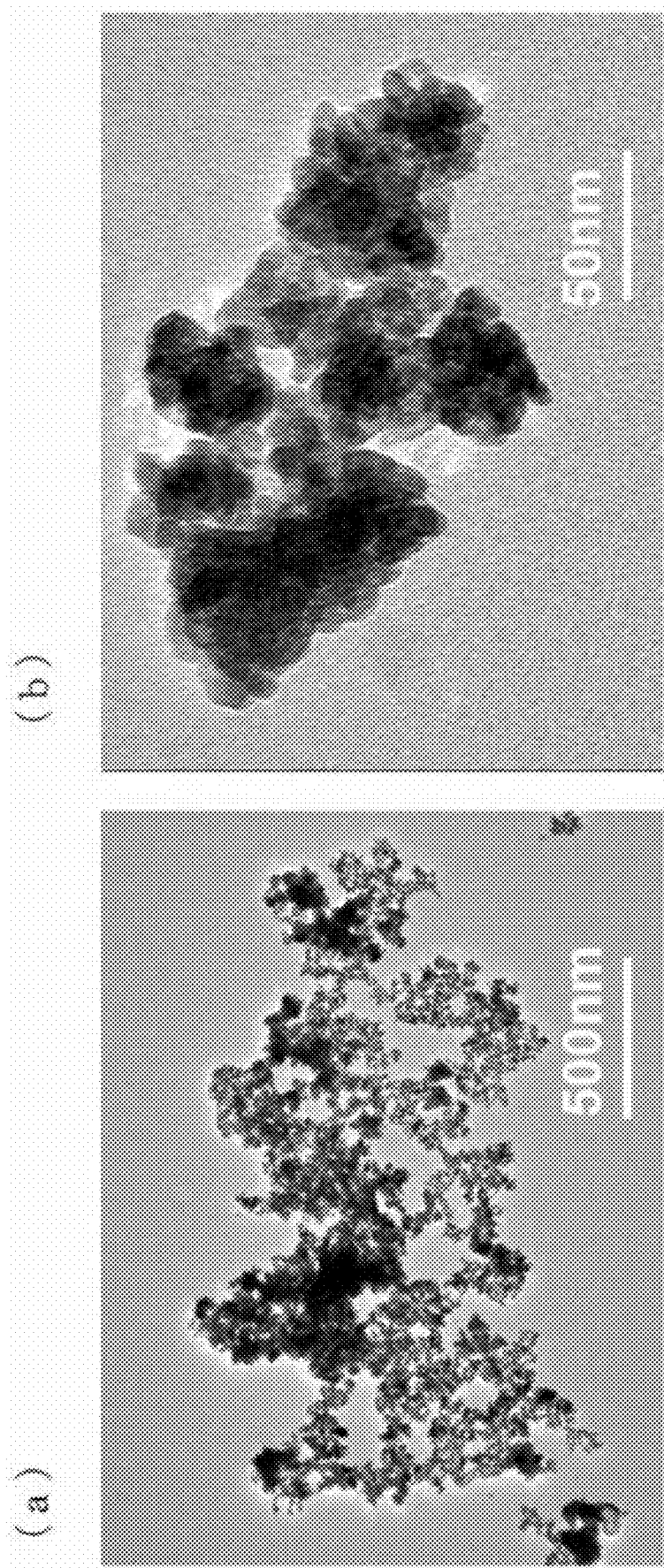
FIG. 13 These are the TEM pictures of the oxide fine particles in the oxide fine particle dispersion solution obtained in Experimental Example B4-2 of the present invention. Meanwhile, (a) and (b) are the observation results with the magnification of 10000 and 100000, respectively.

The measurement results of the UV-Vis spectra (transmission spectra) of the PG dispersion solutions prepared by using the oxide fine particle dispersion solutions of Experimental Examples B1-2, B1-4, B1-6, and B1-9 are shown in FIG. 13. The PG dispersion solutions prepared by using the oxide fine particle dispersion solutions of Experimental Examples B1-4 and B1-6 showed almost the identical spectrum form, wherein absorption was observed in the wavelength range of 200 nm to 400 nm, and 95% or more of transmittance was observed in the wavelength range of 700 nm to 800 nm. On the other hand, the PG dispersion solutions prepared by using the oxide fine particle dispersion solutions of Experimental Examples B1-2 and B1-9 showed lower transmittance than Experimental Examples B1-4 and B1-6 in the wavelength range of 700 nm to 800 nm. This is presumably because the dispersion property of the oxide fine particles in the oxide fine particle dispersion solutions of Experimental Examples B1-2 and B1-9 are poorer than that of Experimental Examples B1-4 and B1-6, the oxide fine particles included in the oxide fine particle dispersion solutions of Experimental Examples B1-2 and B1-9 are not uniformly dispersed in the PG dispersion solutions thereby forming the aggregates thereof, and thus, they show lower transmittance in the visible light region than the PG dispersion solutions of Experimental Examples B1-4 and 1-6.

(Concentration Process)

By using the oxide fine particle dispersion solutions of Experimental Example B1-6 and of Experimental Example B1-9 which corresponds to Comparative Example of the present invention, concentration experiments were carried out using the equipment used in Experimental Examples B1. Specifically, without charging a diluting solution into the storing vessel 130, concentration of the dispersion solution in the storing vessel 130 was carried out only by discharging the filtrate L3 with the removing unit 120. The oxide fine particle dispersion solution of Experimental Example B1-6 in which high dispersion stability could be obtained could be concentrated to 12.7% by weight as Fe$_2$O$_3$; on the other hand, the oxide fine particle dispersion solution of Experimental Example B1-9 which corresponds to Comparative Example of the present invention could not be concentrated because the filtration membrane of the removing unit 120 was clogged during concentration. With regard to Experimental Examples B1-3 to B1-7, concentration could be carried out similarly to Experimental Example B1-6; and thus, with regard to the dispersion solution having good dispersion property of the fine particles in the fine particle dispersion solution, it became clear that the concentration process to concentrate the fine particle dispersion solution could be carried out after the process to remove the impurities with the filtration membrane.

From the results shown above, it was found that the impurity amount decreases rapidly in the first region where the conductivity of the oxide fine particle dispersion solution is higher than 100 µS/cm from the initial value, but in the second pH-dependent region where the conductivity thereof is 100 µS/cm or less, the change in the impurity amount is so small that the dispersion property of the oxide fine particle dispersion solution is dependent more on the change of pH in the oxide fine particle dispersion solution than the change of the impurity amount therein. In addition, it was found that in the second pH-dependent region, the dispersion property of the oxide fine particle dispersion solution can be controlled by controlling pH of the dispersion solution. Further, in the case in which the oxide fine particle dispersion solution is prepared by using the equipment comprising the disperser and the equipment with which the impurities are removed from the oxide fine particle dispersion solution by using the filtration membrane with a cross flow method, it was found that the dispersion stability is improved by bringing the pH of the oxide fine particle dispersion solution into the range of 6.5 to 8.5, and that the dispersion property of the oxide fine particle dispersion solution, prepared by using other dispersing medium together with the obtained oxide fine particle dispersion solution, is also improved. Further, in the oxide fine particle dispersion solution whose pH was adjusted at 6.01, it was found that when pH thereof was readjusted in the range of 6.5 to 8.5, the dispersion stability could be enhanced; and in addition, the dispersion property of the oxide fine particle dispersion solution could be enhanced wherein the dispersion solution was prepared using the obtained oxide fine particle dispersion solution and other dispersing medium.
(Experimental Examples B2)

In Experimental Examples B2, the reformation process of the oxide fine particle dispersion solution was carried out by the same method as that of Experimental Examples C1 in removal of the impurities in the oxide fine particle dispersion solution as well as in pH adjustment, except that the disperser 102 and the dispersing vessel 101 in the equipment illustrated in FIG. 1(A) were removed so that the filtration was carried out by directly sending the oxide fine particle dispersion solution filled in the storing vessel 130 to the removing unit 120 by using the pump 104. The results of Experimental Examples B2 are summarized in Table B4.

mental Example B2-2 was made to 7.48 (measurement temperature of 23.6° C.) by addition of an aqueous solution of 0.001% by weight of nitric acid. At this time, the conductivity thereof was 1351 µS/cm, wherein clear precipitation could be seen within 0.2 hours after the preparation thereof (immediately after preparation), resulting in separation into the phase including the oxide fine particles and the phase substantially not including the oxide fine particles. From these results, the same conclusion as Experimental Examples B1 could be obtained. Meanwhile, in Experimental Examples B2, because the disperser was not used, the dispersion property inferior to that of Experimental Examples B1 was resulted; however, even though it was inferior, by the pH control such as lowering pH in the second pH-dependent region, improvement in the dispersion prop-

TABLE B4

| Experimental Example | Processing duration [h] | pH pH | pH [° C.] | Conductivity [µS/cm] | Conductivity [° C.] | Concentration of impurity [wt %] | pH after adjusting pH | pH after adjusting [° C.] | Conductivity after adjusting [µS · cm] | Conductivity after adjusting [° C.] | Dispersion Stability initial precipitation confirmation time | Precipitation degree |
|---|---|---|---|---|---|---|---|---|---|---|---|---|
| B2-1 | 0 | 12.50 | 21.6 | 9540 | 21.6 | 3.943 | — | — | — | — | 0.2 hour | F |
| B2-2 | 0.15 | 11.24 | 23.4 | 632 | 23.4 | 0.649 | — | — | — | — | 0.5 hour | F |
| B2-3 | 0.48 | 10.59 | 23.1 | 432 | 23.1 | 0.159 | — | — | — | — | 1 hour | F |
| B2-4 | 1.16 | 9.46 | 23.3 | 16.42 | 23.3 | 0.0143 | — | — | — | — | 7 hours | E |
| B2-5 | 2.46 | 8.39 | 23.4 | 11.21 | 23.4 | 0.0097 | — | — | — | — | 1 day | D |
| B2-6 | 5.51 | 7.98 | 23.3 | 8.98 | 23.3 | 0.0071 | — | — | — | — | 1 day | D |
| B2-7 | 11.29 | 7.48 | 23.6 | 6.59 | 23.6 | 0.0018 | — | — | — | — | 1 day | D |
| B2-8 | Adding pH adjusting agent to the dispersion solution of Experimental Example B2-5 | | | 0.0008 | | 0.0243 | 7.32 | 23.9 | 26.10 | 23.9 | 4 days | C |
| B2-9 | Adding pH adjusting agent to the dispersion solution of Experimental Example B2-6 | | | 0.0097 | | 0.0136 | 7.04 | 23.9 | 15.40 | 23.9 | 4 days | C |

As can be seen in the results of Experimental Examples B2 shown in Table B4, it was found that even in the case in which the reformation process of the oxide fine particle dispersion solution is carried out by using the membrane filtration equipment not equipped with the disperser, the impurity amount decreases rapidly in the first region in which the conductivity of the oxide fine particle dispersion solution is higher than 100 µS/cm from the initial value, but in the second pH-dependent region in which the conductivity thereof is 100 µS/cm or less, the change in the impurity amount is so small that the dispersion property of the oxide fine particle dispersion solution is dependent more on the change of pH in the oxide fine particle dispersion solution than the change of the impurity amount therein. In addition, in Experimental Example B2-8 which was prepared by adding an aqueous solution of 0.001% by weight of nitric acid as the pH adjusting agent into the oxide fine particle dispersion solution of Experimental Example B2-5, and also in Experimental Example B2-9 which was prepared by adding an aqueous solution of 0.001% by weight of nitric acid as the pH adjusting agent into the oxide fine particle dispersion solution of Experimental Example B2-6, both were prepared in the similar manner to Experimental Examples B1, the dispersion property and stability could be improved as compared with those of Experimental Examples B2-5 and B2-6. Consequently, it was confirmed that even if the disperser is not used, the present invention can be used by the pH control such as lowering pH after the filtration process. Meanwhile, pH of the oxide particle dispersion solution obtained with the condition of Experierty could be confirmed. Consequently, it was confirmed that the present invention can be used even without using the disperser.
(Experimental Examples B3)

In Experimental Examples B3, the reformation process of the oxide fine particle dispersion solution was carried out with the same method as that of Experimental Examples, except that the circumferential velocity of the disperser in the equipment described in FIG. 1(A) was made to 7.1 m/sec. The conditions of Experimental Examples B3 are summarized in Table B12, and the results thereof are summarized in Table B5. Among the reformation experiments of the dispersion solutions relating to Experimental Examples B3, Experimental Examples B3-3 to B3-7 and Experimental Examples B3-9 to B3-11 correspond to Examples of the present invention; and Experimental Example B3-8 corresponds to Comparative Example of the present invention. All of the Experimental Examples corresponding to Examples of the present invention are dispersion solutions in the second pH-dependent region, and in these dispersion solutions the improvement in the dispersion stability was seen as compared with the dispersion solution in the first region. In the Experimental Example corresponding to Comparative Example of the present invention, even though it is in the second pH-dependent region, improvement in the dispersion stability was not seen as compared with the dispersion solution in the first region.

TABLE B5

| Experimental Example | Processing duration [h] | pH pH | pH [° C.] | Conductivity [μS/cm] | Conductivity [° C.] | Concentration of impurity [wt %] | pH after adjusting pH | pH after adjusting [° C.] | Conductivity after adjusting [μS · cm] | Conductivity after adjusting [° C.] | Dispersion Stability initial precipitation confirmation time | Precipitation degree |
|---|---|---|---|---|---|---|---|---|---|---|---|---|
| B3-1 | 0 | 12.50 | 21.6 | 9540 | 21.6 | 3.943 | — | — | — | — | 0.2 hour | F |
| B3-2 | 0.37 | 10.98 | 26.3 | 549 | 26.3 | 0.548 | — | — | — | — | 1.5 hours | F |
| B3-3 | 1.08 | 9.54 | 23.3 | 12.10 | 23.3 | 0.0192 | — | — | — | — | 7 hours | E |
| B3-4 | 2.16 | 8.49 | 23.6 | 14.26 | 23.6 | 0.0136 | — | — | — | — | 1 day later | D |
| B3-5 | 3.15 | 7.69 | 23.3 | 8.16 | 23.3 | 0.0060 | — | — | — | — | 2 days later | D |
| B3-6 | 4.59 | 7.31 | 23.6 | 6.66 | 23.6 | 0.0025 | — | — | — | — | 1 week | C |
| B3-7 | 7.89 | 7.24 | 23.6 | 6.48 | 23.6 | 0.0019 | — | — | — | — | 1 week | C |
| B3-8 | 13.59 | 6.31 | 23.6 | 4.12 | 23.6 | 0.0007 | — | — | — | — | 0.5 hour | F |
| B3-9 | Adding pH adjusting agent to the dispersion solution of Experimental Example B3-8 | | | | | 0.0015 | 6.81 | 26.7 | 6.12 | 26.7 | 4 days later | C |
| B3-10 | Adding pH adjusting agent to the dispersion solution of Experimental Example B3-8 | | | | | 0.0036 | 7.36 | 26.8 | 6.77 | 26.8 | 4 days later | C |
| B3-11 | Adding pH adjusting agent to the dispersion solution of Experimental Example B3-8 | | | | | 0.0104 | 8.25 | 26.9 | 23.30 | 26.9 | 2 days later | D |

As described in Table B5, as compared with Experimental Examples B1, the oxide fine particle dispersion solution needed longer time to reach pH and conductivity of Experimental Examples B1; but the process was carried out till pH of 6.31 by repeating the process. In Experimental Examples B3-5 to B3-7 in which the reformation process was carried out till pH of Experimental Examples B1 by continuing the reformation process, the dispersion property and dispersion stability could also be improved as compared with Experimental Examples B2-5 to B2-7 which obtained by processing without disperser, though similar dispersion property and dispersion stability to those of Experimental Examples B1 could not be confirmed.

(Adjustment of pH after Completion of Dispersion Process and Removal Process)

An aqueous 0.05% by weight of ammonia solution was added as the pH adjusting agent into the oxide fine particle dispersion solution of Experimental Example B3-8 (pH 6.31), and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain Experimental Examples B3-9 to B3-11. Experimental Example B3-9 in which pH was adjusted at 6.81 and conductivity at 6.12 μS/cm (measurement temperature of 26.7° C.) and Experimental Example B3-10 in which pH was adjusted at 7.36 and conductivity at 6.77 μS/cm (measurement temperature of 26.8° C.) exhibited similar dispersion stability and self-dispersion property to those of the oxide fine particle dispersion solutions of Experimental Examples B3-6 and B3-7. Experimental Example B3-11 in which pH was adjusted at 8.25 and conductivity at 23.3 μS/cm (measurement temperature of 26.9° C.) exhibited similar dispersion stability and self-dispersion property to those of the oxide fine particle dispersion solutions of Experimental Examples B3-4 and B3-5.

As can be seen in the results of Experimental Examples B3 shown in Table B5, it was found that even in the case in which the reformation process of the present invention is carried out under the condition that the circumferential velocity of the disperser is slower than that of Experimental Examples B1, the impurity amount decreases rapidly in the first region in which the conductivity of the oxide fine particle dispersion solution is higher than 100 μS/cm from the initial value, butin the second pH-dependent region in which the conductivity thereof is 100 μS/cm or less, the change in the impurity amount is so small that the dispersion property of the oxide fine particles in the oxide fine particle dispersion solution is dependent more on the change of pH in the oxide fine particle dispersion solution than the change of the impurity amount therein. Meanwhile, pH of the oxide particle dispersion solution obtained with the condition of Experimental Example B3-2 was made to 7.33 (measurement temperature of 24.2° C.) by addition of an aqueous solution of 0.001% by weight of nitric acid. At this time, the conductivity thereof was 892 μS/cm, wherein clear precipitation could be seen within 0.2 hours after the preparation thereof (immediately after preparation), resulting in separation into the phase including the oxide fine particles and the phase substantially not including the oxide fine particles. From these results, the same conclusion as Experimental Examples B1 could be obtained.

(Preparation of Dispersion Solutions to be used for Experimental Examples B4 and 5)

Experimental Examples B4 and B5 were carried out by using the oxide fine particle dispersion solution different from those of Experimental Examples B1 to B3. As the previous processes before obtaining the dispersion solutions to be used for Experimental Examples B4 and B5, the oxide raw material solution and the oxide separating solvent each were prepared by using Clearmix (product name: CLM-2.2S, manufactured by M. Technique Co., Ltd.), which is the high speed rotational dispersion emulsifier. Specifically, according to the prescription of the second fluid (B-solution) described in Table B6, each component of the oxide raw material solution were uniformly mixed by stirring for 30 minutes by using Clearmix with the rotation number of the rotor thereof being 20000 rpm and at the preparation temperature of 70° C. to obtain the oxide raw material solution. The first fluid (A-solution) described in Table B6 was only the solvent not having other substances dissolved therein; thus, nothing was especially carried out for preparation thereof. Meanwhile, the substances represented by chemical formula or abbreviation described in Table B6 are MeOH for methanol (manufactured by Godo Co., Ltd.), KOH for potassium hydroxide (manufactured by Nippon Soda Co., Ltd.), and ZnO for zinc oxide (manufactured by Kanto Chemical Co., Ltd.).

Next, the oxide raw material solution and the oxide separating solvent, both having been prepared as described above, were mixed by using the separation processing equipment illustrated in FIG. 1(B). Specifically, the oxide separating solvent was introduced as the A-solution into between the processing surfaces 1 and 2; and with operating the processing member 10 with the rotation number of 1700 rpm, the oxide raw material solution was introduced as the B-solution into the processing surfaces 1 and 2 so as to mix the oxide separating solvent and the oxide raw material solution in a thin film fluid, whereby the oxide fine particles were separated in between the processing surfaces 1 and 2, and thereby the fluid including the oxide fine particles (hereunder, oxide fine particle dispersion solution) was ejected from between the processing surfaces 1 and 2 of the separation processing equipment. The ejected oxide fine particle dispersion solution was recovered in a beaker via the vessel v.

In Table B7, operation conditions of the separation processing equipment are summarized. The introduction temperatures (supply temperatures) and introduction pressures (supply pressures) of the A-solution and B-solution described in Table B7 were measured by using the thermometers and pressure meters installed in the sealed introduction paths to between the processing surfaces 1 and 2 (first introduction part d1 and second introduction part d2), wherein the introduction temperature of the A-solution in Table B7 is the temperature of the actual A-solution under the introduction pressure in the first introduction part d1, and the introduction temperature of the B-solution is the temperature of the actual B-solution under the introduction pressure in the second introduction part d2.

Measurement of pH was made by using a pH meter (catalogue No. C-71; manufactured by HORIBA, Ltd.). Before the A-solution and B-solution were introduced into the separation processing equipment, pH of these solutions were measured at room temperature. Because pH measurement of the mixed fluid immediately after the oxide raw material solution was mixed with the oxide separating solvent was difficult, pH of the oxide fine particle dispersion solution which was ejected from the equipment and recovered in the beaker was measured at room temperature.

TABLE B6

| The prescription of the first fluid (A-solution) | | | | | The prescription of the second fluid (B-solution) | | | | | | | |
|---|---|---|---|---|---|---|---|---|---|---|---|---|
| | Prescription[wt %] | | pH | | | Prescription[wt %] | | | | | pH | |
| | Material | [wt %] | Material | [wt %] | | Material | [wt %] | Material | [wt %] | Material | [wt %] | pH | [° C.] |
| Oxide separating solvent | MeOH | 100.00 | 7.0 | 25.4 | Oxide raw material solution | ZnO | 3.00 | KOH | 46.00 | Pure Water | 50.40 | >14 | — |

TABLE B7

| Introduction flow amount(supply flow amount) ml/min | | Introduction temperatures (supply temperatures) [° C.] | | Introduction pressures (supply pressures) [MPaG] | | Discharged solution | | Particle diameter (D) [nm] |
|---|---|---|---|---|---|---|---|---|
| A solution | B solution | A solution | B solution | A solution | B solution | pH | Temperature | |
| 450 | 40 | 17 | 45 | 0.063 | 0.10 | >14 | — | 10.14 |

(Experimental Examples B4)

In the process of reforming the dispersion solution, from the oxide fine particle dispersion solution which was ejected from the separation processing equipment and then recovered in the beaker, the impurities were removed and pH thereof was controlled by using the dispersion solution reformation equipment 100 illustrated in FIG. 1(A) so as to carry out the reformation process of the oxide fine particle dispersion solution. In Table B10, the conditions thereof are summarized. The process was carried out with the same procedure as that of Experimental Examples B1 except for the conditions described in Table B10. Among the reformation experiments of the dispersion solutions relating to Experimental Examples B4, Experimental Examples B4-3 to B4-7, which are the dispersion solutions in the second pH-dependent region wherein improvement in the dispersion stability as compared with the dispersion solution in the first region can be seen, correspond to Examples of the present invention.

During the time of continuing the above-mentioned reformation process, part of the oxide fine particle dispersion solution was withdrawn from the storing vessel 130 at an interval; and these were designated as Experimental Examples B4-1 to B4-7. Concentration of the oxide fine particles in all the oxide fine particle dispersion solutions under the conditions of Experimental Examples B4-1 to B4-7 was 4.0% by weight as ZnO. In Table B8, results of Experimental Examples B4 as well as pH and conductivity of the oxide fine particle dispersion solution during the reformation process of the oxide fine particle dispersion solution are summarized. Meanwhile, the impurity in Experimental Examples B4 is KOH; and the concentrations thereof analyzed with ICP are summarized in Table B8. With regard to Experimental Examples B5, the impurity concentrations were calculated with the same methods. By carrying out the reformation process, pH and conductivity of the oxide fine particle dispersion solution approached almost the same values as those of MeOH used in the reformation process. Part of the oxide fine particle dispersion solution was withdrawn from each of Experimental Examples B4-1 to B4-7 under the conditions described in Table B8. The part of the withdrawn oxide fine particle dispersion solution each was diluted with propylene glycol (hereunder, PG), and this diluted solution was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 30 minutes. The part of the PG dispersion solution of the oxide fine particles thus obtained was diluted with isopropyl alcohol (hereunder, IPA), and then it was processed with an ultrasonic cleaning machine for 5 minutes. Then, the solution thus obtained was dropped onto a collodion film and dried in an atmosphere for 4 hours to obtain the sample for TEM observation. The rest of the PG dispersion solution of the oxide fine particles was subjected to the UV-Vis spectrum measurement.

(UV-Vis Spectrum)

For measurement of the UV-Vis spectrum, a UV-Vis absorption spectrophotometer (product name: UV-2450, manufactured by Shimadzu Corp.) was used. The transmission spectrum was measured with the measurement range of 200 nm to 800 nm, with the sampling rate of 0.2 nm, and with a slow measurement rate. For the transmission spectrum measurement, the dispersion solution obtained by dispersing the zinc oxide into PG with the concentration thereof being $1.9 \times 10^{-3}$ mol/L (as ZnO) was used as the measurement sample.

TABLE B8

| Experimental Example | Processing duration [h] | pH | | Conductivity | | Concentration of impurity [wt %] | Dispersion Stability | |
|---|---|---|---|---|---|---|---|---|
| | | | | | | | Initial precipitation confirmation time | Precipitation degree |
| | | pH | [° C.] | [µS/cm] | [° C.] | | | |
| B4-1 | 0 | >14 | 21.6 | 3233 | 21.6 | 5.24 | 0.2 hour | F |
| B4-2 | 0.14 | 13.21 | 23.9 | 231 | 23.9 | 0.174 | 2 hours | F |
| B4-3 | 1.59 | 8.23 | 23.9 | 6.41 | 23.9 | 0.0095 | 1 week | B |
| B4-4 | 2.16 | 7.76 | 23.9 | 5.31 | 23.4 | 0.0081 | 1 week | B |
| B4-5 | 3.16 | 7.31 | 23.9 | 3.26 | 23.4 | 0.0046 | 1 week | A |
| B4-6 | 4.48 | 7.21 | 23.9 | 2.14 | 23.4 | 0.0032 | 1 week | A |
| B4-7 | 5.90 | 7.02 | 23.9 | 1.84 | 23.6 | 0.0012 | 1 week | A |

(Dispersion Stability and Self-Dispersion Property)

In the oxide fine particle dispersion solutions of Experimental Examples B4-1 and B4-2, clear precipitation of the oxide fine particles was found at the time of initial precipitation confirmation time in table B8, wherein the phase including the oxide fine particles and the phase not substantially including the oxide fine particles were separated. In Experimental Examples B4-3 and B4-4, precipitation of the oxide fine particles was faintly observed at 1 week of the static state after the withdrawal. In the oxide fine particle dispersion solution of Experimental Examples B4-5 to B4-7, deposition of an extremely minute amount of the oxide fine particles was observed at 1 week of the static state after the withdrawal, but the precipitation amount thereof was about 0.2% by weight relative to the oxide fine particles included in the dispersion solution. It became clear that the dispersion stability of the oxide fine particle dispersion solution can be enhanced by controlling pH of the oxide fine particle dispersion solution in the range of 7.0 and 8.5 by using the dispersion solution reformation equipment of the present invention. Furthermore, with regard to Experimental Example B4-5 to B4-7, it was confirmed that the precipitation of the oxide fine particles at 2 weeks of the static state after the withdrawal decreased, wherein the deposition could not be substantially confirmed, from the deposition thereof at 1 week of the static state after the withdrawal. In the oxide fine particles in the oxide fine particle dispersion solution whose pH was adjusted in the range of 7.0 to 7.5 in Experimental Example B4-5 to B4-7, the deposited fine particles once generated during 1 week of the static state was re-dispersed without carrying out any dispersion process, so that it was presumed that the dispersion solution included the oxide fine particles having self-dispersion property.

(TEM Observation)

The TEM pictures of the oxide fine particles of Experimental Example B4-6 are shown in FIG. 11. From the TEM picture of FIG. 11(a), it was confirmed that the oxide fine particles were uniformly dispersed. From the TEM picture of FIG. 11(b), it was confirmed that the primary particle's diameter thereof was about 10 nm. Similar results were obtained in the oxide fine particles of Experimental Examples B4-5 and B4-7 (not shown by the drawing).

Figure 12:
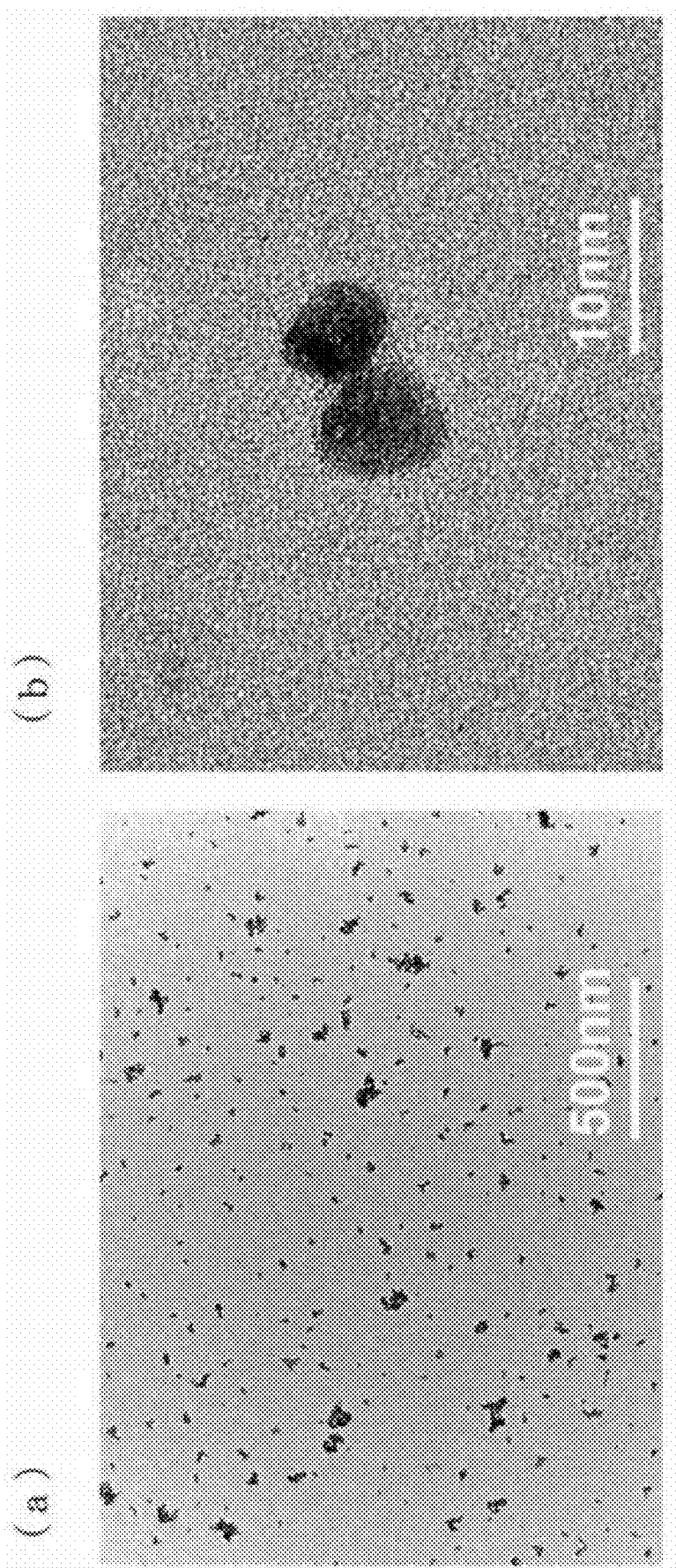
FIG. 12 These are the TEM pictures of the oxide fine particles in the oxide fine particle dispersion solution obtained in Experimental Example B4-3 of the present invention. Meanwhile, (a) and (b) are the observation results with the magnification of 10000 and 250000, respectively.

The TEM pictures of the oxide fine particles of Experimental Example B4-3 are shown in FIG. 12. From the TEM pictures of FIG. 12(a) and FIG. 12(b), it was observed that the oxide fine particles aggregated more as compared with Experimental Example B4-6; however, as compared with the oxide fine particles of Experimental Examples B4-1 and B4-2, number of the aggregates thereof was less, and the oxide fine particles were dispersed uniformly. Similar results were obtained in the oxide fine particles of Experimental Example B4-4 (not shown by the drawing).

Figure 16:
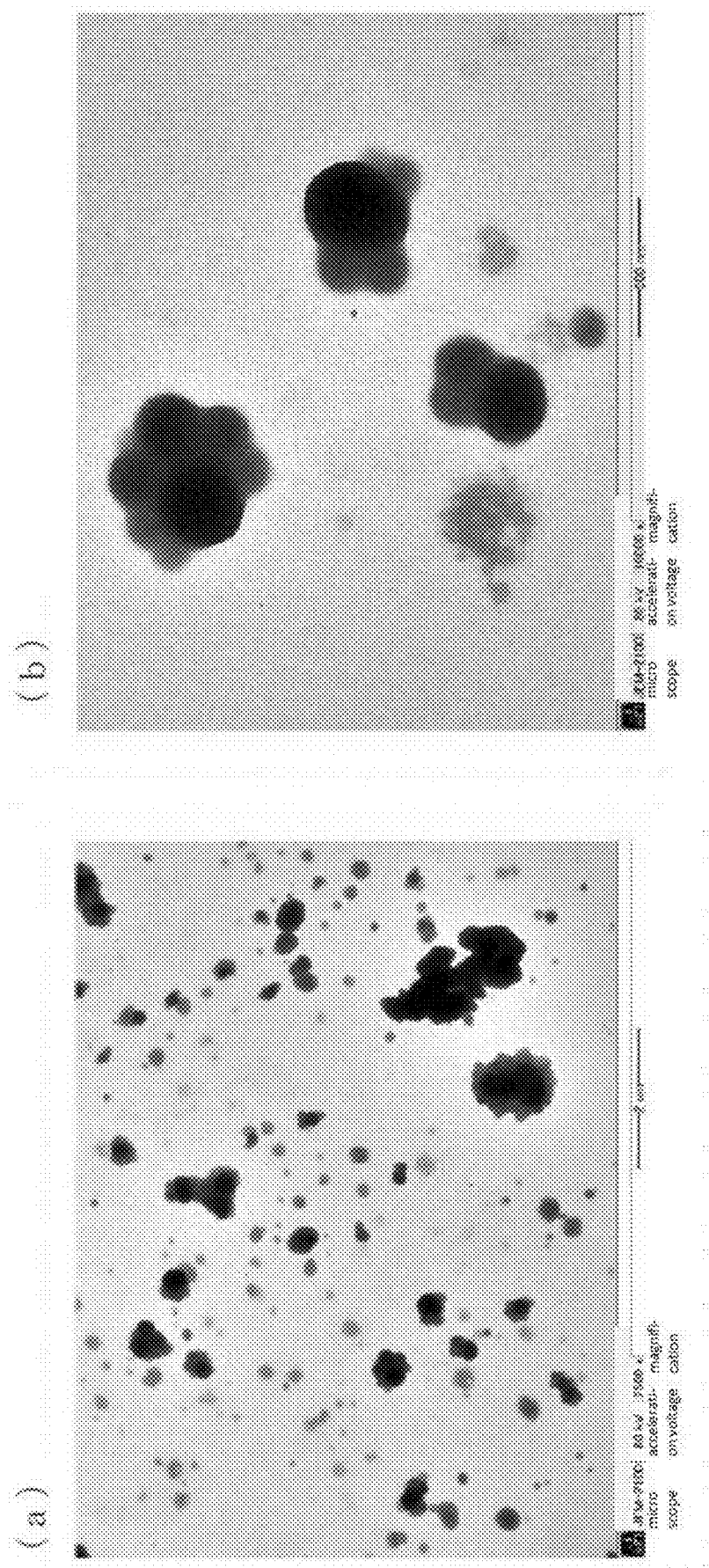
FIG. 16 These are the TEM pictures of the fine particles in the fine particle dispersion solution obtained in Experimental Example C1-7 of the present invention. Meanwhile, (a) and (b) are the observation results with the magnification of 2500 and 10000, respectively.
Figure 17:
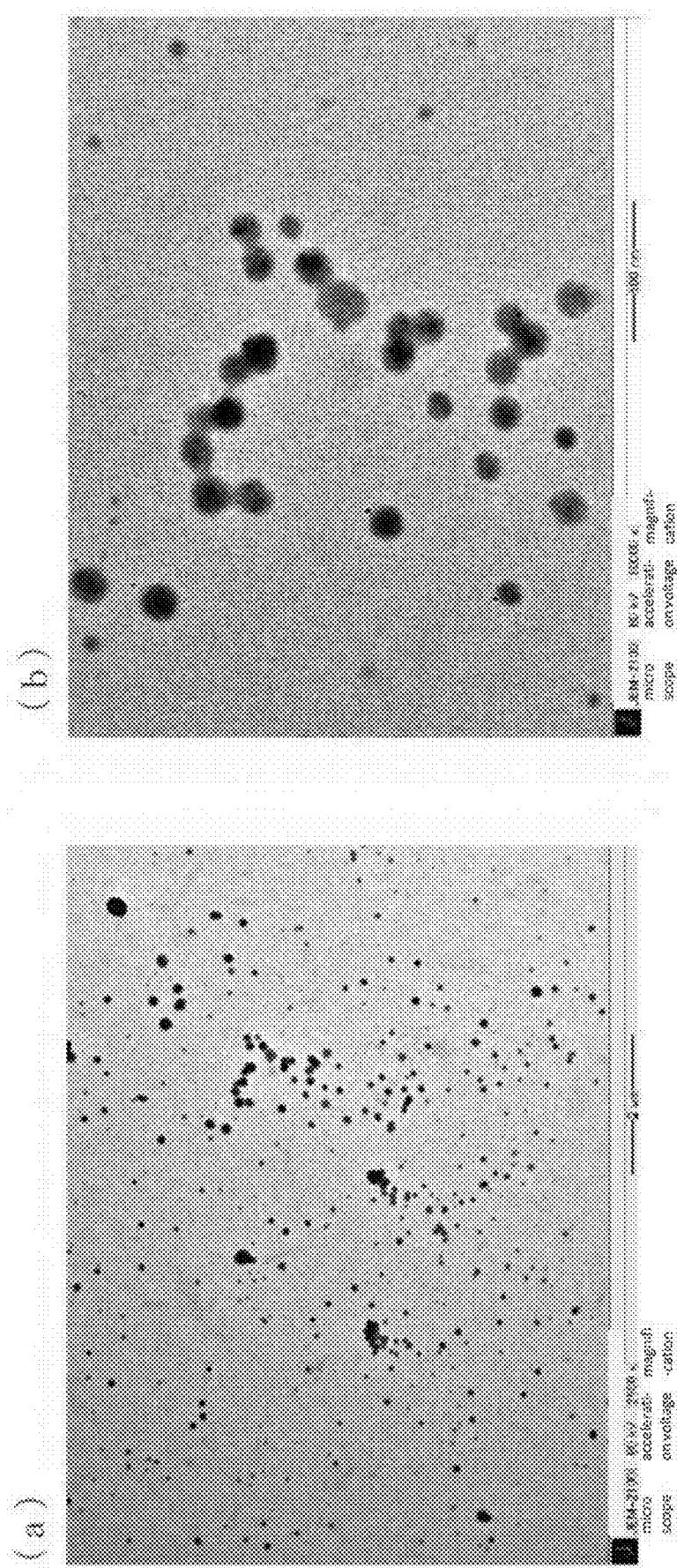
FIG. 17 These are the TEM pictures of the fine particles in the fine particle dispersion solution obtained in Experimental Example C1-4 of the present invention. Meanwhile, (a) and (b) are the observation results with the magnification of 2500 and 10000, respectively.

The TEM pictures of the oxide fine particles of Experimental Example B4-2 are shown in FIG. 16. From the TEM pictures of FIG. 16(a) and FIG. 16(b), it was observed that as compared with Experimental Examples B4-3 and B4-6 the oxide fine particles aggregated with more number of the aggregates. Similar results were observed in the oxide fine particles prepared under the condition of Experimental Example B4-1.

(Measurement of UV-Vis Spectra)

Figure 14:
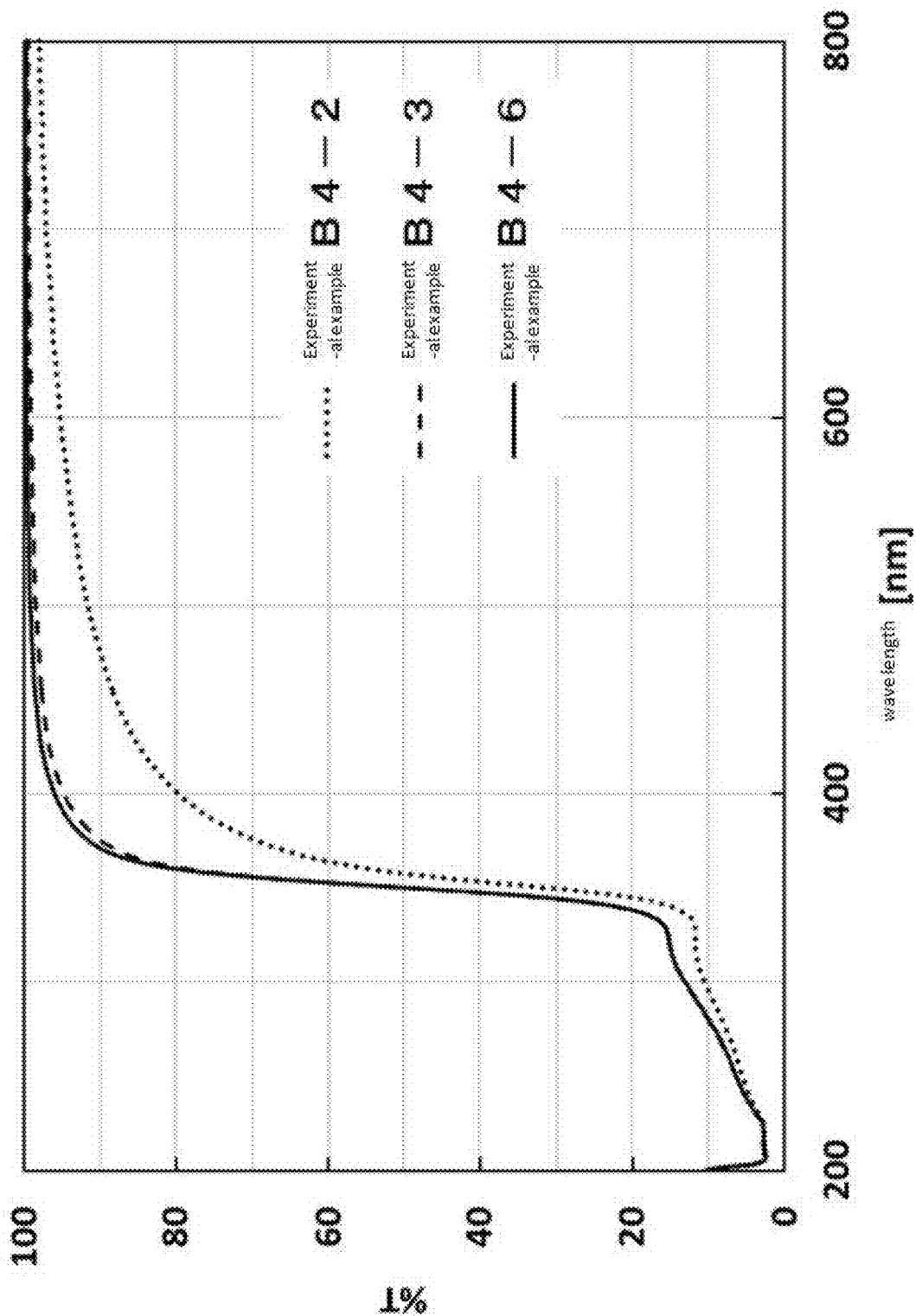
FIG. 14 This is the measurement results of the UV-Vis spectra (transmission spectra) of the propylene glycol dispersion solutions prepared by using oxide fine particle dispersion solutions with the conditions of Experimental Examples B4-2, B4-3, and B4-6 of the present invention.

The measurement results of the UV-Vis spectra (transmission spectra) of the PG dispersion solutions prepared by using the oxide fine particle dispersion solutions of Experimental Examples B4-2, B4-3, and B4-6 are shown in FIG. 14. The PG dispersion solutions prepared by using the oxide fine particle dispersion solutions of Experimental Examples B4-3 and B4-6 showed almost the identical spectrum form, wherein 90% or more of transmittance was observed in the wavelength range of 400 nm to 800 nm. On the other hand, the PG dispersion solution prepared under the condition of Experimental Example B4-2 showed lower transmittance than Experimental Examples B4-3 and B4-6 in the wavelength range of 700 nm to 800 nm. This is presumably because the dispersion property of the oxide fine particles in the oxide fine particle dispersion solution prepared under the condition of Experimental Example B4-2 is poorer than that of Experimental Examples B4-3 and B4-6, the oxide fine particles prepared under the condition of Experimental Examples B4-2 are not uniformly dispersed in the PG dispersion solution thereby forming the aggregates thereof, and thus, they show lower transmittance in the visible light region than the PG dispersion solutions of Experimental Examples B4-3 and B4-6.

From the results shown above, regardless of the core-shell type oxide fine particle or not, even in Experimental Examples B4, similarly to Experimental Examples B1, it was found that the impurity amount decreases rapidly in the first region in which the conductivity of the oxide fine particle dispersion solution is higher than 100 μS/cm from the initial value, but in the second pH-dependent region in which the conductivity thereof is 100 μS/cm or less, the change in the impurity amount is so small that the dispersion property of the oxide fine particles in the oxide fine particle dispersion solution is dependent more on the change of pH in the oxide fine particle dispersion solution than the change of the impurity amount therein. Further, it was found that the dispersion stability is improved by bringing the pH of the oxide fine particle dispersion solution into the range of 7.0 to 8.5 by using the oxide fine particle dispersion solution reformation equipment of the present invention, and that the dispersion property of the oxide fine particle dispersion solution, prepared by using other dispersing medium together with the obtained oxide fine particle dispersion solution, is also improved.

In Experimental Examples B5, the reformation process of the oxide fine particle dispersion solution was carried out by the same method as that of Experimental Examples B4, except that the disperser and the dispersing vessel in the equipment illustrated in FIG. 1(A) were removed, thereby the filtration was carried out by directly sending the oxide fine particle dispersion solution filled in the storing vessel 130 to the removing unit 120 by using the pump 104. The results of Experimental Examples B5 are summarized in Table B9.

Among the reformation experiments of the dispersion solutions relating to Experimental Examples B5, Experimental Examples B5-6 to B5-9 correspond to Examples of the present invention; and Experimental Examples B5-3 to B5-5 correspond to Comparative Examples of the present invention. All of Experimental Examples corresponding to Examples of the present invention are dispersion solutions in the second pH-dependent region, and in these dispersion solutions the improvement in the dispersion stability was seen as compared with the dispersion solution in the first region. In all of Experimental Examples corresponding to Comparative Examples of the present invention, even though they are in the second pH-dependent region, improvement in the dispersion stability was not seen as compared with the dispersion solution in the first region.

TABLE B9

| Experimental Example | Processing duration [h] | pH pH | pH [° C.] | Conductivity [μS/cm] | Conductivity [° C.] | Concentration of impurity [wt %] | pH after adjusting pH | pH after adjusting [° C.] | Conductivity after adjusting [μS · cm] | Conductivity after adjusting [° C.] | Dispersion Stability initial precipitation confirmation time | Precipitation degree |
|---|---|---|---|---|---|---|---|---|---|---|---|---|
| B5-1 | 0 | >14 | 21.6 | 3233 | 21.6 | 5.24 | — | — | — | — | 0.2 hour | F |
| B5-2 | 0.28 | 13.46 | 24.3 | 332 | 24.3 | 0.246 | — | — | — | — | 0.5 hour | F |
| B5-3 | 1.14 | 9.97 | 24.1 | 15.60 | 24.1 | 0.0190 | — | — | — | — | 1 hour | F |
| B5-4 | 2.39 | 8.79 | 24.3 | 11.29 | 24.3 | 0.0110 | — | — | — | — | 2 hours | F |
| B5-5 | 3.34 | 8.19 | 24.3 | 5.79 | 24.3 | 0.0090 | — | — | — | — | 5 hours | F |
| B5-6 | 4.98 | 7.71 | 24.1 | 5.29 | 24.1 | 0.0084 | — | — | — | — | 11 hours | E |
| B5-7 | 5.28 | 7.59 | 24.3 | 4.39 | 24.3 | 0.0052 | — | — | — | — | 17 hours | E |

TABLE B9-continued

| Experimental Example | Processing duration [h] | pH pH | pH [° C.] | Conductivity [μS/cm] | Conductivity [° C.] | Concentration of impurity [wt %] | pH after adjusting pH | pH after adjusting [° C.] | Conductivity after adjusting [μS · cm] | Conductivity after adjusting [° C.] | Dispersion Stability initial precipitation confirmation time | Precipitation degree |
|---|---|---|---|---|---|---|---|---|---|---|---|---|
| B5-8 | Adding pH adjusting agent to the dispersion solution of Experimental Example B3-8 | | | | | 0.0092 | 7.32 | 24.5 | 18.29 | 24.5 | 2 days later | D |
| B5-9 | Adding pH adjusting agent to the dispersion solution of Experimental Example B3-8 | | | | | 0.0105 | 7.21 | 24.5 | 12.19 | 24.5 | 2 days later | D |

As can be seen in the results of Experimental Examples B5 shown in Table B9, it was found that even in the case in which the reformation process of the oxide fine particle dispersion solution is carried out by using the membrane filtration equipment not equipped with the disperser, the impurity amount decreases rapidly in the first region in which the conductivity of the oxide fine particle dispersion solution is higher than 100 μS/cm from the initial value, but in the second pH-dependent region in which the conductivity thereof is 100 μS/cm or less, the change in the impurity amount is so small that the dispersion property of the oxide fine particle dispersion solution is dependent more on the change of pH in the oxide fine particle dispersion solution than the change of the impurity amount therein. In addition, in Experimental Example B5-9 which was prepared, in a similar manner to Experimental Examples B1, by adding an aqueous solution of 0.0001% by weight of nitric acid as the pH adjusting agent into the oxide fine particle dispersion solutions of Experimental Examples B5-4 and B5-5, which correspond to Comparative Examples of the present invention, the dispersion property and stability could be improved as compared with those of Experimental Examples B5-4 and B5-5. Consequently, it was confirmed that even if the disperser is not used, the present invention can be used by the pH control such as lowering pH after the filtration process. Meanwhile, pH of the oxide particle dispersion solution obtained with the condition of Experimental Example B5-2 was made to 7.64 (measurement temperature of 24.1° C.) by adding an aqueous solution of 0.0001% by weight of nitric acid. At this time, the conductivity thereof was 679 μS/cm, wherein clear precipitation could be seen within 0.2 hours after the preparation thereof (immediately after preparation), resulting in separation into the phase including the oxide fine particles and the phase substantially not including the oxide fine particles. From these results, the same conclusion as Experimental Examples B1 could be obtained. Meanwhile, in Experimental Examples B5, because the disperser was not used, the dispersion property inferior to that of Experimental Examples B1 was resulted; however, even though it was inferior, by the pH control such as lowering pH in the second pH-dependent region, improvement in the dispersion property could be confirmed. Consequently, it was confirmed that the present invention can be used even without using the disperser.

TABLE B10

| | | Experimental example B1 | Experimental example B2 | Experimental example B3 | Experimental example B4 | Experimental example B |
|---|---|---|---|---|---|---|
| | Processed liquid | Oxide fine particle dispersion solution: Solution of iron oxide fine particle whose surface is covered with a silicon oxide | Same as on the left | Same as on the left | MeOH 15 L (≈12 kg) | Same as on the left |
| (1) | First solution charged into the storing vessel 130 | Type: Pure Water, pH 5.89 (measurement temperature of 22.4° C.), Conductivity 0.80 μS/cm (measurement temperature of 22.4° C.), Charged amount 15 kg | Same as on the left | Same as on the left | Type: MeOH, pH 7.00(measurement temperature of 23.5° C.), Conductivity 0.01 μS/cm (measurement temperature of 23.5° C.), Flow amount: 0.7 L/h, 24° C. | Same as on the left |
| (2) | Type, flow amount, and temperature of the cross-flow washing solution | Type: Pure Water, pH 5.89 (measurement temperature of 22.4° C.), Conductivity 0.80 μS/cm (measurement temperature of 22.4° C.), Flow amount 1.5 L/min, 21° C. | Same as on the left | Same as on the left | Same as on the left | Same as on the left |

TABLE B10-continued

|   | | Experimental example B1 | Experimental example B2 | Experimental example B3 | Experimental example B4 | Experimental example B |
|---|---|---|---|---|---|---|
| (3) | Disperser 102 | Clearmix (product name: CLM-2.2S, rotor: R1, screen: S0.8-48, manufactured by M. Technique Co., Ltd.) | Not installed | Clearmix (product name: CLM-2.2S, rotor: R1, screen: S0.8-48, manufactured by M. Technique Co., Ltd.) | Same as on the left | Not installed |
| (4) | Removing unit 120 | Hollow fiber type dialyzer (product name; APS-21MD New, membrane area; 2.1 m$^2$, material; polysulfone, manufactured by Asahi Kasei Medical Co., Ltd.) | Same as on the left | Same as on the left | Same as on the left | Same as on the left |
| (5) | Rotation number of the rotor | 20000 rpm (circumferential velocity of 31.4 m/sec) | 4500 rpm (circumferential velocity of 23.6 m/sec) | 10000 rpm (circumferential velocity of 7.9 m/sec) | — | — |
| (6) | Starting to charge the oxide fine particle dispersion solution | When the pure water in the storing vessel 130 was discharged until 1 L. | Same as on the left | Same as on the left | Same as on the left | Same as on the left |
| (7) | Amount of the oxide fine particle dispersion solution charged into the storing vessel 130 | 14 L ((≈14 kg) | Same as on the left | Same as on the left | 15 L (≈12 kg) | Same as on the left |
| (8) | pH of the metal fine dispersion solution in the storing vessel 130 | 12.50 (measurement temperature of 21.6° C.) | Same as on the left | Same as on the left | Same as on the left | Same as on the left |
| (9) | Conductivity of the oxide fine particle dispersion solution in the storing vessel 130 | 9540 μS/cm (measurement temperature of 21.6° C.) | Same as on the left | Same as on the left | 3233 μS/cm (measurement temperature of 22.6° C.) | Same as on the left |
| (10) | Flow amount of the pump 104 | 4.4 L/min | Same as on the left | Same as on the left | Same as on the left | Same as on the left |
| (11) | Flow amount of the metal fine dispersion solution returned to the storing vessel 130 | 3.7 L/min | Same as on the left | Same as on the left | Same as on the left | Same as on the left |
| (12) | Amount of the filtrate L3 discharged by the removing unit 120 (Calculated value) | 0.7 L/min | Same as on the left | Same as on the left | Same as on the left | Same as on the left |
| (13) | Timing of charging the dilution into the storing vessel 130 | When the dispersion solution in the storing vessel 130 was concentrated to 1.5 L (about 1.5 kg). | Same as on the left | Same as on the left | Same as on the left | Same as on the left |
| (14) | Type and amount of the second dilution charged into the storing vessel 130 | Type: pure water, 3 L (≈3.0 kg), (pH: 5.89 (measurement temperature of 22.4° C.), conductivity: 0.80 μS/cm (measurement temperature of 23.1° C.)), Charged amount: 13.5 L (≈13.5 kg) | Same as on the left | Same as on the left | Same as on the left | Same as on the left |
| (15) | Concentration of the oxide fine particles in the oxide fine particle dispersion solution | Between 0.4 wt % to 2.0 wt % | Same as on the left | Same as on the left | Between 1.0 wt % to 10.0 wt % | Same as on the left |
| (16) | Pressure meters | Pa: Both two 0.10 MPaG | Same as on the left | Same as on the left | Same as on the left | Same as on the left |
| (17) | Pressure meters | Pb: 0.15 MPaG | Same as on the left | Same as on the left | Same as on the left | Same as on the left |
| (18) | Pressure meters | Pc: 0.02 MPaG | Same as on the left | Same as on the left | Same as on the left | Same as on the left |
| (19) | Path length (Lea) | 0.3 m | — | Same as on the left | Same as on the left | — |
| (20) | Pipe's inner diameter (Leb) | 0.0105 m | — | 0.0105 m | Same as on the left | — |
| (21) | Flow rate of the fine particle dispersion solution in the just-before transporting path | 1.2 m/sec | — | 1.2 m/sec | Same as on the left | |

TABLE B10-continued

|  |  | Experimental example B1 | Experimental example B2 | Experimental example B3 | Experimental example B4 | Experimental example B |
|---|---|---|---|---|---|---|
| (22) | Time T1 from the dispersing vessel 101 to start of removal of the impurity by the removing unit 120 | 0.24 sec | — | 0.24 sec | Same as on the left | — |
| (23) | Thermometer installed in the dispersing vessel 101 | From 22° C. to 24° C. | Same as on the left | Same as on the left | From 23° C. to 24° C. | Same as on the left |
| (24) | Temperature of the metal fine particle dispersion solution | From 22° C. to 24° C. | Same as on the left | Same as on the left | From 23° C. to 24° C. | Same as on the left |
| (25) | Conductivity meter | Conductivity meter (catalogue number; ES-51, manufactured by HORIBA, Ltd.) | Same as on the left | Same as on the left | Same as on the left | Same as on the left |

(Experimental Examples C: Experiments on the Dispersion Solution of Organic Substance Fine Particles (Curcumin Fine Particles))

In Experimental Examples C, experiments were carried out with regard to curcumin as the organic substance. As the previous processes before obtaining the dispersion solution, the organic substance raw material solution and the organic substance separating solvent each were prepared by using Clearmix (product name: CLM-2.2S, manufactured by M. Technique Co., Ltd.), which is the high speed rotational dispersion emulsifier. Specifically, according to the prescription of the second fluid (B-solution) described in Table C1, each component of the organic substance raw material solution were uniformly mixed by stirring for 30 minutes by using Clearmix with the rotation number of the rotor thereof being 20000 rpm at the preparation temperature of 25° C. to obtain the organic substance raw material solution. Also, according to the prescription of the first fluid (A-solution) described in Table C1, each component of the organic substance separating solvent were uniformly mixed by stirring for 30 minutes by using Clearmix with the rotation number of the rotor thereof being 15000 rpm at the preparation temperature of 35° C. to obtain the organic substance separating solvent.

Meanwhile, the substances represented by chemical formula or abbreviation described in Table C1 are HPMC for hydroxymethyl cellulose (Metolose SE-03, manufactured by Shin-Etsu Chemical Co., Ltd.), citric acid (manufactured by Kanto Chemical Co., Ltd.), curcumin (special grade, manufactured by Wako Pure Chemical Corporation), and EtOH for ethanol (purity of 99.5%, manufactured by Kanto Chemical Co., Ltd.). Pure water with pH of 5.86 (measurement temperature of 18.4° C.) and conductivity of 0.83 μS/cm (measurement temperature of 18.3° C.) was used.

Next, as the process to obtain the dispersion solution, the organic substance raw material solution and the organic substance separating solvent, both having been prepared as described above, were mixed by using the separation processing equipment illustrated in FIG. 3(A). In these Experimental Examples, the third introduction part d30 was not arranged, so that the third fluid to be processed was not used (not illustrated in the drawing). Specifically, the organic substance separating solvent was introduced as the A-solution into between the processing surfaces 1 and 2; and with operating the processing member 10 with the rotation number of 500 rpm, the organic substance raw material solution was introduced as the B-solution into the processing surfaces 1 and 2 so as to mix the organic substance separating solvent and the organic substance raw material solution in a thin film fluid, whereby the organic substance fine particles were separated in between the processing surfaces 1 and 2.

As a result, the fluid including the organic substance fine particles (organic substance fine particle dispersion solution) was ejected from between the processing surfaces 1 and 2 of the separation processing equipment. The ejected organic substance fine particle dispersion solution was recovered in a beaker via the vessel v.

In Table C2, operation conditions of the separation processing equipment are summarized. The introduction temperatures (supply temperatures) and introduction pressures (supply pressures) of the A-solution and B-solution described in Table C2 were measured by using the thermometers and pressure meters installed in the sealed introduction paths to between the processing surfaces 1 and 2 (first introduction part d1 and second introduction part d2), wherein the introduction temperature of the A-solution in Table C2 is the temperature of the actual A-solution under the introduction pressure in the first introduction part d1, and the introduction temperature of the B-solution in the same table is the temperature of the actual B-solution under the introduction pressure in the second introduction part d2.

Measurement of pH was made by using a pH meter (catalogue No. D-71; manufactured by HORIBA, Ltd.). Before the A-solution was introduced into the separation processing equipment, pH of this solution was measured at the temperatures described in Table C1. Because pH measurement of the mixed fluid immediately after the organic substance raw material solution was mixed with the organic substance separating solvent was difficult, pH of the organic substance fine particle dispersion solution that was ejected from the equipment and recovered in the beaker was measured at room temperature.

TABLE C1

The prescription of the first fluid (A-solution)

| Prescription | | | | | | pH | |
|---|---|---|---|---|---|---|---|
| Material | [wt %] | Material | [wt %] | Material | [wt %] | pH | ° C. |
| HPMC | 0.80 | citric acid | 0.005 | Pure water | 99.195 | 3.81 | 26.7 |

The prescription of the second fluid (B-solution)

| Prescription | | | | pH | |
|---|---|---|---|---|---|
| Material | [wt %] | Material | [wt %] | pH | ° C. |
| Curcumin | 0.50 | EtOH | 99.50 | — | — |

TABLE C2

| | Introduction flow amount ml/min | | Introduction temperatures (supply temperatures) [° C.] | | Introduction pressures (supply pressures) [MPaG] | | Discharged solution | |
|---|---|---|---|---|---|---|---|---|
| Experimental Examples | A solution | B solution | A solution | B solution | A solution | B solution | pH | Temperature |
| B | 450 | 150 | 29 | 30 | 0.07 | 0.10 | 4.14 | 24.1 |

(Experimental Examples C1)

In the process of reforming the dispersion solution, from the organic substance fine particle dispersion solution which was ejected from the separation processing equipment and then recovered in the beaker, impurities were removed and pH thereof was controlled by using the dispersion solution reformation equipment 100 illustrated in FIG. 1(A). In Table C3 to be described later, the methods and conditions of the reformation process of each Experimental Examples C1 to C2 of the present invention are summarized. The process was carried out with the same procedure as that of Experimental Examples A except for the conditions described in Table C3. Among the reformation experiments of the dispersion solutions relating to Experimental Examples C1, Experimental Examples C1-3 to C1-8 which are the dispersion solutions in the second pH-dependent region wherein improvement in the dispersion stability as compared with the dispersion solution in the first region can be seen, correspond to Examples of the present invention.

TABLE C3

| | | Experimental Example C1 | Experimental Example C2 |
|---|---|---|---|
| | Processed liquid | Organic fine particle dispersion solution: Curcumin fine particle dispersion solution | Same as on the left |
| (1) | Amount of the first solution charged into the storing vessel 130 | Type: Pure Water, pH 5.91 (measurement temperature of 21.2° C.), Conductivity 0.8 9 μS/cm (measurement temperature of 22.0° C.), Charged amount 5 kg | Same as on the left |
| (2) | Type, flow amount, and temperature of the cross-flow washing solution | Type: Pure Water, pH 5.91 (measurement temperature of 21.2° C.), Conductivity 0.89 μS/cm (measurement temperature of 22.0° C.), Flow amount 1.5 L/min, 21° C. | Same as on the left |
| (3) | Disperser 102 | Clearmix (product name: CLM-2.2S, rotor: R1, screen: S0.8-48, manufactured by M. Technique Co., Ltd. ) | Same as on the left |
| (4) | Removing unit 120 | hollow fiber type dialyzer (product name; APS-21MD New, membrane area; 2.1 m², material; polysulfone, manufactured by Asahi Kasei Medical Co., Ltd.) | Same as on the left |
| (5) | Rotation number of the rotor | 20000 rpm (circumferential velocity of 31.4 m/sec) | 15000 rpm (circumferential velocity of 23.6 m/sec) |
| (6) | Starting to charge the organic fine particle dispersion solution | When the pure water in the storing vessel 130 was discharged until 1 L. | Same as on the left |
| (7) | Amount of the organic fine particle dispersion solution charged into the storing vessel 130 | 4 L (≈4 kg) | Same as on the left |
| (8) | pH of the metal fine dispersion solution in the storing vessel 130 | 4.23 (measurement temperature of 23.2° C.) | Same as on the left |
| (9) | Conductivity of the metal fine dispersion solution in the storing vessel 130 | 339 μS/cm (measurement temperature of 23.4° C.) | Same as on the left |
| (10) | Flow amount of the pump 104 | 6.4 L/min | Same as on the left |
| (11) | Flow amount of the metal fine dispersion solution returned to the storing vessel 130 | 5.4 L/min | Same as on the left |
| (12) | Amount of the filtrate L3 discharged by the removing unit 120 (Calculated value) | 1.0 L/min | Same as on the left |
| (13) | Timing of charging the dilution into the storing vessel 130 | When the dispersion solution in the storing vessel 130 was concentrated to 2.0 L. | Same as on the left |

TABLE C3-continued

| | Experimental Example C1 | Experimental Example C2 |
|---|---|---|
| (14) Type and amount of the second dilution charged into the storing vessel 130 | Type: pure water, (pH: 5.86 (measurement temperature of 23.2° C.), conductivity: 0.83 µS/cm (measurement temperature of 23.1° C.)), 3 L (≈3.0 kg) | Same as on the left |
| (15) Concentration of the metal fine particles in the metal fine particle dissolution solution | Between 0.1 wt % to 0.2 wt % | Same as on the left |
| (16) Pressure meters | Pa: Both two 0.10 MPaG | Same as on the left |
| (17) Pressure meters | Pb: 0.15 MPaG | Same as on the left |
| (18) Pressure meters | Pc: 0.02 MPaG | Same as on the left |
| (19) Path length (Lea) | 0.3 m | Same as on the left |
| (20) Pipe's inner diameter (Leb) | 0.0105 m | Same as on the left |
| (21) Flow rate of the fine particle dispersion solution in the just-before transporting path | 1.2 m/sec | Same as on the left |
| (22) Time T1 from the dispersing vessel 101 to start of removal of the impurity by the removing unit 120 | 0.24 sec | Same as on the left |
| (23) thermometer installed in the dispersing vessel 101 | From 24° C. to 28° C. | Same as on the left |
| (24) temperature of the metal fine particle dispersion solution | From 23° C. to 25° C. | Same as on the left |
| (25) Conductivity meter | Conductivity meter (catalogue number; ES-51, manufactured by HORIBA, Ltd.) | Same as on the left |

During the time of continuing the reformation process under the conditions of Experimental Examples C1 as described in Table C3, part of the organic substance fine particle dispersion solution was withdrawn from the storing vessel 130 at an interval; and these were designated as Experimental Examples C1-1 to C1-5, and the dispersion solutions obtained by adding a pH adjusting agent to the organic substance fine particle dispersion solution of Experimental Example C1-5 were designated as Experimental Examples C1-6 and C1-7, and the dispersion solution obtained by adding a pH adjusting agent to Experimental Example C1-6 was designated as Experimental Example C1-8. Concentration of the organic substance fine particles in all the organic substance fine particle dispersion solutions obtained under the conditions of Experimental Examples C1-1 to C1-8 was 0.2% by weight as curcumin. In Table C4-1, pH, conductivity, and residual rate of ethanol (EtOH residual rate) in the organic substance fine particle dispersion solution during the reformation process of the organic substance fine particle dispersion solution are summarized. Meanwhile, the impurities in Experimental Examples C1 are EtOH and citric acid, which were respectively analyzed by using a gas chromatography (GC) as well as by a high speed liquid chromatography (HPLC); and the results thereof are summarized in Table C4-1 as the total impurity concentration. In addition, the EtOH residual rate described above is the ethanol concentration included in the curcumin powder which was obtained by freeze drying of the partly withdrawn organic substance fine particle dispersion solution in each condition of Experimental Examples C1-1 to C1-8, wherein the residual rate was obtained by the gas chromatography measurement of the thus obtained curcumin powder dissolved in dimethyl sulfoxide (DMSO). In the Table, the description that the EtOH residual rate is zero means the result that the content of EtOH therein was below the detection limit (EtOH residual rate in the curcumin powder: 0.01%) in the gas chromatography measurement (GC). The impurity concentrations and EtOH residual rates of all of Experimental Examples C1 to C7 were calculated by the same methods as described before.

As can be seen in Table C4-1, by carrying out the reformation process, pH and conductivity of the organic substance fine particle dispersion solution approached almost the same as those of the cross-flow washing solution and the pure water charged into the storing vessel 130. In each of Experimental Examples C1-1 to C1-8, part of the withdrawn organic substance fine particle dispersion solution was diluted, and this diluted solution was dropped onto a collodion film and dried in an atmosphere for 4 hours to obtain the sample for TEM observation.

TABLE C4-1

| Experimental Example | Processing duration [h] | pH | pH [°C.] | Conductivity [μS/cm] | Conductivity [°C.] | Concentration of impurity [wt %] | pH after preparation pH | pH after preparation [°C.] | Conductivity after preparation [μS·cm] | Conductivity after preparation [°C.] | Dispersion Stability initial precipitation confirmation time | Dispersion Stability Precipitation degree | EtOH residual rate [%] |
|---|---|---|---|---|---|---|---|---|---|---|---|---|---|
| B1-1 | 0.00 | 4.23 | 25.4 | 339 | 25.1 | 20.83 | — | — | — | — | 0.5 hour | F | 3.52 |
| B1-2 | 0.10 | 4.95 | 25.4 | 115.2 | 25.4 | 3.46 | — | — | — | — | 1 hour | F | 0.22 |
| B1-3 | 0.23 | 5.46 | 25.8 | 36.5 | 25.9 | 0.0113 | — | — | — | — | 1 week | B | 0.05 |
| B1-4 | 0.35 | 5.52 | 26.1 | 11.2 | 26.4 | 0.0034 | — | — | — | — | 1 week | B | 0 |
| B1-5 | 0.50 | 5.82 | 27.4 | 5.15 | 26.9 | 0.0016 | — | — | — | — | 1 week | A | 0 |
| B1-6 | Adjusting pH of dispersion solution of Experimental Example C1-5 by using pH adjusting agent | | | | | 0.0024 | 6.51 | 25.1 | 6.29 | 25.3 | 1 week | B | 0 |
| B1-7 | Adjusting pH of dispersion solution of Experimental Example C1-5 by using pH adjusting agent | | | | | 0.0038 | 7.68 | 25.1 | 20.1 | 25.1 | 4 days later | C | 0 |
| B1-8 | Adjusting pH of dispersion solution of Experimental Example C1-6 by using pH adjusting agent | | | | | 0.0039 | 5.81 | 25.4 | 5.94 | 25.1 | 1 week | A | 0 |

(Dispersion Stability and Self-Dispersion Property)

In the organic substance fine particle dispersion solutions of Experimental Examples C1-1 and C1-2, precipitation was found at the time described in the initial precipitation confirmation time in Table C4-1, wherein it was confirmed that the phase including the organic substance fine particles and the phase not substantially including the organic substance fine particles were separated. In Experimental Examples C1-3 and C1-4, precipitation of the organic substance fine particles was faintly observed at 1 week of the static state after the withdrawal. In the organic substance fine particle dispersion solution of Experimental Example C1-5, precipitation of an extremely minute amount of the organic substance fine particles was observed at 1 week of the static state after the withdrawal, but the precipitation amount thereof was about 0.1% by weight relative to the organic substance fine particles included in the dispersion solution. It became clear that the dispersion property of the organic substance fine particles in the organic substance fine particle dispersion solution could be enhanced by controlling pH or conductivity thereof on the basis of the processing time of the organic substance fine particle dispersion solution using the dispersion solution reformation equipment of the present invention. Furthermore, with regard to Experimental Example C1-5, it was confirmed that the precipitation amount of the organic substance fine particles at 2 weeks of the static state after the withdrawal decreased, whereby the precipitation could not substantially be confirmed, from the precipitation amount thereof at 1 week of the static state after the withdrawal, and this solution was re-dispersed without carrying out any dispersion process, so that it was presumed that the dispersion solution included the organic substance fine particles having self-dispersion property.

(Adjustment of pH after Completion of Removal Process)

An aqueous 0.05% by weight of sodium bicarbonate solution was added as the pH adjusting agent into the organic substance fine particle dispersion solution of Experimental Example C1-5, and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain Experimental Examples C1-6 and C1-7. Also, an aqueous 0.02% by weight of an aqueous citric acid solution was added as the pH adjusting agent into Experimental Example C1-6, and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain the organic substance fine particle dispersion solution of Experimental Example C1-8. The results of Experimental Examples C1-6 to C1-8 are summarized in Table C4-1. Experimental Example C1-6 in which pH was adjusted at 6.51 (measurement temperature of 25.1° C.) and conductivity at 6.29 μS/cm (measurement temperature of 25.3° C.) exhibited similar dispersion stability to that of the organic substance fine particle dispersion solution of Experimental Example C1-3 or C1-4. In Experimental Example C1-7 in which pH was adjusted at 7.68 (measurement temperature of 25.1° C.) and conductivity at 20.1 μS/cm (measurement temperature of 25.1° C.), the dispersion stability thereof was decreased as compared with Experimental Example C1-5. Experimental Example C1-8 in which pH was adjusted at 5.81 (measurement temperature of 25.4° C.) and conductivity at 18.6 μS/cm (measurement temperature of 25.1° C.) exhibited similar dispersion stability and self-dispersion property to those of the organic substance fine particle dispersion solutions obtained under the condition of Experimental Example C1-5.

(Assessment of Dispersion Property: TEM Observation)

Figure 15:
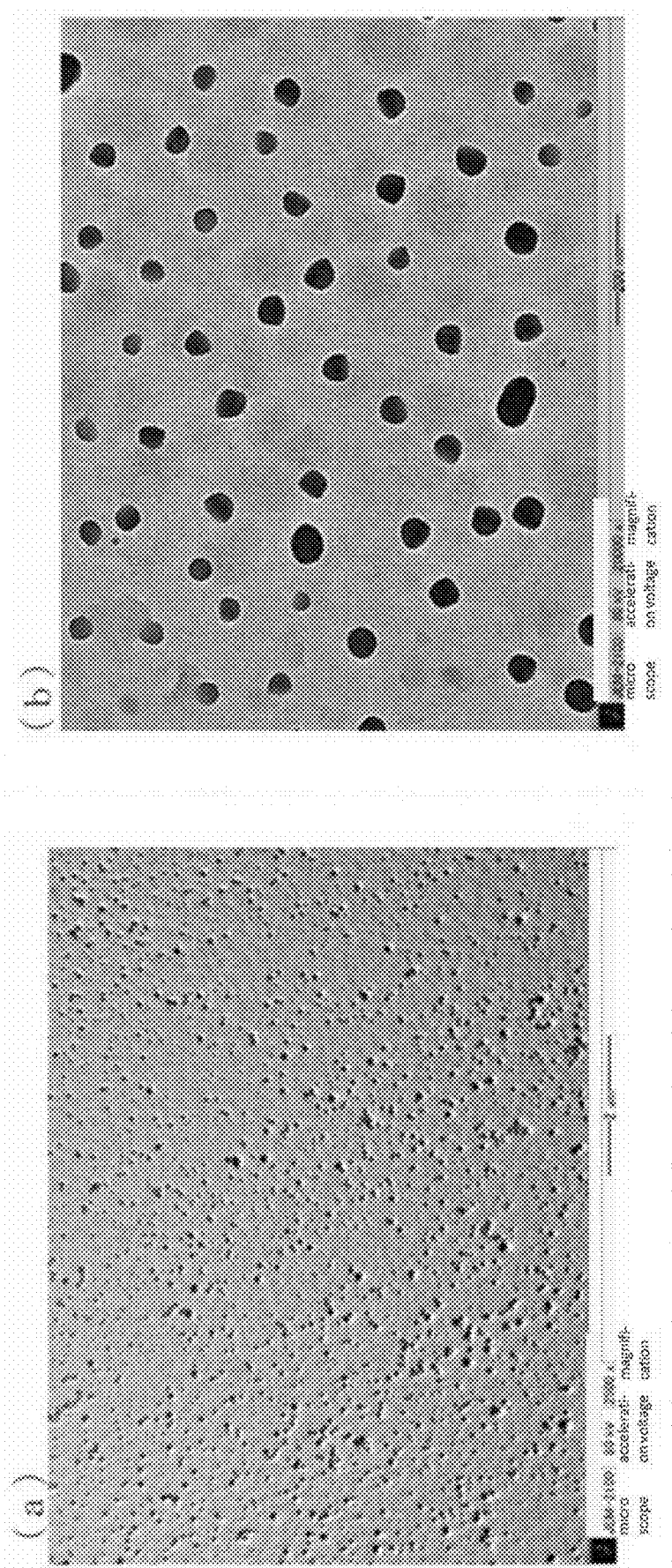
FIG. 15 These are the TEM pictures of the fine particles in the fine particle dispersion solution obtained in Experimental Example C1-5 of the present invention. Meanwhile, (a) and (b) are the observation results with the magnification of 2500 and 20000, respectively.

The TEM pictures of the organic substance fine particles obtained under the condition of Experimental Example C1-5 are shown in FIG. 15. From the TEM picture with the magnification of 2500 in FIG. 15(a), it was confirmed that the organic substance fine particles were uniformly dispersed. From the TEM picture with the magnification of 20000 in FIG. 15(b), it was confirmed that the primary particle's diameter thereof was in the range of about 50 nm to 100 nm. Similar results were obtained in the organic substance fine particles obtained under the condition of Experimental Example C1-8 (not shown by the drawing). Meanwhile, the TEM observation in Experimental Examples C was made by using the transmission electron microscope (JEM-2100, manufactured by JEOL Ltd.), wherein the dispersion property of the organic substance fine particle dispersion solution was assessed under the observation condition with the acceleration voltage of 80 kV and the observation magnification of 2500 or more.

The TEM pictures of the organic substance fine particles obtained under the condition of Experimental Example C1-7 are shown in FIG. 16. From the TEM pictures with the magnification of 2500 shown in FIG. 16(a) and with the magnification of 10000 shown in FIG. 16(b), it was observed that as compared with Experimental Example C1-5, the organic substance fine particles aggregated more; and in addition, the particles seemingly dissolved were observed.

The TEM pictures of the organic substance fine particles obtained under the conditions of Experimental Example C1-4 are shown in FIG. 7. From the TEM pictures with the magnification of 2500 shown in FIG. 7(a) and with the magnification of 10000 shown in FIG. 7(b), it was observed that the organic substance fine particles aggregated more as compared with Experimental Example C1-5; however, as compared with the organic substance fine particles obtained under the condition of Experimental Example C1-7, number of the aggregates thereof was less, and the organic substance fine particles were dispersed uniformly. Similar results were obtained in the organic substance fine particles obtained under the condition of Experimental Examples C1-3 and C1-6 (not shown by the drawing).

The TEM pictures of Experimental Examples C1-1 and C1-2 were taken immediately after start of the washing process of the organic substance fine particle dispersion solution; therefore, not only aggregates of the organic substance fine particles but also impurities (citric acid, etc.) were observed (not shown by the drawing). Also, a 0.05% by weight of aqueous sodium bicarbonate solution was charged into the organic substance fine particle dispersion solution of each of Experimental Examples C1-1 and C1-2, and the resulting mixture was dispersed using Clearmix (product name: CLM-2.2S, rotor: R1, screen: S0.8-48, manufactured by M. Technique Co., Ltd.) at 20000 rpm for 30 minutes to obtain the organic substance fine particle dispersion solution whose pH was in the range of 5.4 to 6.5; however, within 1 hour after the preparation, it was confirmed that the dispersion solution was separated into the phase including the organic substance fine particles and the phase substantially not including the organic substance fine particles; and thus, the organic substance fine particle dispersion solution exhibiting the dispersion property and stability such as those of Experimental Examples C1-3 to C1-5 and Experimental Examples 01-6 and C1-8 could not be prepared. This is presumably because conductivities of the organic substance fine particle dispersion solutions of Experimental Examples C1-1 and 01-2 were 100 µS/cm or more, the impurities therein could not be removed till the second pH-dependent region.

From the results shown above, it was found that the impurity amount decreases rapidly in the first region in which the conductivity of the organic substance fine particle dispersion solution is higher than 100 µS/cm from the initial value, but in the second pH-dependent region in which the conductivity thereof is 100 µS/cm or less, the change in the impurity amount is so small that the dispersion property of the organic substance fine particle dispersion solution is dependent more on the change of pH in the organic substance fine particle dispersion solution than the change of the impurity amount therein. In addition, it was found that in the second pH-dependent region, the dispersion property of the organic substance fine particle dispersion solution can be controlled by controlling pH of the dispersion solution. Further, in the case in which the organic substance fine particle dispersion solution is prepared by using the equipment comprising the disperser and the equipment with which the impurities are removed from the organic substance fine particle dispersion solution by using the filtration membrane with a cross flow method, it was found that the dispersion stability is improved by bringing the pH of the organic substance fine particle dispersion solution into the range of 5.4 to 6.5. In addition, it was found that for example, even with regard to the organic substance fine particle dispersion solution whose pH is made 6.51 (Experimental Example C1-6), the dispersion stability is improved by readjusting the pH at 5.81 (Experimental Example C1-8).

(Experimental Examples C2)

In Experimental Examples C2 and B3, the reformation process was carried out by the same method as that of Experimental Examples C1, except that the rotation number of the disperser in Experimental Examples C1 was changed. The processing conditions thereof are summarized in Table B3; the results of Experimental Examples C2 are summarized in Table B4-2. Meanwhile, among the reformation experiments of Experimental Examples C2, Experimental Examples C2-3 to C2-7 whose dispersion solution are in the second pH-dependent region and in which improvement of the dispersion stability compared with the dispersion solution of the first region is observed, correspond to Examples of the present invention.

TABLE C4-2

| Experimental Example | Processing duration [h] | pH pH | pH [° C.] | Conductivity [µS/cm] | Conductivity [° C.] | Concentration of impurity [wt %] | pH after preparation pH | pH after preparation [° C.] | Conductivity after preparation [µS · cm] | Conductivity after preparation [° C.] | Dispersion Stability initial precipitation confirmation time | Dispersion Stability Precipitation degree | EtOH residual rate [%] |
|---|---|---|---|---|---|---|---|---|---|---|---|---|---|
| B2-1 | 0.00 | 4.23 | 25.4 | 339 | 25.1 | 20.83 | — | — | — | — | 0.5 hour | F | 3.52 |
| B2-2 | 0.25 | 4.85 | 25.3 | 123.4 | 25.3 | 3.89 | — | — | — | — | 1 hour | F | 0.42 |
| B2-3 | 0.40 | 5.46 | 25.7 | 36.5 | 25.6 | 0.0136 | — | — | — | — | 1 week | B | 0.12 |
| B2-4 | 0.55 | 5.52 | 25.6 | 11.2 | 25.6 | 0.0086 | — | — | — | — | 1 week | B | 0.05 |
| B2-5 | 1.25 | 5.85 | 25.9 | 5.35 | 25.9 | 0.0014 | — | — | — | — | 1 week | A | 0 |
| B2-6 | Adjusting pH of dispersion solution of Experimental Example B2-5 by using pH adjusting agent | | | | | 0.0029 | 6.56 | 25.3 | 7.04 | 25.2 | 1 week | B | 0 |
| B2-7 | Adjusting pH of dispersion solution of Experimental Example B2-5 by using pH adjusting agent | | | | | 0.0046 | 5.84 | 25.1 | 16.4 | 25.1 | 1 week | A | 0 |

As can be seen in the results of Experimental Examples C2 of Table C4-2, when the rotation number of the disperser was decreased as compared with Experimental Examples C1, the time necessary for pH and conductivity of the organic substance fine particle dispersion solution to reach those of Experimental Examples C1 became longer; however, by adjusting pH and conductivity of the organic substance fine particle dispersion solution to those of Experimental Examples C1, the dispersion solution showing similar dispersion stability to that of the organic substance fine particle dispersion solution obtained in Experimental Examples C1 could be prepared. Experimental Example C2-6, in which pH was adjusted by adding a 0.05% by weight of aqueous sodium bicarbonate solution as the pH adjusting agent into the organic substance fine particle dispersion solution of Experimental Example C2-5 in the same way as Experimental Examples C1, showed a decrease in the dispersion property as compared with that of Experimental Example C2-5, but similar dispersion stability to that of Experimental Examples C2-3 and C2-4; and Experimental Example C2-7, in which a 0.02% by weight of aqueous citric acid solution was added to Experimental Example C2-6, exhibited similar dispersion stability to that of Experimental Example C2-5. Namely, it was found that by controlling pH or conductivity after carrying out the removal process in the reformation method of the dispersion solution of the present invention in the same way as Experimental Examples C1, the dispersion property of the organic substance fine particles in the organic substance fine particle dispersion solution could be controlled as well. Namely, similarly to Experimental Examples B1, it was found that the dispersion property of the organic substance fine particle dispersion solution can be controlled by controlling pH of the dispersion solution in the second pH-dependent region in which the conductivity thereof is 100 μS/cm or less.

(Experimental Examples C3 to C5)

Experimental Examples C3 to C5 were carried out by changing the conditions of the reformation process of Experimental Examples C1. Meanwhile, the experiments of Experimental Examples C3 to C5 correspond to Examples of the present invention. The changed conditions are summarized in Table C4-3. Meanwhile, both the pressures Pa of the pressure gauges described in Table C4-3 are obtained from the two pressure gauges Pa shown in FIG. 1(A).

TABLE C4-3

| | | Experimental Example C1 | Experimental Example C3 | Experimental Example C4 | Experimental Example C5 |
|---|---|---|---|---|---|
| (10) | Flow amount of the pump 104 | 6.4 L/min | 8.8 L/min | 6.4 L/min | 5.0 L/min |
| (11) | Flow amount of theorganic fine dispersion solution returned to the storing vessel 130 | 5.4 L/min | 7.0 L/min | 5.0 L/min | 4.5 L/min |
| (12) | Amount of the filtrate L3discharged by the removing unit 120 (Calculated value) | 1.0 L/min | 1.8 L/min | 1.4 L/min | 0.5 L/min |
| (16) | Pressure meters | Pa: Both two 0.10 MPaG | Same as on the left | Pa: Both two 0.12 MPaG | Pa: Both two 0.10 MPaG |
| (19) | Path length (Lea) | 0.3 m | Same as on the left | Same as on the left | 0.5 m |
| (20) | Pipe's inner diameter (Leb) | 0.0105 m | Same as on the left | Same as on the left | Same as on the left |
| (21) | Flow rate of the fine particle dispersion solution in the just-before transporting path | 1.2 m/sec | 1.7 m/sec | 1.2 m/sec | 1.0 m/sec |
| (22) | Time T1 from the dispersing vessel 101 to start of removal of the impurity by the removing unit 120 | 0.24 sec | 0.18 sec | 0.24 sec | 0.52 sec |
| (23) | Thermometer installed in the dispersing vessel 101 | From 24° C. to 28° C. | From 24° C. to 28° C. | From 24° C. to 22° C. | From 24° C. to 28° C. |

In Experimental Examples C3, the experimental condition was changed such that the flow rate of the pump 104 was increased from Experimental Examples C1, namely the flow rate of the organic substance fine particle dispersion solution from the storing vessel 130 to the dispersion processing equipment 110 and the removing unit 120 was increased, while both Lea and Leb were set to the same as those of Experimental Examples C1. Therefore, the flow rate (FL) of the dispersion solution in the just-before transporting path became faster, so that T1 became shorter. Even under the condition of Experimental Examples C3, similarly to Experimental Examples C1, the dispersion property of the organic substance fine particle dispersion solution could be controlled by controlling pH of the dispersion solution in the second pH-dependent region in which the conductivity thereof is 100 μS/cm or less; and in addition, the organic substance fine particle dispersion solution exhibiting the dispersion property or the dispersion stability superior to those of Experimental Examples C1 could be prepared. As can be seen in Table C4-3, in Experimental Examples C3, the experimental condition was changed such that the flow rate of the pump 104 was made faster than that of C1, thereby enabling to increase the discharge amount of the filtrate L3; and thus, the processing time could be shortened. In Experimental Examples C4, the experimental condition was changed such that the pressure of the organic substance fine particle dispersion solution in the just-before transporting path was made higher than that of Experimental Examples C1. Under the conditions of Experimental Examples C4, too, similarly to Experimental Examples C1, the dispersion property of the organic substance fine particle dispersion solution could be controlled by controlling pH of the dispersion solution in the second pH-dependent region in which the conductivity is 100 µS/cm or less; and by carrying out the reformation process so as to reach pH or conductivity of Experimental Examples C1, the organic substance fine particle dispersion solution exhibiting the dispersion property or the dispersion stability equivalent to those of Experimental Examples C1 could be prepared; and further, because the discharge amount of the filtrate L3 could be increased, the processing time could be shortened.

In the organic substance fine particles obtained in Experimental Examples C3, the organic substance fine particle dispersion solution having the dispersion property or the dispersion stability which are better than those of Experimental Examples C1 means, as compared with the organic substance fine particle dispersion solution of, for example, Experimental Example C1-4 whose pH was adjusted to 5.52, the organic substance fine particle dispersion solution in which by adjusting the pH thereof to that of Experimental Example C1-4 the initial deposition confirmation time becomes longer and also the organic substance fine particles are confirmed to be in the state of more dispersed than Experimental Example C1-4 in the TEM observation.

In Experimental Examples C5, the experimental condition was changed such that the flow rate of the pump 104 was decreased and Lea was increased as compared with those of Experimental Examples C1. Under these conditions, the discharge amount of the filtrate L3 was decreased and T1 became longer; but when the reformation process was carried out until pH or conductivity reached those of Experimental Examples C1, the dispersion property of the organic substance particle dispersion solution could be controlled by controlling pH of the dispersion solution in the second pH-dependent region in which the conductivity was 100 µS/cm or less, so that the organic substance fine particle dispersion solution exhibiting the dispersion property or the dispersion stability equivalent to those of Experimental Examples C1 could be obtained.

Consequently, the dispersion property of the organic substance fine particles included in the organic substance fine particle dispersion solution could be controlled by controlling pH of the dispersion solution in the second pH-dependent region in which the conductivity of the fine particle dispersion solution became 100 µS/cm or less, even if the flow rate, the flow amount, or the fluid pressure in the just-before transporting path was changed.

a Fine particle
b Aggregate of Fine particle
c Impurity
d Filtration membrane
120 Dispersion solution reformation equipment
100 Removing unit
The first region (Win FIG. 2D)
The second pH-dependent region ((2) in FIG. 2D)
L1 Fine particle dispersion solution

The invention claimed is:

1. A method for reforming a fine particle dispersion solution that includes impurities, comprising:
   removing impurities in the fine particle dispersion solution by carrying out filtration with a filtration membrane, thereby controlling a dispersion property of the fine particle dispersion solution,
   wherein the filtration comprises steps A and B below,
   A) decreasing the amount of impurities by filtration and transferring from a first stage to a second stage, wherein the amount of the impurities are defined in the first and second stages,
   wherein the first stage has a concentration of impurities of 0.02% or more by weight and the second stage has a concentration of impurities of 0.00005% to 0.02% by weight,
   B) controlling the dispersion property by controlling a pH of the fine particle dispersion solution using a pH controlling agent in the second stage.

2. The method for reforming the fine particle dispersion solution according to claim 1, wherein the impurities are removed from the fine particle dispersion solution by filtration with a cross flow method while supplying the fine particle dispersion solution to the filtration membrane.

3. The method for reforming the fine particle dispersion solution according to claim 2, wherein the filtration membrane is an ultrafiltration membrane.

4. The method for reforming the fine particle dispersion solution according to claim 1, wherein
   amount of the impurities is reduced by repeating a discharge process and a removal process,
   the discharge process is a process in which a physical energy is applied to aggregates of the fine particles included in the fine particle dispersion solution so that a dispersing process is carried out to disperse the aggregates of the fine particles to smaller particles compared with the aggregates of the fine particles thereby discharging the impurities included in the aggregates into the fine particle dispersion solution, and
   the removal process is a process in which the impurities in the fine particle dispersion solution after the discharge process are removed by the filtration membrane before re-aggregation takes place entirely by the impurities in the solution.

5. The method for reforming the fine particle dispersion solution according to claim 1, wherein
   after a process to remove the impurities by the filtration membrane, a concentration process to concentrate the fine particles in the fine particle dispersion solution to a concentration range of 0.1 to 15.0% by weight by the filtration membrane is carried out.

6. The method for reforming the fine particle dispersion solution according to claim 1, wherein
   the filtration is repeated plural times.

7. A method for producing a fine particle dispersion solution, comprising:
   the method for reforming the fine particle dispersion solution according to claim 1 and a process to obtain the fine particle dispersion solution before carrying out the method for reforming the fine particle dispersion solution, and
   the process to obtain the fine particle dispersion solution comprises:
   mixing a fine particle raw material solution including at least a fine particle raw material which is a raw material of the fine particles with a fine particle separating solvent including at least a fine particle separating substance to separate the fine particles in between processing surfaces which are disposed so as to be able to approach to and separate from each other, at least any one of which rotates relative to the other, and simultaneously separating the fine particles in the mixed fluid thus formed.

8. A method for reforming a fine particle dispersion solution that includes fine particles, aggregates of fine particles, and impurities, comprising:

while a physical energy is applied to the aggregates to discharge the impurities included in the aggregates into the fine particle dispersion solution, removing impurities in the fine particle dispersion solution by carrying out filtration with a filtration membrane, thereby controlling a dispersion property of the fine particle dispersion solution, wherein the filtration comprises steps A and C below, A) decreasing the amount of impurities by filtration and transferring from a first stage to a second stage, wherein the amount of the impurities are defined in the first and second stages, wherein the first stage has a concentration of impurities of 0.02% or more by weight and the second stage has a concentration of impurities of 0.00005% to 0.02% by weight, C) controlling the dispersion property by controlling a pH of the fine particle dispersion solution in the second stage.

9. The method for reforming the fine particle dispersion solution according to claim 8, wherein the amount of the impurities is correlated to a conductivity of the fine particle dispersion solution, the first stage is a conductivity changing stage in which a conductivity of the fine particle dispersion solution decreases from an initial value at a starting time of processing till 100 μS/cm.

10. The method for reforming the fine particle dispersion solution according to claim 8, wherein the impurities are removed from the fine particle dispersion solution by filtration with a cross flow method while supplying the fine particle dispersion solution to the filtration membrane.

11. The method for reforming the fine particle dispersion solution according to claim 10, wherein the filtration membrane is an ultrafiltration membrane.

12. The method for reforming the fine particle dispersion solution according to claim 8, wherein amount of the impurities is reduced by repeating a discharge process and a removal process, the discharge process is a process in which a physical energy is applied to aggregates of the fine particles included in the fine particle dispersion solution so that a dispersing process is carried out to disperse the aggregates of the fine particles to smaller particles compared with the aggregates of the fine particles thereby discharging the impurities included in the aggregates into the fine particle dispersion solution, and the removal process is a process in which the impurities in the fine particle dispersion solution after the discharge process are removed by the filtration membrane before re-aggregation takes place entirely by the impurities in the solution.

13. The method for reforming the fine particle dispersion solution according to claim 8, wherein after a process to remove the impurities by the filtration membrane, a concentration process to concentrate the fine particles in the fine particle dispersion solution to a concentration range of 0.1 to 15.0% by weight by the filtration membrane is carried out.

14. The method for reforming the fine particle dispersion solution according to claim 8, wherein the filtration is repeated plural times.

15. A method for producing a fine particle dispersion solution, comprising:

the method for reforming the fine particle dispersion solution according to claim 8 and a process to obtain the fine particle dispersion solution before carrying out the method for reforming the fine particle dispersion solution, and the process to obtain the fine particle dispersion solution comprises:

mixing a fine particle raw material solution including at least a fine particle raw material which is a raw material of the fine particles with a fine particle separating solvent including at least a fine particle separating substance to separate the fine particles in between processing surfaces which are disposed so as to be able to approach to and separate from each other, at least any one of which rotates relative to the other, and simultaneously separating the fine particles in the mixed fluid thus formed.

\* \* \* \* \*